United States Patent
Sleeman et al.

(10) Patent No.: US 11,691,831 B2
(45) Date of Patent: Jul. 4, 2023

(54) PORTABLE CONVEYOR SYSTEM INCLUDING PIVOTABLE AND EXTENDABLE FEED CONVEYORS FOR FEEDING PARTICULATE MATERIAL INTO AN ELEVATING ASSEMBLY

(71) Applicants: WESTCAP AG CORP., Winkler (CA); Marlea Sleeman, Edmonton (CA)

(72) Inventors: Marlea Sleeman, Edmonton (CA); Lonny James Thiessen, Winkler (CA)

(73) Assignee: 543077 Alberta Ltd., Edmonton (CA)

( * ) Notice: Subject to any disclaimer, the term of this patent is extended or adjusted under 35 U.S.C. 154(b) by 43 days.

(21) Appl. No.: 17/420,888

(22) PCT Filed: Nov. 19, 2019

(86) PCT No.: PCT/CA2019/051647
§ 371 (c)(1),
(2) Date: Jul. 6, 2021

(87) PCT Pub. No.: WO2020/150808
PCT Pub. Date: Jul. 30, 2020

(65) Prior Publication Data
US 2022/0063935 A1 Mar. 3, 2022

Related U.S. Application Data

(60) Provisional application No. 62/863,609, filed on Jun. 19, 2019, provisional application No. 62/795,364, filed on Jan. 22, 2019.

(51) Int. Cl.
*B65G 67/04* (2006.01)
*B65G 17/12* (2006.01)
(Continued)

(52) U.S. Cl.
CPC ............ *B65G 67/04* (2013.01); *B65G 17/126* (2013.01); *B65G 41/005* (2013.01); *B65G 47/18* (2013.01); *B65G 47/58* (2013.01)

(58) Field of Classification Search
CPC ...... B65G 67/04; B65G 67/24; B65G 41/005; B65G 41/008
See application file for complete search history.

(56) References Cited

U.S. PATENT DOCUMENTS 875,385 A * 12/1907 Smith .................... B65G 11/00
198/538
2,851,290 A 9/1958 Hanson
(Continued)

FOREIGN PATENT DOCUMENTS

| CA | 2718595 | 4/2012 |
|---|---|---|
| CA | 2851290 | 5/2013 |

(Continued)

*Primary Examiner* — William R Harp
(74) *Attorney, Agent, or Firm* — Ryan W. Dupuis; Kyle R. Satterthwaite; Ade & Company Inc.

(57) ABSTRACT

A portable conveyor system receives and conveys particulate material to downstream equipment. The system includes a base frame, a material handling assembly carried on the base frame for depositing the material into the downstream equipment, and at least one adjustable feed conveyor to convey the material from a source onto the material handling assembly. The feed conveyor is movable in various manners relative to the base frame between a working position and a stored position. The material handling assembly includes a main conveyor assembly to convey material along the base frame from the feed conveyors to an elevating assembly at one end of the base frame. The elevating assembly is collapsible in height relative to the base frame for transport.

24 Claims, 29 Drawing Sheets

(51) Int. Cl.
*B65G 41/00* (2006.01)
*B65G 47/18* (2006.01)
*B65G 47/58* (2006.01)

(56) References Cited

U.S. PATENT DOCUMENTS

| | | | |
|---|---|---|---|
| 2,860,091 A | 11/1958 | Rosenberg | |
| 2,931,409 A | 4/1960 | Unthank | |
| 2,953,504 A | 9/1960 | Bole et al. | |
| 3,107,712 A | 10/1963 | Bergeretto | |
| 3,664,072 A | 5/1972 | Lieckfeld | |
| 4,966,310 A | 10/1990 | Hawkins | |
| 5,199,589 A | 4/1993 | Noble | |
| 5,653,354 A | 8/1997 | Olson | |
| 5,897,012 A | 4/1999 | Sortwell | |
| 6,968,946 B2 | 11/2005 | Shuert | |
| 7,114,909 B2 | 10/2006 | McCrory et al. | |
| 7,140,516 B2 | 11/2006 | Bothor et al. | |
| 7,252,309 B2 | 8/2007 | Soon et al. | |
| 7,309,205 B2 | 12/2007 | McCrory et al. | |
| 7,434,721 B2 | 10/2008 | Feltz | |
| 7,997,623 B2 | 8/2011 | Williams | |
| D688,349 S | 8/2013 | Oren et al. | |
| D688,350 S | 8/2013 | Oren et al. | |
| D688,351 S | 8/2013 | Oren et al. | |
| D688,772 S | 8/2013 | Oren et al. | |
| 8,505,780 B2 | 8/2013 | Oren | |
| 8,585,341 B1 | 11/2013 | Oren et al. | |
| 8,616,370 B2 | 12/2013 | Allegretti et al. | |
| 8,651,792 B2 | 2/2014 | Friesen | |
| 8,668,430 B2 | 3/2014 | Oren et al. | |
| 8,820,560 B2 | 9/2014 | Nolan | |
| 8,827,118 B2 | 9/2014 | Oren | |
| 8,887,914 B2 | 11/2014 | Allegretti et al. | |
| 8,926,252 B2 | 1/2015 | McIver et al. | |
| 8,931,996 B2 | 1/2015 | Friesen et al. | |
| 8,944,740 B2 | 2/2015 | Teichrob et al. | |
| 9,016,373 B2 | 4/2015 | VanDelden | |
| 9,016,378 B2 | 4/2015 | Zhang et al. | |
| 9,051,801 B1 | 6/2015 | Mintz | |
| 9,162,603 B2 | 10/2015 | Oren | |
| RE45,788 E | 11/2015 | Oren et al. | |
| 9,248,772 B2 | 2/2016 | Oren | |
| RE45,914 E | 3/2016 | Oren et al. | |
| 9,315,294 B2 | 4/2016 | Herman et al. | |
| 9,358,916 B2 | 6/2016 | Oren | |
| 9,421,899 B2 | 8/2016 | Oren | |
| 9,428,348 B2 | 8/2016 | Teichrob et al. | |
| 9,475,671 B2 | 10/2016 | Adler et al. | |
| 9,499,335 B2 | 11/2016 | McIver et al. | |
| 9,499,348 B2 | 11/2016 | Teichrob et al. | |
| 9,580,238 B2 | 2/2017 | Friesen et al. | |
| D783,772 S | 4/2017 | Stegemoeller, III et al. | |
| 9,617,066 B2 | 4/2017 | Oren | |
| 9,643,789 B2 | 5/2017 | Teichrob et al. | |
| 9,682,815 B2 | 6/2017 | Oren | |
| 9,718,610 B2 | 8/2017 | Oren | |
| 9,776,813 B2 | 10/2017 | McMahon | |
| 9,840,371 B2 | 12/2017 | Ho et al. | |
| 9,914,602 B2 | 3/2018 | Oren | |
| 9,932,181 B2 | 4/2018 | Oren | |
| 9,938,093 B2 | 4/2018 | Sherwood et al. | |
| 9,957,108 B2 | 5/2018 | Ho et al. | |
| D819,920 S | 6/2018 | Friesen | |
| 9,993,093 B2 | 6/2018 | Berry | |
| D824,131 S | 7/2018 | Friesen | |
| 10,065,814 B2 | 9/2018 | Herman et al. | |
| 10,370,205 B1 * | 8/2019 | Friesen | B65G 41/008 |
| D875,266 S | 2/2020 | Qiu | |
| 10,633,174 B2 * | 4/2020 | Pham | B65D 88/32 |
| 2004/0074922 A1 | 4/2004 | Bothor et al. | |
| 2005/0230390 A1 | 10/2005 | Glenn | |
| 2008/0179054 A1 | 7/2008 | McGough et al. | |
| 2008/0179324 A1 | 7/2008 | McGough et al. | |
| 2010/0187192 A1 | 7/2010 | Ness | |
| 2011/0024435 A1 | 2/2011 | MacNabb | |
| 2013/0004272 A1 | 1/2013 | Mintz | |
| 2013/0108402 A1 | 5/2013 | Herman et al. | |
| 2013/0142601 A1 | 6/2013 | McIver et al. | |
| 2013/0206415 A1 | 8/2013 | Sheesley | |
| 2013/0206753 A1 | 8/2013 | Zhang et al. | |
| 2013/0209204 A1 | 8/2013 | Sheesley | |
| 2014/0020892 A1 | 1/2014 | Oren et al. | |
| 2014/0023465 A1 | 1/2014 | Oren et al. | |
| 2014/0041322 A1 | 2/2014 | Pham et al. | |
| 2014/0044508 A1 | 2/2014 | Luharuka et al. | |
| 2014/0083554 A1 | 3/2014 | Harris | |
| 2014/0097182 A1 | 4/2014 | Sheesley | |
| 2014/0109992 A1 | 4/2014 | Ness | |
| 2014/0166647 A1 | 6/2014 | Sheesley et al. | |
| 2014/0169920 A1 | 6/2014 | Herman et al. | |
| 2014/0203046 A1 | 7/2014 | Allegretti | |
| 2014/0246341 A1 | 9/2014 | Oren | |
| 2014/0286716 A1 | 9/2014 | Cochrum et al. | |
| 2014/0299226 A1 | 10/2014 | Oren et al. | |
| 2014/0305769 A1 | 10/2014 | Eiden et al. | |
| 2015/0044003 A1 | 2/2015 | Pham | |
| 2015/0044004 A1 | 2/2015 | Pham | |
| 2015/0086307 A1 | 3/2015 | Stefan | |
| 2015/0166135 A1 | 6/2015 | Pham | |
| 2015/0166260 A1 | 6/2015 | Pham | |
| 2015/0284194 A1 | 10/2015 | Oren et al. | |
| 2015/0375930 A1 | 12/2015 | Oren et al. | |
| 2016/0009489 A1 | 1/2016 | Lofton et al. | |
| 2016/0031658 A1 | 2/2016 | Oren et al. | |
| 2016/0039433 A1 | 2/2016 | Oren et al. | |
| 2016/0130095 A1 | 5/2016 | Oren et al. | |
| 2016/0185522 A1 | 6/2016 | Herman et al. | |
| 2016/0236880 A1 | 8/2016 | Herman et al. | |
| 2016/0244268 A1 | 8/2016 | Ritter | |
| 2016/0251152 A1 | 9/2016 | Krupa | |
| 2016/0264354 A1 | 9/2016 | Herman et al. | |
| 2017/0021318 A1 | 1/2017 | McIver et al. | |
| 2017/0297835 A1 | 10/2017 | Friesen | |
| 2017/0313499 A1 | 11/2017 | Hughes et al. | |
| 2017/0334654 A1 | 11/2017 | Friesen | |
| 2018/0002066 A1 | 1/2018 | Allegretti et al. | |
| 2018/0002120 A1 | 1/2018 | Allegretti et al. | |
| 2018/0065814 A1 | 3/2018 | Eiden et al. | |
| 2018/0072491 A1 | 3/2018 | D'Agostino et al. | |
| 2018/0075547 A1 | 3/2018 | Pere et al. | |
| 2018/0201437 A1 | 7/2018 | Surjaatmadja et al. | |
| 2018/0257857 A1 | 9/2018 | Fisher et al. | |
| 2018/0297503 A1 | 10/2018 | Hughes et al. | |

FOREIGN PATENT DOCUMENTS

| | | |
|---|---|---|
| CA | 2777284 | 10/2013 |
| CA | 2936005 | 8/2015 |
| CA | 2883423 | 8/2016 |
| EP | 1690810 | 8/2006 |
| WO | 2010111252 | 9/2010 |
| WO | 2014028317 | 2/2014 |
| WO | 2014066514 | 5/2014 |
| WO | 2016023079 | 2/2016 |
| WO | 2017027034 | 2/2017 |
| WO | 2017049264 | 3/2017 |
| WO | 2017095423 | 6/2017 |
| WO | 2018052961 | 3/2018 |
| WO | 2018081902 | 5/2018 |

* cited by examiner

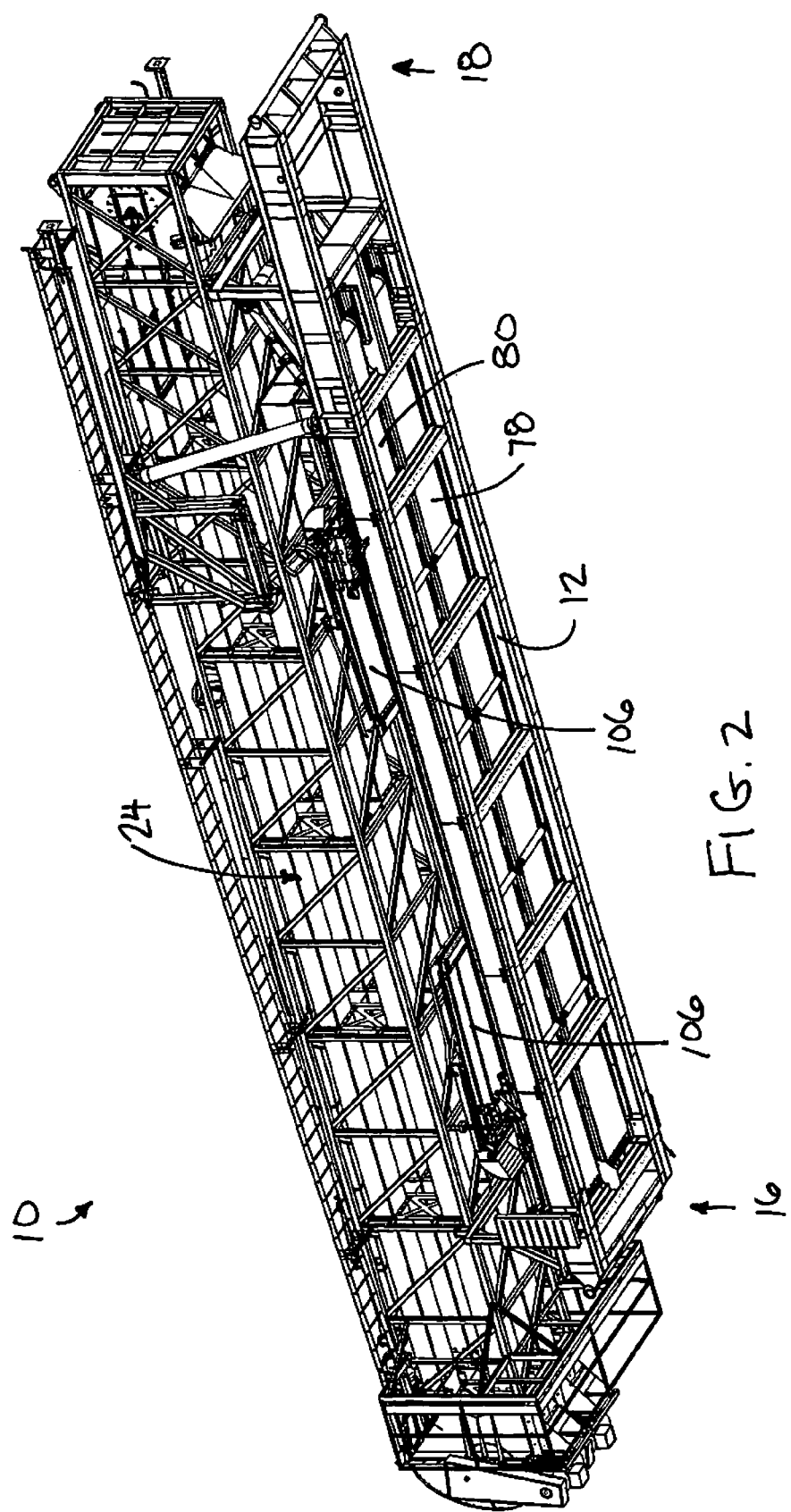

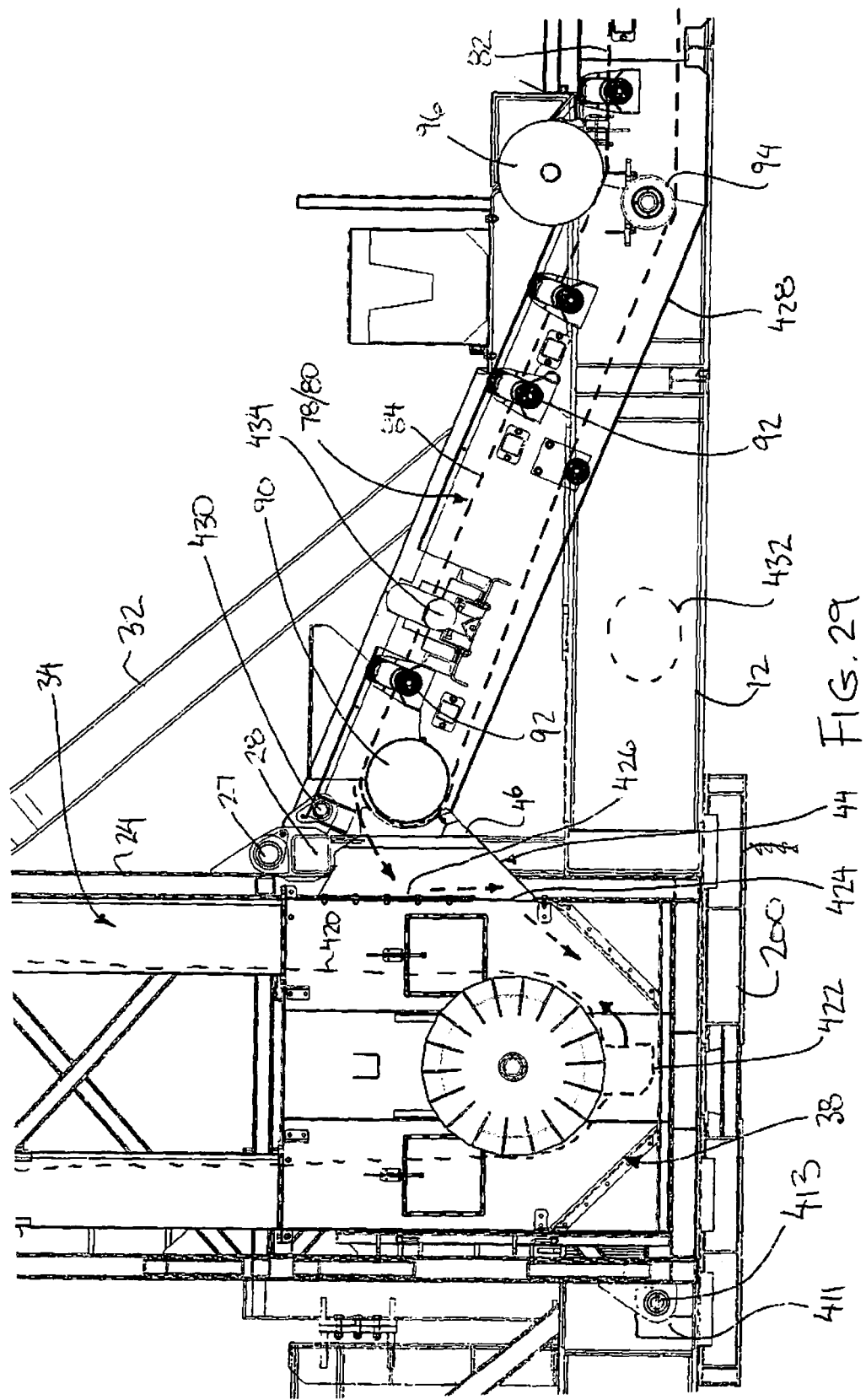

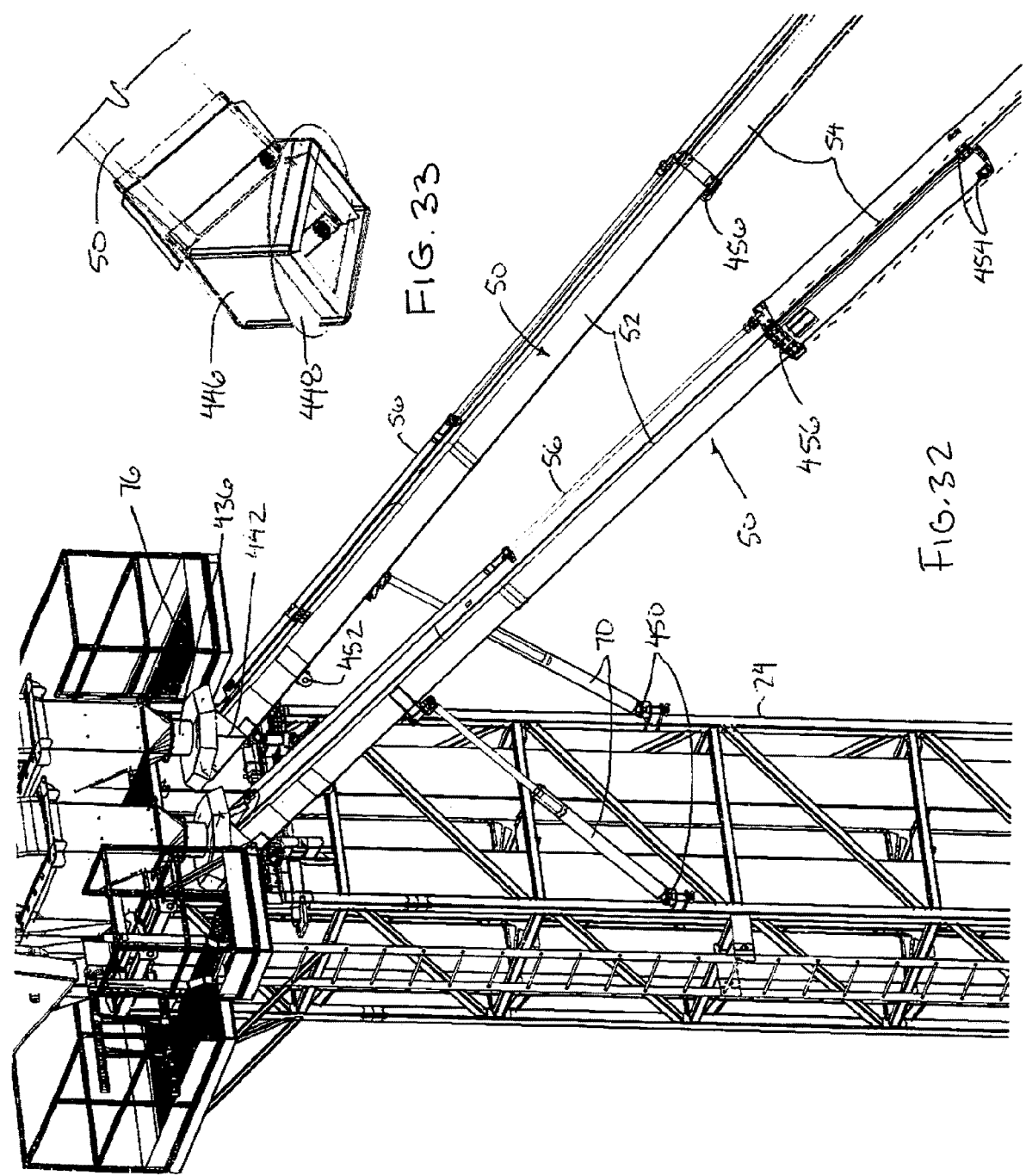

PORTABLE CONVEYOR SYSTEM INCLUDING PIVOTABLE AND EXTENDABLE FEED CONVEYORS FOR FEEDING PARTICULATE MATERIAL INTO AN ELEVATING ASSEMBLY

FIELD OF THE INVENTION

The present invention relates to a conveyor system for conveying particulate material having a transportable base frame, for example a skid base or other portable frame, which supports thereon one or more feed conveyors for receiving particulate material, which might be discharged from a transport vehicle, together with one or both of (i) a main conveyor assembly for conveying particulate material longitudinally along the base frame and/or (ii) one or more elevating assemblies, for example a bucket elevator or other conveyance mechanism such as an inclined conveyor, for elevating the particulate material to an elevated discharge location, in which the one or more feed conveyors feed the particulate material onto one of the main conveyor assembly or the elevating assembly and in which the one or more feed conveyors are repositionable relative to base frame, for example by pivoting, extending and/or longitudinally displacing the feed conveyors along the base frame.

More particularly, the present invention relates to a portable conveyor system including a main conveyor assembly comprised of one or more main conveyors receiving the particulate material from the feed conveyors and an elevator assembly comprised of one or more bucket elevators that receive the particulate material from the one or more main conveyors, in which the elevating assembly is movable between a working position elevating the particulate material to an elevated discharge location and a stored position extending in the longitudinal direction of the base frame for transport.

BACKGROUND

A known problem in various industries is the time and cost efficient means of managing particulate material handling, for example the unloading of particulate material from transport vehicles, and the conveyance of the particulate material to elevated locations such as the loading opening at the top of an upright storage bin or silo where the particulate material is to be stored for subsequent use.

In the oil and gas industry, the process of hydraulic fracturing typically requires large volumes of granular proppant material to be stored in upright silos on site to be ready for use on demand, in which granular proppant material must be transferred from transport vehicles into the silos on an ongoing basis.

In another example, in the agricultural industry, various particulate materials including seed, granular fertilizer, and the like are transported between different sites and stored in upright bins of various configurations for subsequent use.

In each industry, various attempts have been made to efficiently unload the particulate material from the transport vehicles and transfer the material to an elevating assembly which then elevates the material to the loading opening at the top of one or more upright storage bins or silos. One common type of equipment used in the unloading of particulate material from a transport vehicle includes a drive-over ramp aligned with the intake opening of a transfer conveyor so that a vehicle driving over the ramp can align the bottom discharge of the transport vehicle with the intake opening. The transfer conveyor then conveys the particulate material to an elevating assembly such as an inclined conveyor or a bucket elevator.

Examples of drive over ramps can be found in U.S. Pat. No. 9,663,303 by Norstar Industries Ltd. and U.S. Pat. No. 7,090,066 by Bourgault Industries Ltd.

None of the existing bottom dump technology can get two trucks in close to each other and to the storage system as the drive over assembly is either typically limited to a single vehicle or a single discharge location, or the drive over assembly is then connected to a long incline belt conveyor which extends the footprint of the storage system. Although some attempts have been made to unload two trucks simultaneously into a single elevating assembly, failure of the single elevating assembly prevents usage of both truck unloading stations, while also requiring a large transverse feed conveyor to span multiple vehicle lanes with numerous large ramps required to pass over different locations along the feed conveyor such that the overall feed assembly occupies a considerable footprint. Such attempts to unload two trucks has also been limited to use with a large inclined conveyor as the elevating assembly, but this requires an even larger configuration of equipment must stretch at about a 40 degree angle, occupying an even larger footprint so that considerable space between the trucks and the silos are wasted. The wasted space exists merely to stretch conveyors, and leads to the user spending lots of money preparing the site just to stretch a conveyor, as well as increasing the environmental footprint associated with this additional disturbance area resulting from the extended areas required for conveying.

Existing drive over systems also result in significant wasted truck time onsite. The typical unloading operation involves a single truck having access to pull in, open one compartment to unload, followed by driving forward or reverse to align the next vehicle compartment for unloading, continued by further vehicle repositioning until all compartments are empty.

In winter operations, trucks are known to spin out climbing the unloader ramps as the truck attempt to reposition for unloading a sequence of compartments on the transport vehicle. To resolve this, some vehicles must drive all the way forward, unload the back compartments, and then back up to each successive compartment so that they would use the weight of the compartments nearest the tractor to power up and over the ramps. This creates safety risks.

In another transfer system using pneumatics for transferring material, a similar safety risk is presented as the truck nearly always has to back up into the storage system to hook up to the pneumatic fill pipes.

A further problem encountered with drive over systems to accommodate bottom dump trucks will be the collection of debris such as stone or rock collecting on the intake area of the drive over assembly. The contamination risk primarily comes from the tires of the trucks as they drive over the truck unloading ramps and drag it into the conveyors.

SUMMARY OF THE INVENTION

According to one aspect of the present invention there is provided a portable conveyor system for receiving particulate material and for conveying said particulate material to downstream equipment having an intake, the portable conveyor system comprising:

a base frame;

a material handling assembly carried on the base frame for depositing the particulate material into the intake of the downstream equipment; and at least one feed conveyor operable to convey the particulate material from the feed conveyor onto the material handling assembly;

said at least one feed conveyor being supported on the base frame so as to be movable between a working position and a stored position.

The material handling assembly may include (i) a main conveyor assembly, for example a belt conveyor, for conveying the particulate material longitudinally along the base frame from the feed conveyors, and/or (ii) an elevating assembly, for example a bucket elevator, for receiving the particulate material from either the feed conveyors or the main conveyor assembly to elevate the particulate material to the elevated discharge location of the material handling assembly.

According to one embodiment, the material handling assembly includes an elevating assembly on the base frame having an intake and a discharge at a greater elevation than the intake in a working position for conveying the particulate material upwardly from the intake to the discharge. Preferably the elevating assembly is supported on the base frame so as to be movable relative to the base frame between the working position and a stored position reduced in elevation relative to the working position.

According to the same or further embodiments, the base frame may be elongate in a longitudinal direction between a first end and a second end and the material handling assembly includes a main conveyor assembly carried on the base frame and being operable to convey the particulate material towards the second end of the base frame.

In the illustrated embodiment, the base frame is elongate in a longitudinal direction between a first end and a second end, and the material handling assembly includes both (i) an elevating assembly on the base frame in proximity to the second end of the base frame having an intake and a discharge at a greater elevation than the intake in a working position of the elevating assembly, and (ii) a main conveyor assembly carried on the base frame and being operable to convey the particulate material towards the second end of the base frame from said at least one feed conveyor to the intake of the elevating assembly. Preferably the elevator assembly is supported on the base frame so as to be movable relative to the base frame between the working position and a stored position reduced in elevation relative to the working position.

According to another aspect of the present invention there is provided a portable conveyor system for receiving particulate material and for conveying said particulate material to downstream equipment having an intake, the portable conveyor system comprising:

a base frame having a first end and a second end;

a main conveyor assembly carried on the base frame and being operable to convey the particulate material towards the second end of the base frame for depositing the particulate material into the intake of the downstream equipment; and at least one feed conveyor operable to convey the particulate material from the feed conveyor onto the main conveyor assembly;

said at least one feed conveyor being supported on the base frame so as to be movable between a working position and a stored position.

According to another aspect of the present invention there is provided a portable conveyor system for receiving particulate material, such as from a transport vehicle, the portable conveyor system comprising:

a base frame;

an elevating assembly on the base frame having an intake and a discharge; and at least one feed conveyor for receiving the particulate material and being operable to convey the particulate material from the feed conveyor into the intake of the elevating assembly;

said at least one feed conveyor being supported on the base frame so as to be movable between a working position extending outward from the base frame in a lateral direction and a second position in which the feed conveyor is displaced laterally inwardly towards the base frame relative to the working position.

According to a further aspect of the present invention there is provided a portable conveyor system for transferring particulate material, the portable system comprising:

a base frame which is elongate in a longitudinal direction of the base frame between a first end and a second end of the base frame;

a main conveyor assembly carried on the base frame and being operable to convey the particulate material in the longitudinal direction of the base frame towards the second end of the base frame;

at least one feed conveyor operable to convey material from an inlet end of the feeder conveyor to an outlet end of the feed conveyor for receiving the particulate material, for example from a transport vehicle and feeding the particulate material onto the main conveyor assembly;

said at least one feed conveyor being supported on the base frame so as to be movable between a working position and a stored position; and an elevator assembly having an intake and a discharge at an elevated location relative to the intake, the elevator assembly being supported on the base frame so as to be movable between a working position extending upwardly at the second end of the base frame from the intake of the elevator assembly to the discharge of the elevator assembly and a stored position extending along the base frame in the longitudinal direction of the base frame from the intake of the elevator assembly at the second end of the frame to the discharge of the elevator assembly, the elevator assembly being operable in the working position to convey the particulate material from the intake to the discharge of the elevator assembly.

According to another aspect of the present invention there is provided a method for transferring particulate material, the method comprising the steps of:

receiving the particulate material on at least one feed conveyor that is supported on a base frame of a main conveyor system so as to be movable between a working position and a stored position, and the particulate material is received when the at least one feed conveyor is in the working position;

conveying the particulate material from the at least one feed conveyor to the main conveyor system;

receiving the particulate material on the main conveyor system and conveying the particulate material to a first end of the main conveyor system;

receiving the particulate material at an intake of an elevator assembly; and conveying the particulate material from the intake to a discharge of the elevator assembly, wherein the elevator assembly is movable between a working position and a stored position, and the elevator assembly being operable in the working position to receive the particulate material at the intake and convey the particulate material from the intake to the discharge of the elevator assembly.

According to a further aspect of the invention there is provided a portable conveyor system for receiving particulate material, for example from a transport vehicle, and for conveying said particulate material to an elevating assembly having an intake and a discharge at an elevated location relative to the intake, the portable conveyor system comprising:

a base frame which is elongate in a longitudinal direction of the base frame between a first end and a second end of the base frame;

a main conveyor assembly carried on the base frame and being operable to convey the particulate material in the longitudinal direction of the base frame towards the second end of the base frame for depositing the particulate material into the intake of the elevating assembly;

at least one feed conveyor operable to convey material from an inlet end of the feed conveyor to an outlet end of the feed conveyor for feeding the particulate material onto the main conveyor assembly; and said at least one feed conveyor being supported on the base frame so as to be movable between a working position extending laterally outward from the base frame transversely to the longitudinal direction of the base frame and a second position in which the feed conveyor is displaced laterally inwardly towards the base frame relative to the working position.

According to a further aspect of the present invention there is provided a method for transferring particulate material, the method comprising the steps of:

receiving the particulate material on at least one feed conveyor that is supported on a base frame of a main conveyor assembly so as to be movable between a working position and a stored position, and the particulate material is received when the at least one feed conveyor is in the working position;

conveying the particulate material from the at least one feed conveyor to the main conveyor assembly;

receiving the particulate material on the main conveyor assembly and conveying the particulate material to a first end of the main conveyor assembly;

receiving the particulate material at an intake of an elevator assembly; and conveying the particulate material from the intake to a discharge of the elevator assembly, wherein the elevator assembly is movable between a working position and a stored position, and the elevator assembly being operable in the working position to receive the particulate material at the intake and convey the particulate material from the intake to the discharge of the elevator assembly.

The feed conveyor is preferably supported on the base frame so as to be movable between a working position extending laterally outward from the base frame transversely to a longitudinal direction of the base frame and a second position in which the feed conveyor is displaced laterally inwardly towards the base frame relative to the working position.

The feed conveyor may be pivotal relative to the main conveyor on the base frame about an upright pivot axis.

When the feed conveyor is operable to convey the particulate material in a feed direction of the feed conveyor, the feed conveyor may be repositionable in the feed direction of the feed conveyor relative to the upright pivot axis.

The feed conveyor is preferably also movable relative to the base frame in the longitudinal direction of the base frame. Preferably the feed conveyor is movable in the longitudinal direction relative to the base frame along a majority of a length of the main conveyor assembly. When a shroud extends over the main conveyor assembly, the feed conveyor preferably communicates through an access opening in the shroud in which the access opening in the shroud is adjustable in the longitudinal direction of the base frame together with the feed conveyor.

When the feed conveyor is operable to convey the particulate material in a feed direction of the feed conveyor, the feed conveyor may also be extendable and retractable in length in the feed direction of the feed conveyor.

There may be provided two feed conveyors independently supported along a common side of the base frame to extend laterally outward from the base frame in the working positions thereof in a common lateral direction.

There may also be provided two feed conveyors independently supported on opposing sides of the base frame to extend laterally outward from the base frame in the working positions thereof in opposing lateral directions.

The main conveyor assembly in the illustrated embodiment comprises a first main conveyor and a second main conveyor extending alongside one another and being operable to independently convey particulate material from the first end to the second end of the base frame. In this instance, one or more feed conveyors are preferably operatively associated with each of the first and second main conveyors.

The elevating assembly may be supported on the base frame in the working position extending upwardly at the second end of the base frame from the intake of the elevating assembly to the discharge of the elevating assembly. The elevating assembly may further be supported in the stored position extending along the base frame in the longitudinal direction of the base frame from the intake of the elevating assembly at the second end of the frame to the discharge of the elevating assembly. The elevating assembly is preferably operable in the working position to convey the particulate material from the intake to the discharge of the elevating assembly.

The feed conveyor is preferably received within a space between the main conveyor assembly therebelow and the elevating assembly thereabove in the stored position of the elevating assembly and the second position of at least one feed conveyor respectively.

The system may further include a screen member supported on the base frame to span the intake of the elevating assembly such that particulate material must pass through the screen member to enter the elevating assembly from the main conveyor assembly, in which the screen member is supported for vibrating movement relative to the base frame. The screen member may extend from an outer edge to an inner edge at a slope that is oriented downwardly and longitudinally inwardly towards the first end of the base frame in which the inner edge of the screen member comprises a free edge located below the main conveyor for discharging particulate material which cannot pass through the screen member over the inner edge of the screen member.

The elevating assembly may comprise a gravity discharge spout operatively connected to the discharge of the elevating assembly and at least one spout actuator acting between the gravity discharge spout and a main frame of the elevating assembly such that the gravity discharge spout is repositionable in elevation relative to the main frame under control of said at least one spout actuator.

The spout actuator may include a pivot actuator in which the gravity discharge spout is pivotal relative to the main frame in the working position of the elevating assembly about an upright pivot axis under control of the pivot actuator. In one embodiment, the pivot actuator comprises a linear actuator arranged to slidably displace a rack member relative to a main frame of elevating assembly and a gear member coupled to the spout to pivot with the spout about the upright pivot axis in which the gear member is in meshing engagement with the rack member to pivot the spout as the pivot actuator is extended and retracted.

The spout actuator may also include a tilt actuator in which the gravity discharge spout is tiltable relative to the main frame in the working position of the elevating assembly about a horizontal tilt axis under control of the tilt actuator. Preferably the spout is pivotal into a stored position extending alongside the main frame of the elevating assembly in the stored position of the elevating assembly.

The spout actuator may further include an extension actuator in which the gravity discharge spout is telescopically extendable in length under control of the extension actuator.

The system may further include two outrigger frames supported on laterally opposing sides of the elevating assembly in the working position of the elevating assembly in which each outrigger frame in a working position thereof includes an upper frame portion extending laterally outwardly from the elevating assembly at an elevated location spaced above the base frame and an outer frame portion depending downwardly from the upper frame portion at a location spaced laterally outwardly from the base frame so as to define a vehicle access opening that spans laterally between the base frame and the outer frame portion and that spans vertically between the upper frame portion and a ground surface upon which the based frame is engaged. The vehicle access opening is preferably sized so as to be arranged to receive the transport vehicle passing therethrough in the longitudinal direction of the base frame.

Each outrigger frame may be pivotally coupled to a main frame of the elevating assembly so as to be foldable relative to the main frame from the working position to a stored position thereof in which the outer frame portion extends alongside the main frame. Each outrigger frame preferably further comprises a fold actuator operatively connected to the upper frame portion so as to be arranged to fold the outrigger frame between the working position and the stored position thereof under action of the fold actuator.

When the elevating assembly is supported on the base frame so as to be pivotal about an elevator fold axis between the working position and the stored position, the outrigger frames may be supported on the main frame of the elevating assembly at a location which is longitudinally outward relative to the elevator fold axis so as not to interfere with pivotal movement of the elevating assembly between the working position and the stored position thereof while the outrigger frames remain in the working position thereof.

The elevating assembly in the illustrated embodiment comprises a first bucket elevator and a second bucket elevator extending alongside one another along a common main frame of the elevating assembly in which each bucket elevator is operable to elevate the particulate material from the intake to the discharge of the elevating assembly in the working position of the elevating assembly.

When the elevating assembly further comprises a first gravity discharge spout and a second gravity discharge spout connected to the first bucket elevator and the second bucket elevator respectively, the first and second gravity discharge spouts are repositionable relative to the main frame of the elevating assembly independently of one another.

The base frame according to the illustrated embodiment comprises a skid base which is transportable on roads using skid handling equipment.

When used in combination with a silo receiving particulate material from the portable conveyor system, the portable conveyor system may further comprise a bin sensor arranged to monitor a level of particulate material in the silo and a controller operatively connected to at least one of the main conveyor assembly and said at least one feed conveyor to cease operation thereof in response to the monitored level exceeding a prescribed upper limit.

The system may further include at least one vehicle sensor supported on the portable conveyor system so as to be arranged to detect movement of a transport vehicle in the longitudinal direction alongside the base frame and a controller operatively connected to said at least one feed conveyor so as to be arranged to displace said at least one feed conveyor into the second position in response to the detection of movement by the vehicle sensor.

There may be provided a guard rail member supported on the base frame so as to be movable between a stored position extending along a boundary of the base frame and a working position protruding from the boundary of the base frame in the longitudinal direction beyond one end of the base frame.

The base frame may be used in combination with a platform comprising a plurality of structural beams spanning in a longitudinal direction of the platform, in which the platform is rigidly connected to the base frame so as to be oriented transversely to the longitudinal direction of the base frame and such that the structural beams protrude laterally outwardly from opposing sides of the base frame so as to define outrigger members relative to the elevating assembly. The base frame is preferably readily separable from the platform for transport.

When a portion of the base frame is supported upon the platform, the platform may further comprise a plurality of rigid link members coupled between the platform and the base frame at longitudinally and laterally spaced apart positions, in which each rigid link member is adjustable in length.

The outrigger members are preferably adapted to receive transport vehicles driving over the outrigger members.

The platform preferably further includes a cable passage spanning a length of each outrigger member so as to receive transmitting cables therein at a location recessed relative to an upper supporting surface of each outrigger member and a plurality of cover members supported over each cable passage so as to be substantially flush with the upper supporting surface of the outrigger members and so as to be readily removable for accessing the cable passage.

A guard rail member may be rigidly connected to each outrigger member so as to extend alongside the base frame in the longitudinal direction of the base frame.

The portable system may also comprise a plurality of lifting legs supported on the base frame in which the lifting legs are actuatable between a retracted configuration above a bottom side of the base frame and a lifting configuration extended below the bottom side of the base frame so as to support the base frame spaced above the ground. Each lifting leg may be movable relative to the base frame while remaining in the retracted configuration between a storage position directly adjacent laterally opposing sides of the base frame and a working position spaced laterally outwardly from the opposing sides of the base frame. Preferably each lifting leg is pivotal relative to the base frame about a respective upright axis between the storage position and the working position.

Preferably the feed conveyor is arranged to protrude laterally outward from the base frame beyond the lifting legs in the working position of the lifting legs.

When the main conveyor assembly comprising a first main conveyor and a second main conveyor extending alongside one another and being operable to independent convey particulate material from the first end to the second end of the base frame, each feed conveyor is preferably operable between a first configuration arranged to convey material in a conveying direction of the feed conveyor from a first side of the base frame into the first main conveyor in transverse relation to the first main conveyor and a second configuration arranged to convey material in the conveying direction of the feed conveyor from the first side of the base frame into the second main conveyor in transverse relation to the second main conveyor. Preferably the feed conveyor is movable in said conveying direction of the feed conveyor between the first configuration and the second configuration.

When the feed conveyor includes a discharge spout, the discharge spout may be pivotal about a horizontal pivot axis between a first angular orientation in the first configuration of the feed conveyor and a second angular orientation different than the first angular orientation in the second configuration of the feed conveyor.

The system may further include a modular frame adapted to be selectively mounted longitudinally in series with the base frame so as to extend the base frame in length in the longitudinal direction. In this instance, the main conveyor is preferably supported on both the base frame and the modular frame to convey material longitudinally along both the modular frame and base frame. Also, in this instance, feed conveyor is preferably supported on base frame so as to be longitudinally slidable from the base frame to the modular frame while being arranged to discharge material onto the main conveyor from either one of the base frame or the modular frame.

The main conveyor assembly may be supported on the base frame so as to be movable relative to the base frame between a normal working position at a first elevation and an elevated position spaced above the normal working position for accessing an area below the main conveyor assembly. When the main conveyor assembly is supported on a conveyor frame, the conveyor frame may be pivotally coupled to the base frame in proximity to the second end of the base frame such that the conveyor frame is pivotal relative to the base frame between the normal working position and the elevated position.

The base frame may cooperate with one or more wheel assemblies which are operable between a working position supporting the base frame thereon spaced above the ground for rolling movement along the ground on wheels of the one or more wheel assemblies and a stored position in which the base frame can be supported on the ground, in which the base frame defines a longitudinal extending structural frame of a trailer when the one or more wheel assemblies are supported on the base frame in the working position thereof.

Each feed conveyor may comprise a carriage frame having rollers supported for rolling movement along corresponding rails on the base frame, in which the rollers of the carriage frame are readily separable with the feed conveyor from the rails on the base frame such that the feed conveyor is interchangeable with another feed conveyor of identical configuration.

A belt scale may be provided in associated with one of the feed conveyors or one of the main conveyors so as to be arranged to sense a rate of material being conveyed through the system. In this instance, a display may be supported on the base frame arranged to display the sensed rate to an operator of the system.

When used in combination with downstream storage equipment receiving material from the conveyor system, the portable conveyor system may further comprise a sensor arranged to sense a level of material in the downstream storage equipment and a display supported on the base frame arranged to display the sensed level to an operator of the system.

The base frame may further include an access panel supported on the base frame so as to be movable between a working position spanning an access opening in the base frame so as to form part of a dust containment envelope of one of the conveyors of the conveying system and an access position in which the access opening is substantially unobstructed by the access panel. The access panel is preferably formed of a flexible transparent material so as to enable visual inspection of conveyed material through the transparent material of the access panel in the working position thereof. The access panel may be retained on the base frame in the working position using magnetically coupled fasteners.

When each feed conveyor includes a control panel arranged to receive operator input from an operator for controlling operation of the feed conveyor, the control panel may be supported on the feed conveyor so as to be arranged to be accessible by the operator from either one of two laterally opposing sides of the feed conveyor.

In some embodiments, a cover system is supported above the base frame to span laterally outwardly over an operating area of the at least one feed conveyor.

When the material handling assembly includes an elevating assembly on the base frame having an intake and a discharge at a greater elevation than the intake in a working position for conveying the particulate material upwardly from the intake to the discharge, the cover system may comprise a main support member hingedly engaged with the elevating assembly and a cover extending from the main support member over the at least one feed conveyor.

When the elevating assembly is further supported on the base frame so as to be movable relative to the base frame between the working position and a stored position reduced in elevation relative to the working position, the cover system may further comprise an upright support member connected pivotally connected between the main support member and the base frame at an end of the main support member opposite from the hinged connected of the main support member with the elevating assembly whereby the base frame, the elevating assembly, the main support member and the upright support member define a four bar linkage as the elevating assembly is pivoted between stored position and the working position thereof.

The cover system may further comprise a plurality of roof support members engaged with the cover and extending transversely outward from the main support member towards respective cover support uprights.

The cover system preferably spans laterally outwardly from the base frame over a transport truck receiving passageway that extends longitudinally alongside the base frame so as to be arranged to receive transport trucks passing therethrough beneath the cover system.

The cover system may include a main support member extending in a longitudinal direction of the base frame defining an apex of the cover system, and a pair of side portions extending outward from laterally opposing sides of the main support member over respective transport truck receiving passageways that extend longitudinally along opposing sides of the base frame so as to be arranged to receive transport trucks passing through each of the passageways beneath the cover system.

When the elevating assembly comprises a gravity discharge spout operatively connected to the discharge of the elevating assembly which is pivotally repositionable relative to a main frame of the elevating assembly, the elevating assembly may further comprise a tether member connected between the gravity discharge spout and the main frame of the elevating assembly.

When the elevating assembly comprises a gravity discharge spout operatively connected to the discharge of the elevating assembly which is pivotally repositionable relative to a main frame of the elevating assembly, the gravity discharge spout may include a discharge outlet and an annular mounting flange surrounding the discharge outlet in which the annular mounting flange is pivotal together with the discharge outlet relative to the spout and in which the annular mounting flange is adapted to be mounted to an intake member of the downstream equipment.

When the elevating assembly comprises a gravity discharge spout operatively connected to the discharge of the elevating assembly so as to be pivotal about an upright axis relative to a main frame of the elevating assembly under control of a pivot actuator and so as to be pivotal about a lateral tilt axis relative to the main frame under control of a spout actuator, the spout actuator may be connected to the main frame by a multi-direction ball and socket pivot connection.

When the elevating assembly includes a main frame pivotally coupled to the base frame for pivotal movement between the working position and a stored position in which the discharge is reduced in elevation relative to the working position and a lift actuator which lifts the main frame from the stored position to the working position, the system may further include a mechanical latching member arranged to fix the main frame of the elevating assembly relative to the base frame in the working position independently of the lift actuator.

The material handling assembly may further include one or more surge bins supported on the base frame which may have one or a plurality of compartments so as to receive material discharged from the main conveyor and so as to be arranged to discharge material from the surge bin into the intake of one or a plurality of elevating assemblies.

When the elevator assembly is supported on the base frame so as to be movable relative to the base frame between the working position and a stored position reduced in elevation relative to the working position, the one or more surge bins may be movable together with the elevating assembly relative to the base frame.

The one or more surge bins may also be collapsible.

Preferably the one or more surge bins further comprise a controllable discharge arranged to discharge material from the one or more surge bins at a prescribed discharge rate.

The elevating assembly may further comprise a bucket elevator operatively received within an elevator housing, an intake opening in the elevator housing at the intake of the elevating assembly, an intake chute protruding outwardly from the elevator housing about the intake opening which is sloped downwardly and inwardly towards the intake opening, and an impingement plate which is supported in an upright orientation directly above the intake opening within the intake chute. In this instance, the main conveyor assembly preferably comprises a main conveyor operable to convey material from a first end to a second end of the main conveyor in which the second end of the main conveyor is supported above the intake chute at greater elevation than the intake opening so as to be arranged to direct conveyed material onto the impingement plate.

The system may comprise a belt scale arranged to sense a rate of material being conveyed by at least one of the main conveyor assembly and said at least one feed conveyor, and a display supported on a main frame of the elevating assembly which is arranged to display the sensed rate to an operator of the system. In this instance, the belt scale may be arranged to sense a rate of material being conveyed by the main conveyor. When used in combination with a level sensor arranged to sense a level of material in said downstream equipment, the display is preferably in communication with the level sensor so as to be arranged to display the level of material.

When the system further includes a belt scale arranged to sense a rate of material being conveyed by at least one of the main conveyor assembly and said at least one feed conveyor, a controller may be arranged to controllably adjust an operating rate of the elevating assembly in response to the rate sensed by the belt scale.

When used in combination with the downstream equipment, the portable conveyor system may further comprise (i) a belt scale arranged to sense a rate of material being conveyed by at least one of the main conveyor assembly and said at least one feed conveyor, and (ii) a controller arranged to controllably adjust an operating characteristic of the downstream equipment in response to the rate sensed by the belt scale.

Although the conveyor system can be used with a variety of different elevating assemblies including inclined belt conveyors, bucket elevators, screw conveyors, sidewall belt elevating conveyors, sandwich conveyors, drag conveyors and the like, in a preferred embodiment, the conveyor system is provided in combination with an elevating assembly, for example a bucket elevator, that is also supported on the base frame so as to be pivotal about elevator fold axis between a working position extending upwardly at the second end of the base frame from the intake of the elevating assembly to the discharge of the elevating assembly and a stored position extending along the base frame in the longitudinal direction of the base frame from the intake of the elevating assembly at the second end of the frame to the discharge of the elevating assembly.

The feed conveyors are preferably repositionable by being swingable relative to the base frame, extendable relative to the base frame, and longitudinally repositionable along the base frame for alignment with a variety of different discharge gates of different transport vehicles. The swinging piece means that for many truck configurations, the conveyor can just swing between two discharges of the trailer without repositioning the location of the discharge of the truck unloader. An operator could also slide the truck unloader along the conveyor feeding the elevating assembly, enabling the vehicle to dump at any location along the main conveyor. The longitudinal repositioning can be accomplished with novel rolling tracks which remove friction of metal-on-metal permitting it to be easily rolled. Other mechanical systems may be contemplated for repositioning the feed conveyors relative to the base frame.

Use of a reconfigurable shroud can be provided on the base frame to enclose the main conveyor assembly while enabling an access opening for communication of a feed conveyor therethrough to be repositionable with the feed conveyor. The reconfigurable shroud is understood to include (i) use of separate panels of rigid or fabric layers that are joined or that overlap and that can be repositioned relative to one another, (ii) use of flexible materials including accordion-like structures, flexible brushes and/or bristles, (iii) tensioned materials, and the like. This creates unlimited positioning for the truck unloading conveyors to load onto the main conveyor to accommodate different discharge outlet spacings on different transport vehicles, and yet still have the conveyor covered. The shroud is an improvement to many prior art systems which are not covered, because it provides health and safety protection and protects the proppant from shrinkage, contamination or moisture.

Use of a bucket elevator together with the main conveyor assembly and with the repositionable feed conveyors noted above results in a much smaller footprint on site as compared to drive-over loading assemblies or other prior art loading systems which require an inclined conveyor to elevate the material. This results in a reduced cost of pad preparation, and a reduced environmental footprint. Furthermore, none of the existing bottom dump technology can get trucks in close to each other and to the storage system in a manner comparable to the present invention to further reduce cost of pad preparation and environmental footprint.

In preferred embodiments, the portable conveyor system includes two main conveyors along the base frame. When further combined with an elevating assembly comprises two bucket elevators connected to the two main conveyors respectively, this has the advantages of (i) redundancy in the event one of either the main conveyors or one of the bucket elevators is inoperable for maintenance or service; and (ii) industry leading unloading rates within the same compact space as many prior art single unloading systems. The system also allows multiple feed conveyors to be positioned on laterally opposing sides of the base frame to provided redundancy for each truck when unloading two trucks at opposing sides of the frame. All of the above redundancy can be accomplished on a single transportable unit. To accomplish similar high rates of unloading using prior art systems, typically two elevating systems would be required on site, which typically would require that each elevating system has to be placed far from each other and would double the truck roads required to unload into the two independent elevating systems, so that the cost and environmental impacts of expanding the pad would be far greater than according to the present invention.

The system may further include a gravity discharge spout connected each bucket elevator of the elevating assembly, in which the spout is repositionable relative to the main frame of the elevating assembly, and in which the repositioning of two spouts if provided occurs independently of one another. The spouts may be repositioned relative to the frame of the elevating assembly by pivoting about an upright swing axis, tilting about a horizontal tilt axis, and extending by telescoping so that the discharge spout can be readily aligned with a plurality of different types of downstream equipment.

The conveyor system of the present invention also makes use of transport vehicles in a more efficient manner than drive over systems as the truck operator can drive in and park one time. The elevator operator can then (i) position the first conveyor and get it unloading, (ii) while the first compartment is unloading, then operator positions conveyor #2 under another compartment, (iii) as soon as the compartment #1 runs out, the operator cracks open compartment #2 to unload, and (iv) while compartment #2 unloads, the operator will reposition conveyor #1 to another compartment, and repeat the above steps until all compartments are empty. This means that each truck will be unloaded much faster, for example 6-10 minutes faster than a drive over system. This results in (i) decreased cost of freight, (ii) improved utilization of trucks and the personnel, (iii) decreased congestion onsite, which improves safety, (iv) no ramps to drive over to avoid safety risks associated with ramps including trucks backing up onsite.

The system may be configured so that the feed conveyors can move themselves out of the way automatically upon completion of an unloading operation in the case that the truck starts moving and the conveyor is not yet swung out of the way. The system in this instance may include at least one vehicle sensor supported on the portable conveyor system so as to be arranged to detect movement of a transport vehicle in the longitudinal direction alongside the base frame and a controller operatively connected to said at least one feed conveyor so as to be arranged to displace said at least one feed conveyor into the second position in response to the detection of movement by the vehicle sensor. The conveyor system can also incorporate a screening element to yet further decrease contamination from debris, however, a considerable degree of contamination is already eliminated by not requiring a drive over assembly.

BRIEF DESCRIPTION OF THE DRAWINGS

Some embodiments of the invention will now be described in conjunction with the accompanying drawings in which:

FIG. 28 is a perspective view of the portable conveyor system according to the embodiment of FIG. 25, in which the cover system has been partially disassembled;

FIG. 29 is a cross sectional view of the portable conveyor system along the line 29-29 in FIG. 28;

FIG. 32 is a perspective view of an upper portion of the elevating assembly in the portable conveyor system according to the embodiment of FIG. 25;

FIG. 33 is a perspective view of the discharge outlet housing of one of the discharge spouts in the portable conveyor system according to the embodiment of FIG. 25;

In the drawings like characters of reference indicate corresponding parts in the different figures.

DETAILED DESCRIPTION

Figure 1:
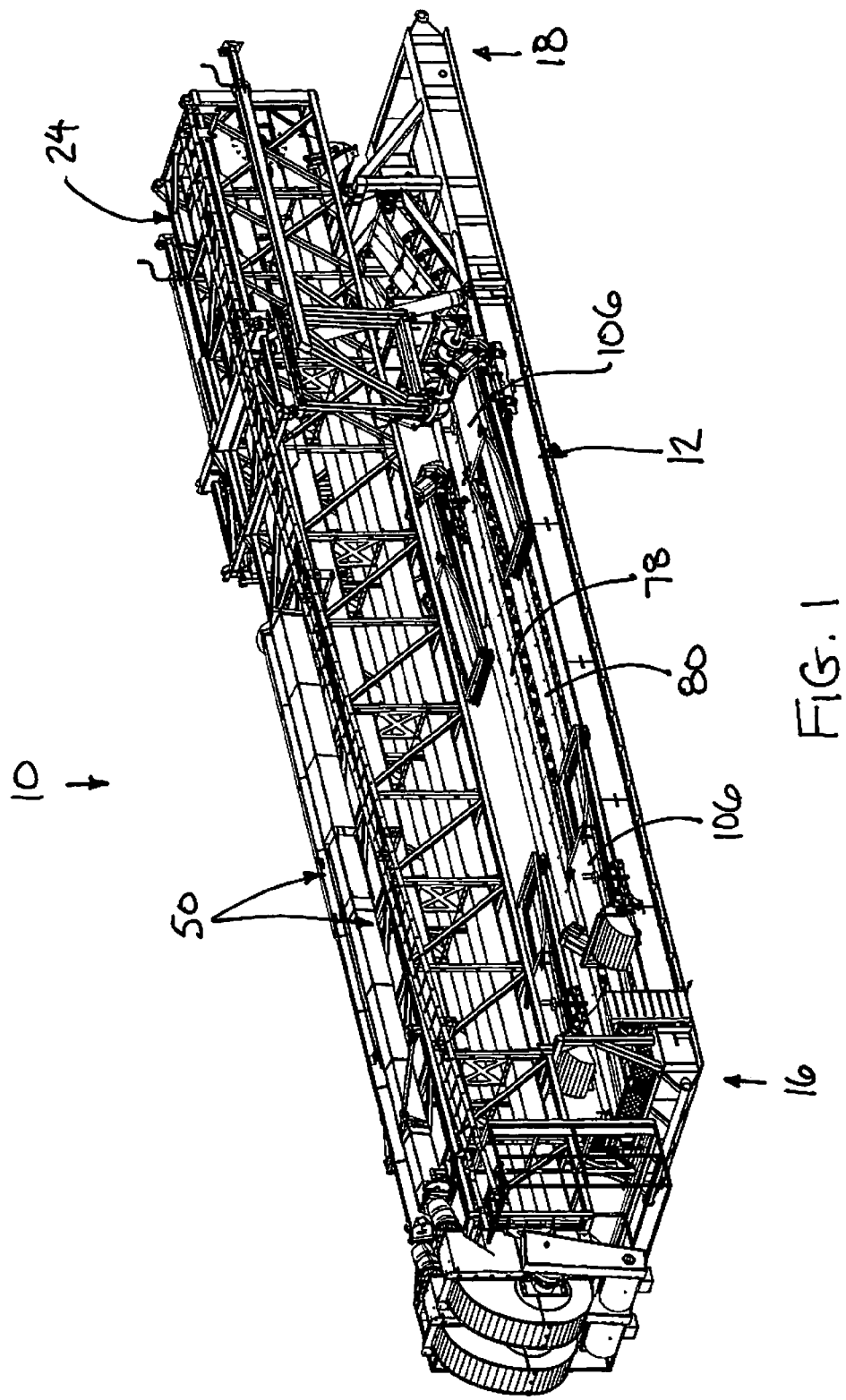
FIG. 1 is a perspective view of the portable conveyor assembly according to a first embodiment showing a top side of the assembly in a transport mode.
Figure 3:
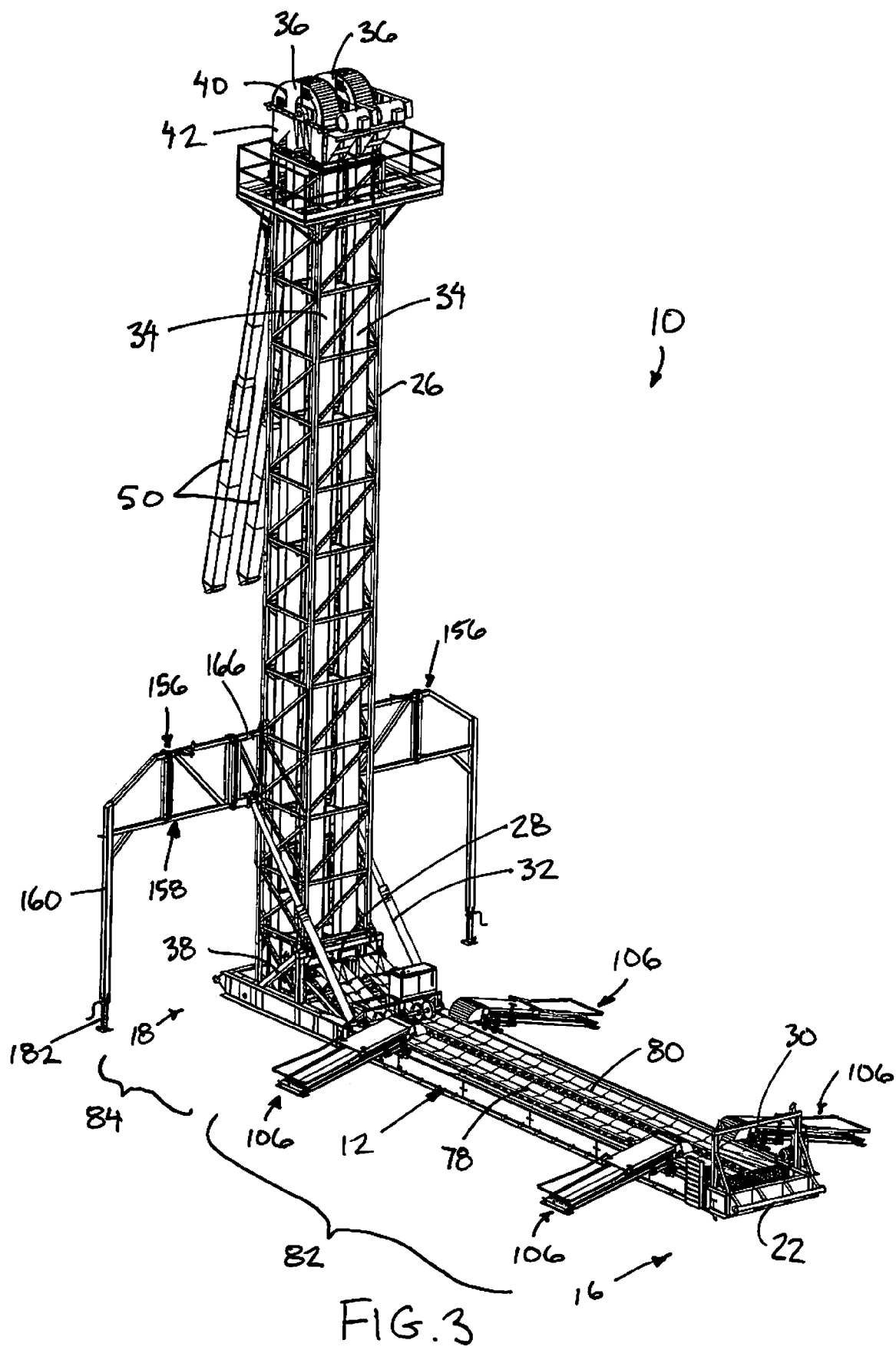
FIG. 3 is a perspective view of the portable conveyor assembly according to the first embodiment of FIG. 1 showing a top side of the assembly in a deployed mode.
Figure 4:
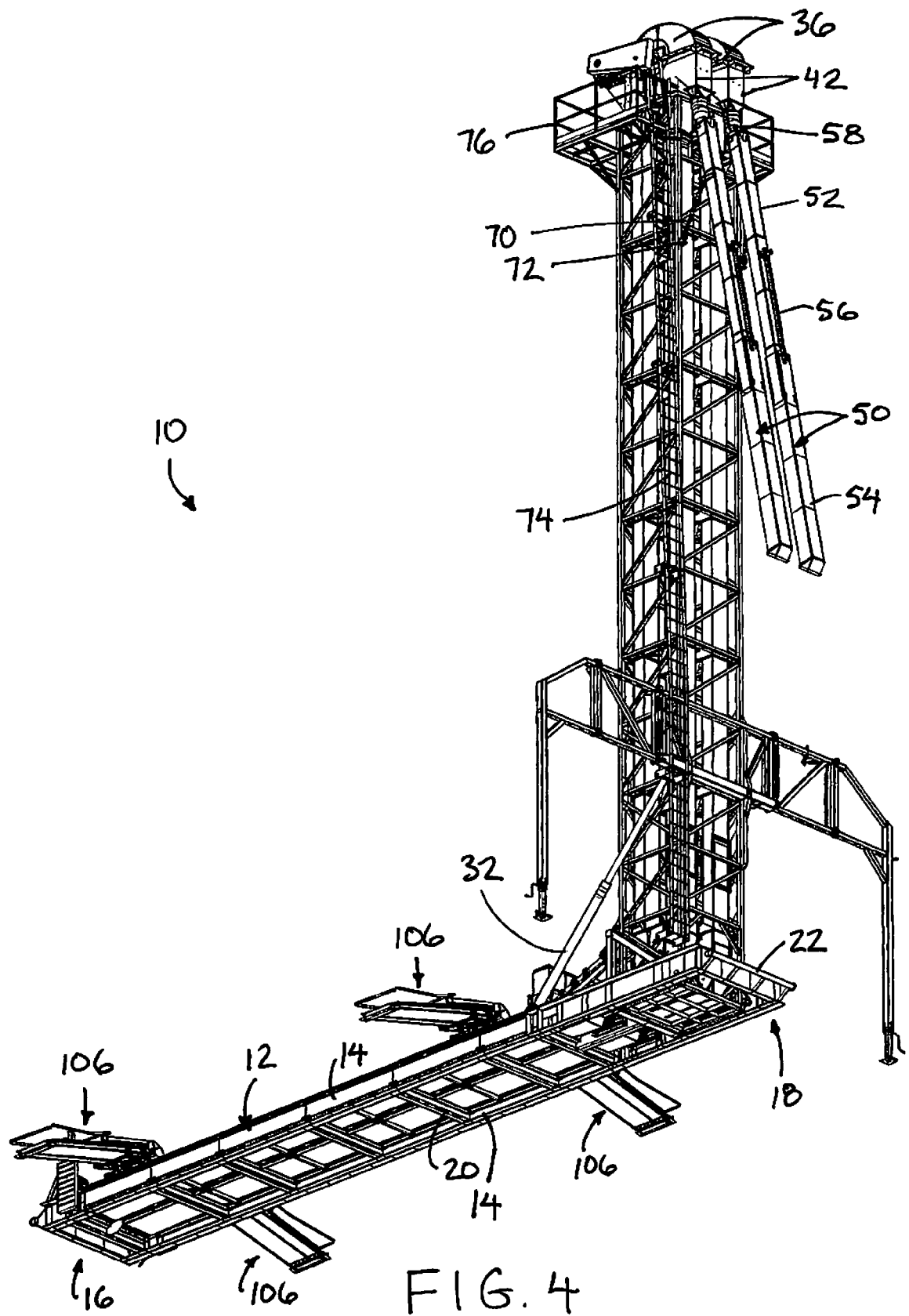
FIG. 4 is another perspective view of the portable conveyor assembly according to the first embodiment of FIG. 1 showing a bottom side of the assembly in a deployed mode.
Figure 5:
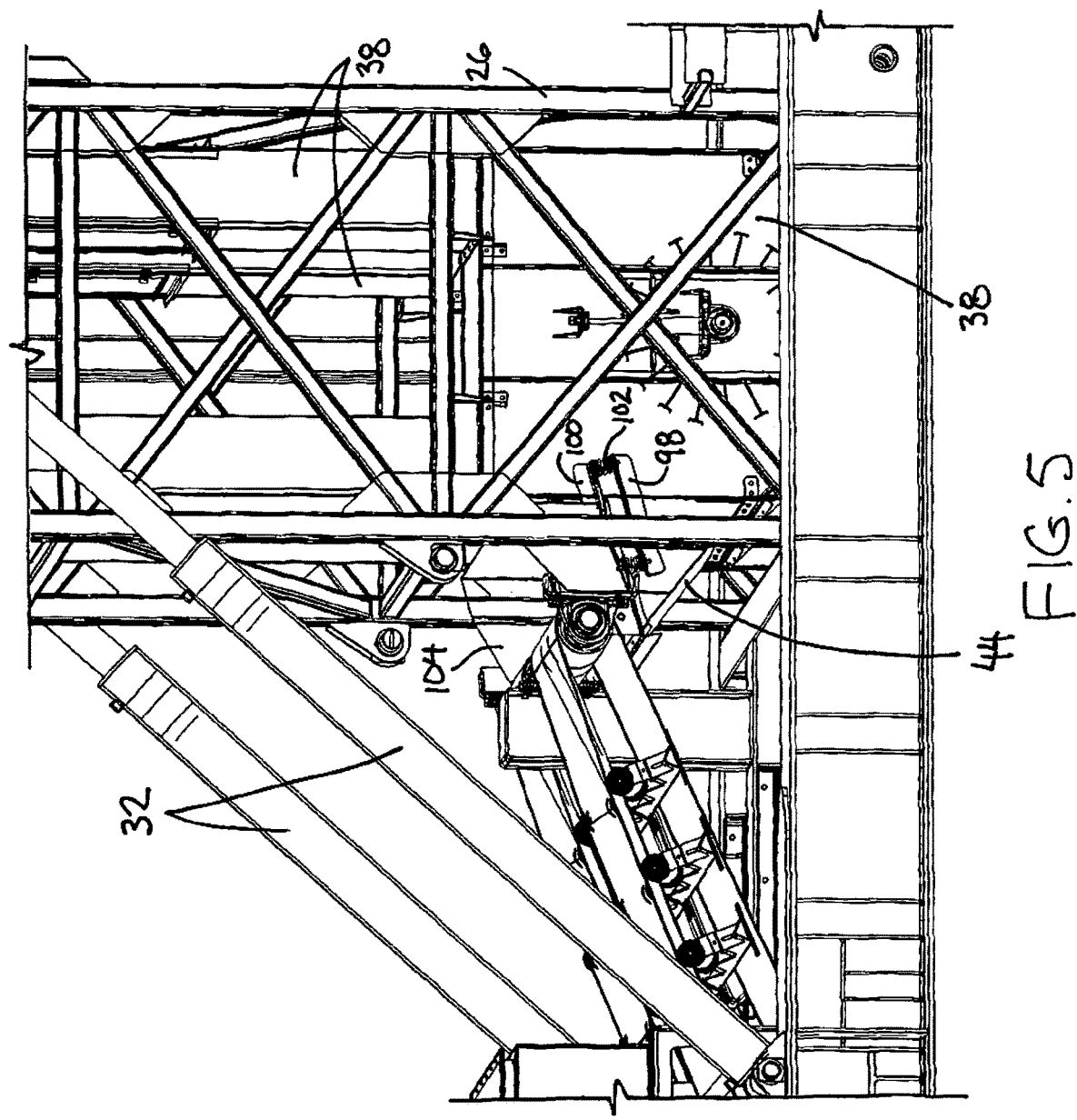
FIG. 5 is a perspective view of the intake end of the elevating assembly according to the first embodiment of FIG. 1 with some components shown removed for illustrative purposes.
Figure 6:
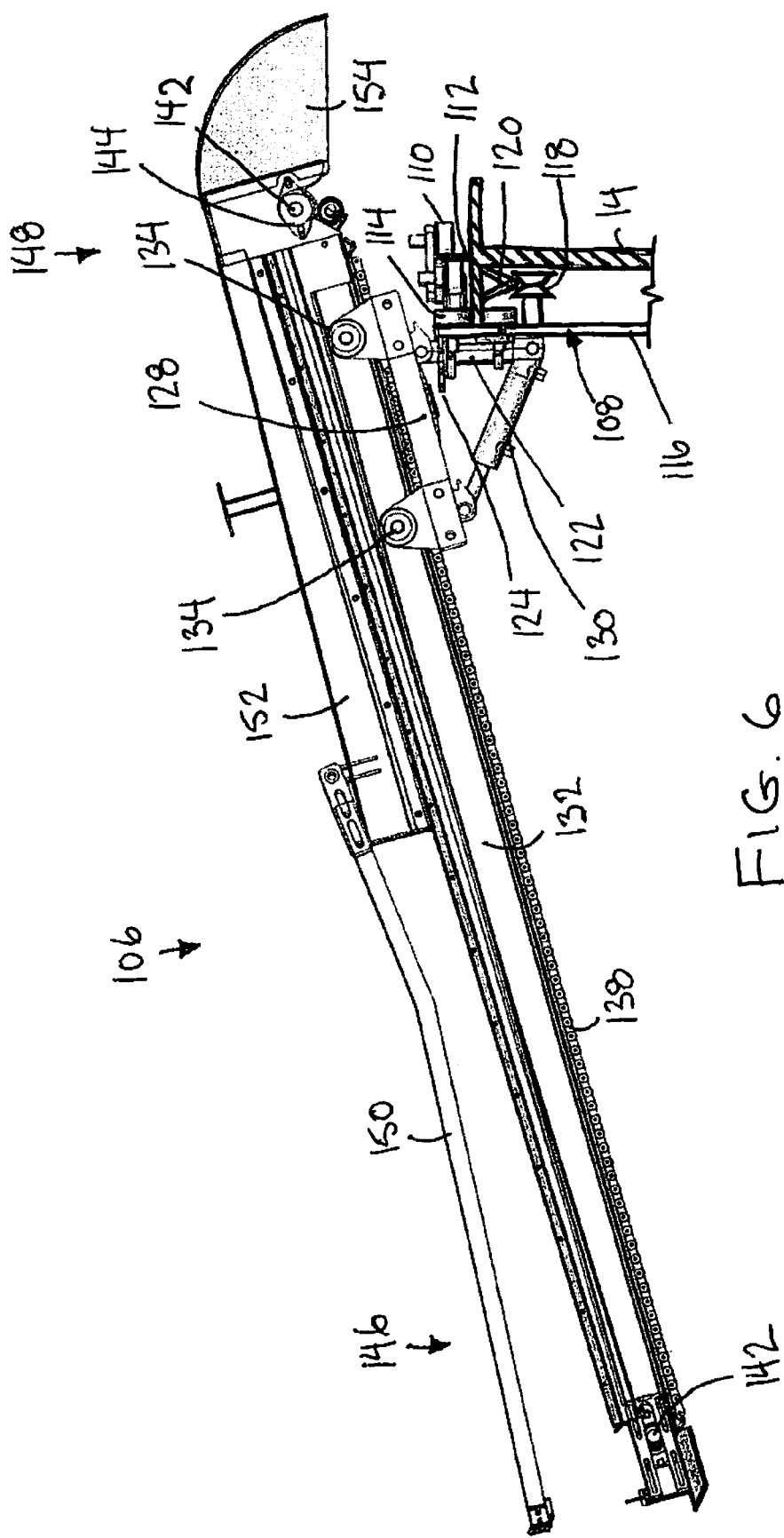
FIG. 6 is a side elevational view of one of the feed conveyors shown separated from the base frame according to the first embodiment of FIG. 1.
Figure 7:
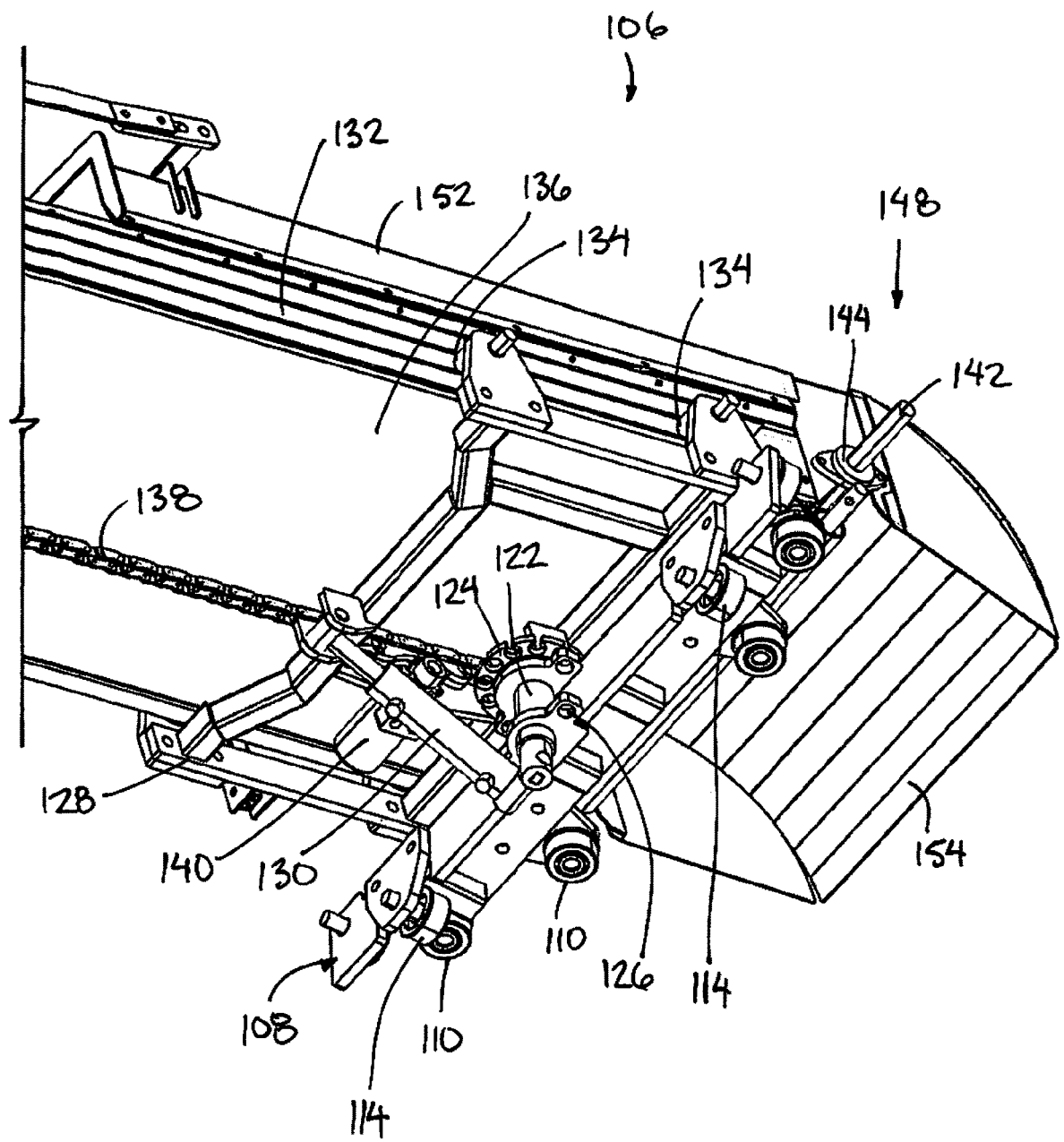
FIG. 7 is a perspective view of a bottom side of the feed conveyor according to the first embodiment of FIG. 1.
Figure 8:
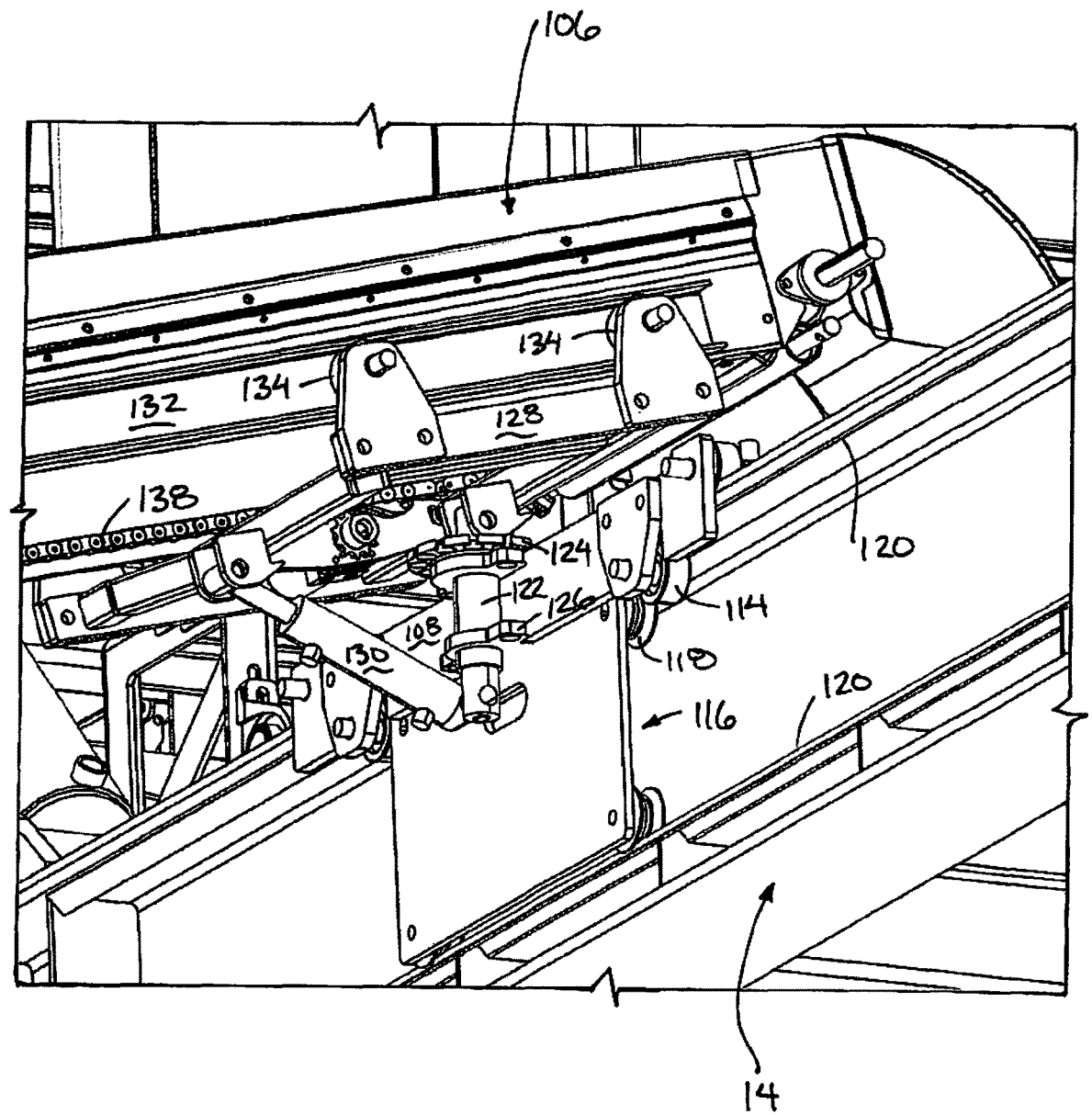
FIG. 8 is a perspective view of one of the feed conveyors supported for sliding on the base frame according to the first embodiment of FIG. 1.
Figure 9:
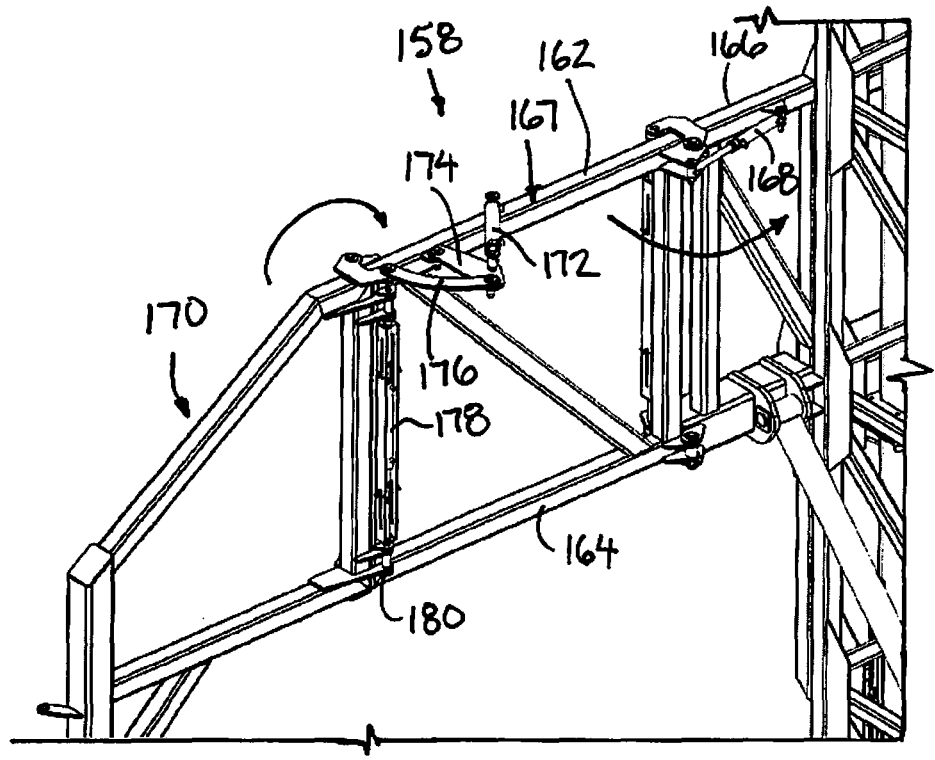
FIG. 9 is a perspective view of the front side of the upper frame portion of one of the outriggers in a working position according to the first embodiment of FIG. 1.
Figure 10:
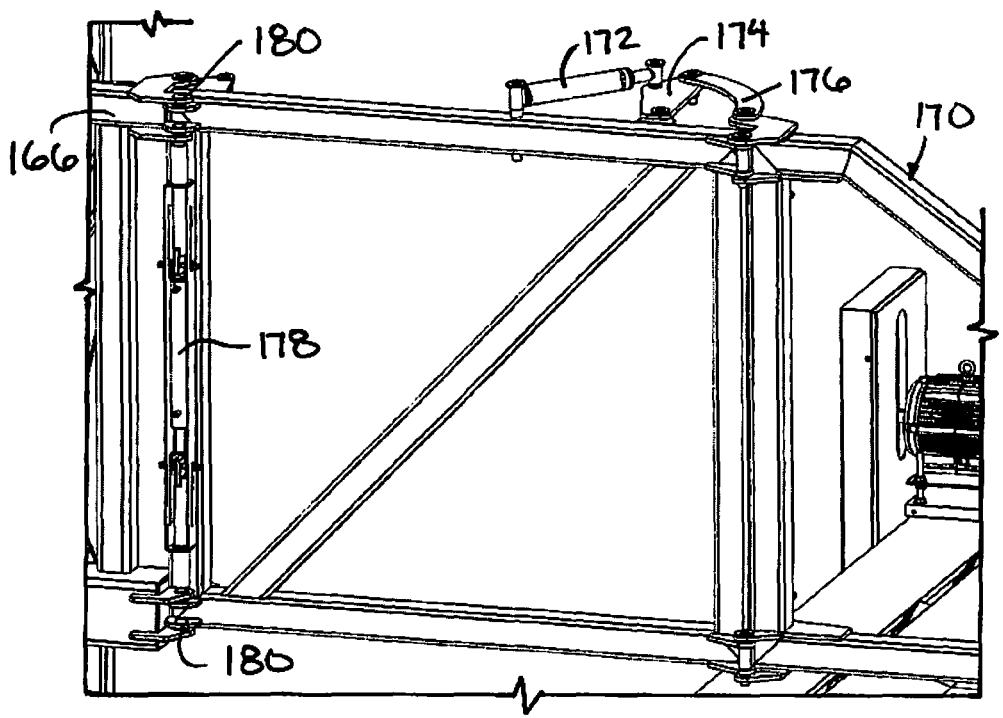
FIG. 10 is a perspective view of the rear side of the upper frame portion of FIG. 9 according to the first embodiment of FIG. 1.
Figure 11:
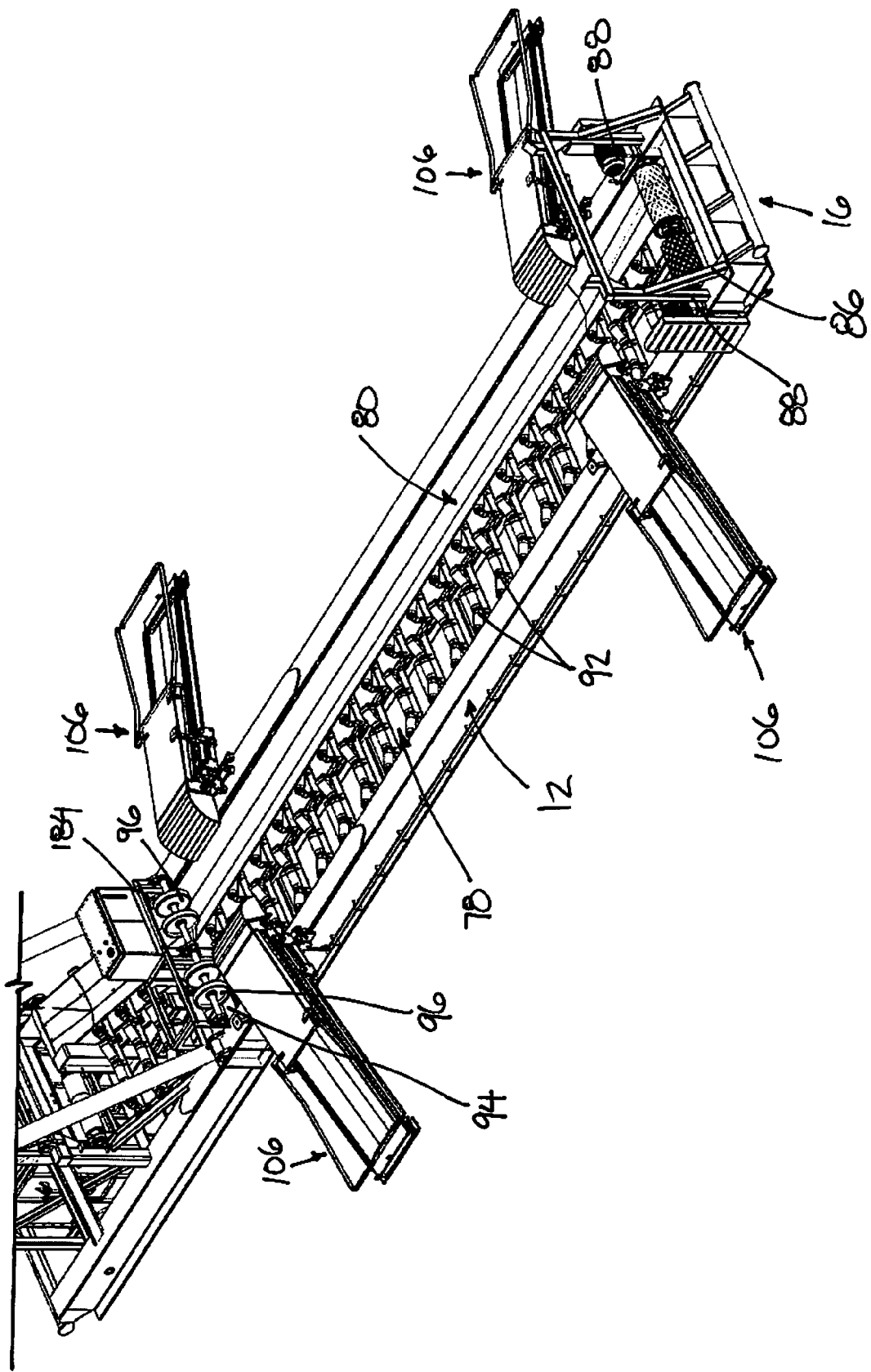
FIG. 11 is a perspective view of the main conveyor assembly according to the first embodiment of FIG. 1 in which one of the main conveyor belts is shown removed for illustrative purposes.

Referring to the accompanying figures, there is illustrated a portable conveyor system generally indicated by reference numeral 10. The conveyor system 10 is particularly suited for receiving particulate material discharged from the bottom discharge gate of a transport vehicle and for conveying the particulate material to downstream equipment such as an upright silo or other suitable storage container, typically at an elevated location such as the intake opening of the upright silo or storage container.

The portable conveyor system 10 according to the present invention typically includes a base frame that includes one or more feed conveyors that are movable relative to the base frame to receive the particulate material from the transport vehicles and a material handling assembly on the base frame for conveying the particulate material from the feed conveyors to the downstream equipment. In the illustrated embodiments the material handling assembly includes both (i) a main conveyor assembly, for example a belt conveyor, for conveying the particulate material longitudinally along the base frame from the feed conveyors and (ii) an elevating assembly, for example a bucket elevator, for receiving the particulate material from main conveyor assembly to elevate the particulate material to the elevated discharge location of the material handling assembly.

In further embodiments, the material handling assembly of the portable conveyor system may comprise only a main conveyor assembly for receiving material directly from the feed conveyors to convey the material longitudinally along the base frame for discharging the material directly into downstream equipment. For example, the main conveyor assembly in this instance may be an inclined belt conveyor which simultaneously conveys the material longitudinally and elevates the material to an elevated discharge location. The feed conveyors remain movable relative to the base frame for alignment with the discharge of transport equipment in this instance.

In further embodiments, the material handling assembly may comprise only an elevating assembly on the base frame, which receives the material directly from the feed conveyors to elevate the material to the elevated discharge location.

Although various embodiments of the system 10 are illustrated in the accompanying figures, the features in common with the main illustrated embodiments of FIG. 1, FIG. 15, and FIG. 25 will first be described. Additional optional features are further described in FIGS. 14, and 21 to 24 and 34 to 38 which may be incorporated into either of the main illustrated embodiments of FIGS. 1, 15 and 25.

Figure 15:
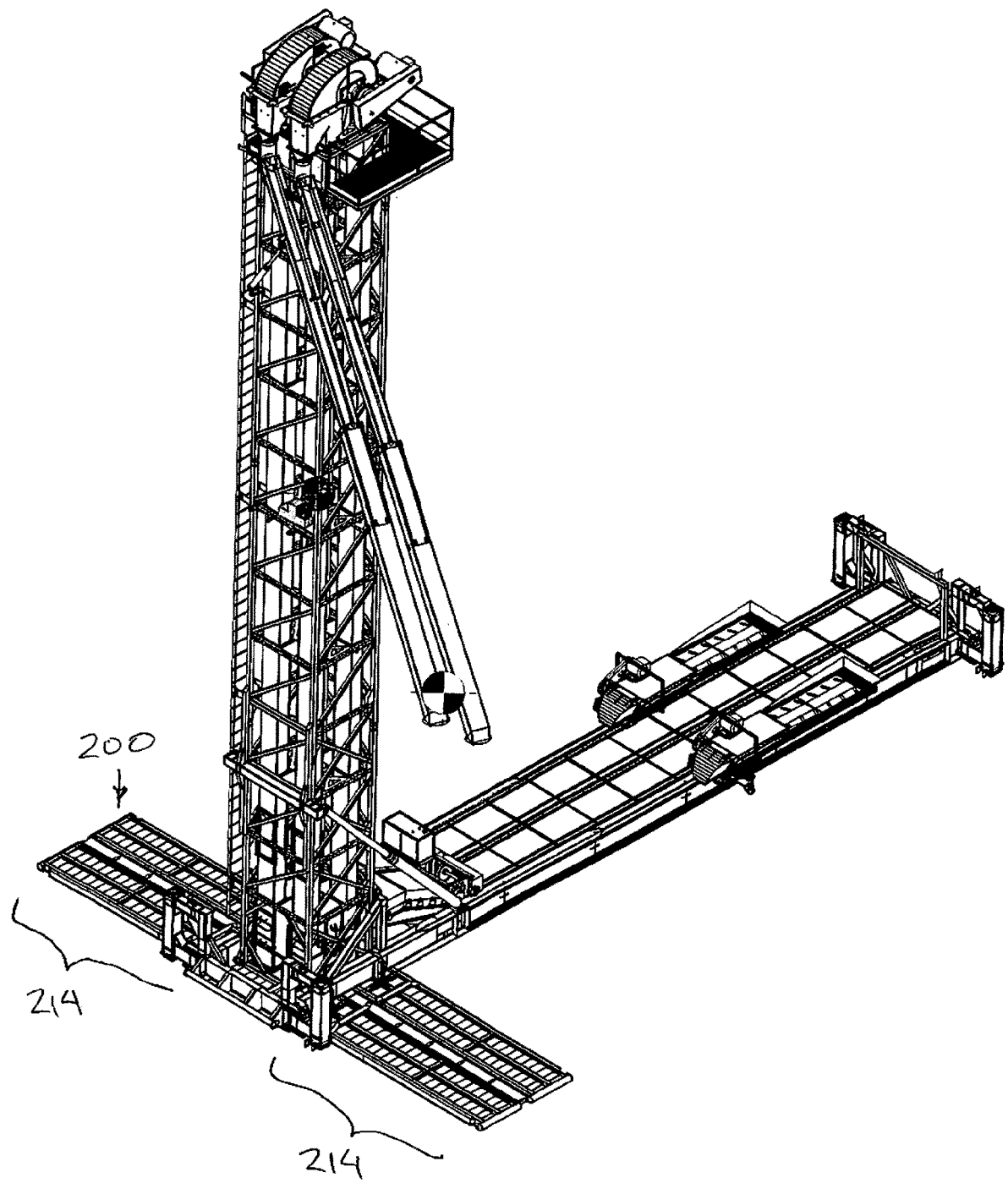
FIG. 15 is a perspective view of a second embodiment of the portable conveyor system according to the present invention.
Figure 16:
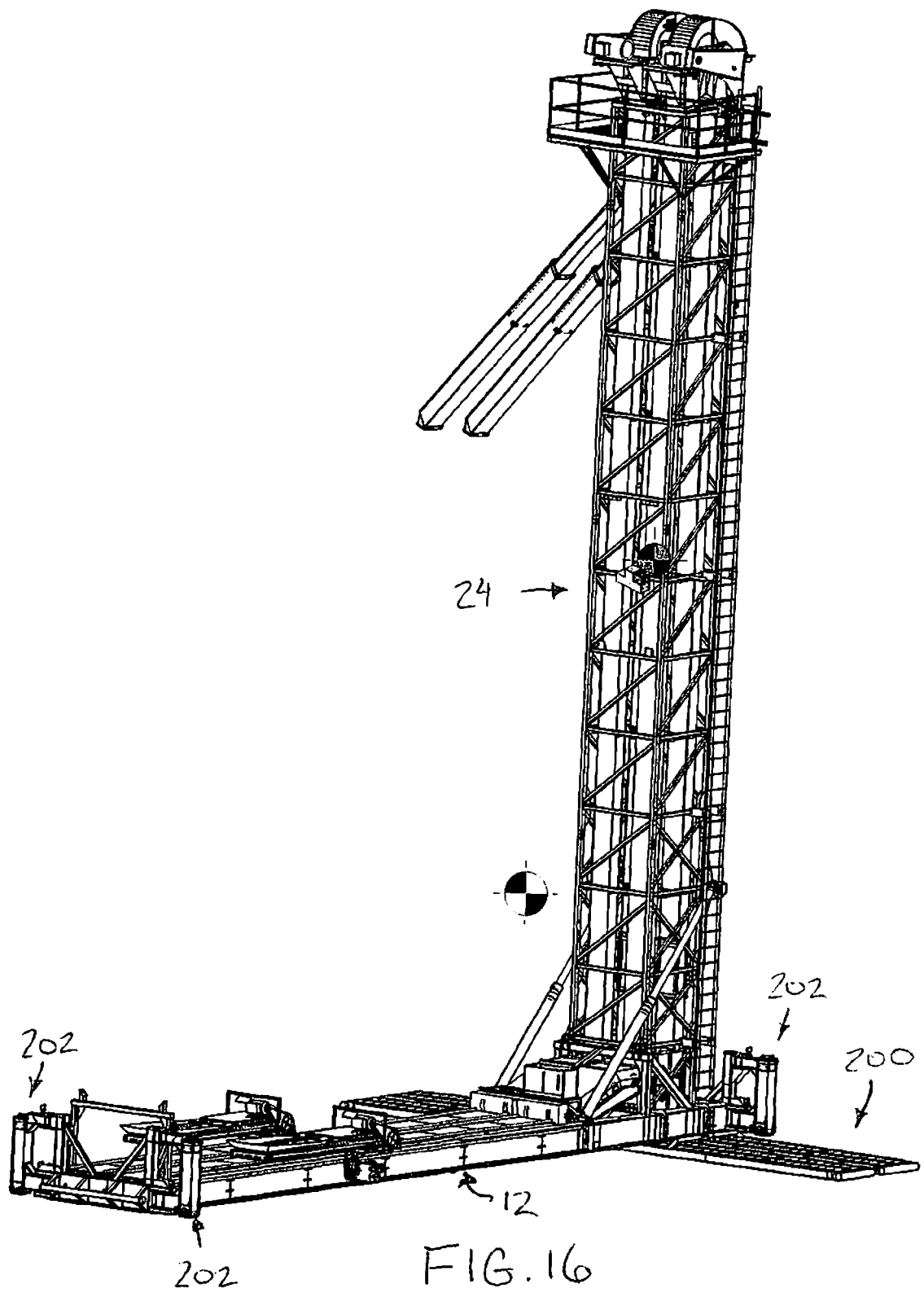
FIG. 16 is another perspective view of the portable conveyor system according to the second embodiment of FIG. 15.
Figure 17:
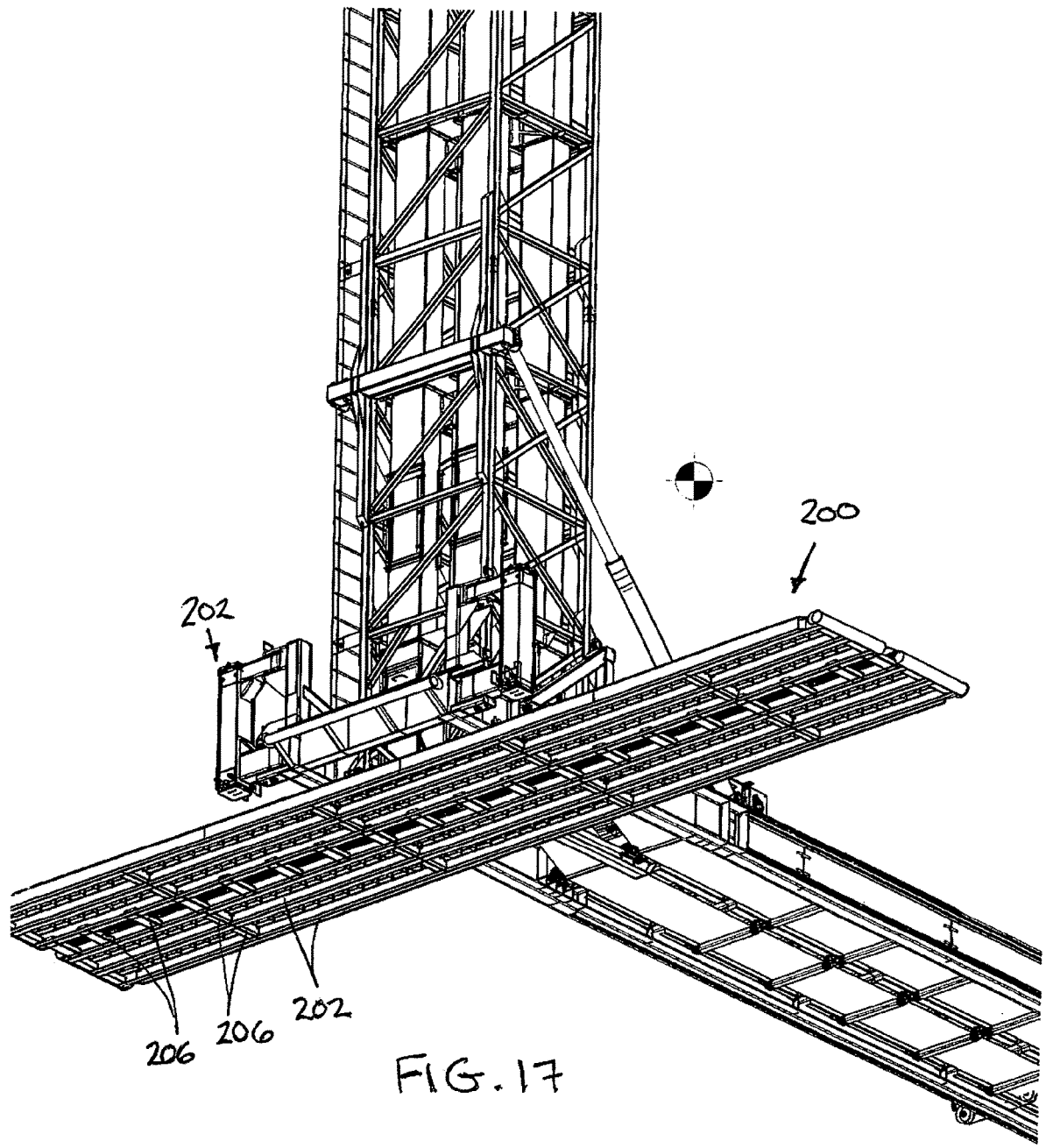
FIG. 17 is a perspective view of a bottom side of the platform of the portable conveyor system according to the second embodiment of FIG. 15.

In each of the illustrated embodiments of FIGS. 1 and 15, the system 10 is supported on a base frame 12 comprising a skid base suitable for transport for example with skid handling equipment such as a winch truck or lifts which allow a trailer to be inserted beneath the lifted base frame to load for transport. The base frame includes two main beams 14 spanning longitudinally the full length of the base frame in the longitudinal direction at laterally opposing sides between a first end 16 and an opposing second end 18 of the frame. Each main beam comprises an I-beam including a top flange, a bottom flange and a web spanning vertically between the top and bottom flanges. A plurality of lateral beams 20 are connected in the lateral direction between the two main beams. Crossbars 22 are provided at longitudinally opposing ends to span the full width of the base frame. The crossbars are suitable for receiving the hook of a winch when pulling the base frame onto a winch truck for instance.

An elevating assembly 24 is pivotally coupled adjacent the second end 18 of the base frame so as to be pivotal between a working position and a stored position. In the working position, the elevating assembly extends generally vertically from an intake end which is substantially flush with the bottom side of the base frame to an opposing discharge end at the top end of the assembly. In the stored position, the elevating assembly extends generally horizontally in the longitudinal direction from the second end towards the first end of the base frame so as to be parallel to the base frame at a location spaced thereabove while protruding longitudinally beyond the first end of the base frame at the discharge end of the elevating assembly.

The elevating assembly includes a main frame 26 comprised of four corner posts arranged in a rectangular relationship in which the posts span the full height of the assembly in the working position. A plurality of interconnecting crossbars and struts are connected between the four corner posts to define a tower structure which is elongate in a longitudinal direction of the elevating assembly from the intake end to the discharge end thereof.

The main frame 26 is pivotally connected to the base frame by a lateral beam 28 supported on the base frame at a location which is perpendicular to the longitudinal direction and spaced above the two main beams 14. The lateral beam is connected to the main beams 14 of the base frame at opposing ends of the lateral beam by respective posts connected therebetween which are further supported by angled braces providing some support to the lateral beam in the longitudinal direction relative to the base frame. The lateral beam is nearer to the second end of the base frame than the first end while remaining spaced inwardly in the longitudinal direction from the second end of the base frame by a distance corresponding approximately to the longitudinal footprint of the elevating assembly in the working position such that the elevating assembly can be received rearwardly of the lateral beam between the lateral beam and the second end of the base frame in the working position with the lateral beam spanning across the front side of the main frame of the elevating assembly.

A pair of pivots are coupled between the lateral beam and respective posts of the main frame 26 of the elevating assembly to pivotally couple the main frame 26 relative to the base frame about a common lateral pivot axis of the elevating assembly about which the main frame 26 is pivotal between the working and stored positions of the elevating assembly.

A cradle frame 30 is provided at the first end of the base frame in the form of a lateral beam spanning between respective posts extending upwardly from the main beams 14 of the base frame respectively such that the lateral beam of the cradle frame 30 lies in a common horizontal plane with the lateral beam 28 at the second end of the base frame. The cradle frame 30 supports the main frame of the elevating assembly engaged thereon in the stored position of the elevating assembly.

Two lift actuators 32 are provided for pivoting the main frame 26 of the elevating assembly between the working and stored positions thereof. Each lift actuator comprises a hydraulic piston cylinder including a first end pivotally coupled to a respective one of the main beams of the base frame at a location spaced forwardly towards the first end of the base frame from the rear lateral beam 28 and a second end pivotally coupled at the rear of the main frame 26 of the elevating assembly such that the two lift actuators span across laterally opposing sides of the elevating assembly at an upward and rearward incline in the working position, but at an upward and slight forward incline in the stored position. Extending the lift actuators 32 will pivot the elevating assembly from the stored position to the working position.

The elevating assembly 24 includes first and second bucket elevators 34 contained within the framework of the main frame 26 such that the bucket elevators extend alongside one another for independently conveying particulate material in the conventional manner of a bucket elevator from the intake end to the discharge end of the elevating assembly. More particularly each bucket elevator includes a front duct and a rear duct receiving front and rear runs of a respective endless loop of buckets (not shown) which are received internally within the ducts in the conventional manner.

The front and rear ducts of each bucket elevator are connected to one another at the top discharge end of the elevating assembly by a discharge housing 36 receiving the upper connecting portion of the respective endless loop of buckets therethrough at the discharge location of the buckets. Similarly, the front and rear ducts of each bucket elevator are connected to one another at the bottom intake end of the elevating assembly by an intake housing 38 receiving lower connecting portions of the respective endless loop of buckets therethrough at the loading location of the buckets.

A motor 40 is provided at each discharge housing 36 in operative connection to the respective endless loop of buckets of the respective bucket elevator for driving the rotation of the buckets within the respective ducts. At the discharge housing, the buckets are inverted in alignment with a discharge chute 42 having a bottom opening from which the elevated materials are discharged.

The intake housing 38 is located at the bottom end of the elevating assembly in the working position and includes an intake chute 44 protruding longitudinally forwardly beyond the lateral beam 28 towards the first end of the base frame to define an upwardly facing intake opening receiving particulate material therein that is received into the intake housing in a manner which is suitable for collection by the buckets of the bucket elevators 34. More particularly the intake chute 44 includes a bottom wall 46 extending upwardly and forwardly at an incline in the longitudinal direction towards the first end of the base frame and two side walls 48 at laterally opposing sides of the intake chute. A central divider 49 is located internally within the intake chute below the intake opening in which the divider is laterally centred so that the material received on opposing sides of the central divider are redirected towards respective ones of the first and second bucket elevators 34 at laterally opposing sides of the base frame.

The discharge chute 42 of the first and second bucket elevators 34 communicate with respective first and second gravity discharge spouts 50. Each discharge spout 50 includes a first duct 52 and a second duct 54 which are coupled to one another in a telescoping configuration such that the combined length of the first and second ducts which define the overall length of the discharge spout can vary by telescoping the second duct relative to the first duct. An extension actuator 56 is mounted externally on each spout to extend in the longitudinal direction thereof in which the actuator is operatively connected between the first and second ducts such that extension and retraction of the extension actuator 56 varies the length of the spout. The actuators 56 each comprise a hydraulic piston cylinder actuator.

A series of transition collars 58 are mounted in a nesting configuration relative to one another between each discharge chute 42 and the inlet of the respective discharge spout 50. The transition collars can be pivoted relative to one another to maintain a gravity flow communication path therethrough which is flexible from the discharge chute to the respective spout as the spouts are varied in orientation relative to the main frame 26 of the elevating assembly.

The upper end of each first duct 52 is coupled to the main frame 26 by a horizontal pivot shaft 60 defining a horizontal tilt axis of the discharge spout relative to the main frame 26. The pivot shaft 60 is in turn carried at the top end of a vertical shaft 62 defining a vertical swing axis of movement of the respective spout relative to the main frame 26.

To control movement about the vertical swing axis, a gear member 64 is mounted on the vertical shaft 62 for pivotal movement about the swing axis together with the spout and the horizontal pivot shaft 60 of the spout. A suitable rack member 66 with gear teeth thereon is supported in meshing engagement with the gear 64 and is mounted for sliding movement relative to the main frame 26 in a generally lateral direction such that sliding movement of the rack member 66 in the lateral direction causes the gear 64 to pivot about the swing axis which in turn pivots the spout carried on the respective tilt pivot shaft 60 together therewith. A swing actuator 68 in the form of a linear piston cylinder hydraulic actuator is mounted in a generally lateral direction between the rack member 66 and the main frame 26 so that extension and retraction of the swing actuator 68 displaces the rack to in turn control swing motion of the respective spout coupled thereto about the vertical swing axis.

To control tilting motion about the horizontal tilt axis, a tilt actuator 70 is pivotally coupled at a bottom end on a respective vertical pivot 72 in which the bottom vertical pivot is aligned along a common swing axis with the vertical shaft 62 spaced thereabove. The tilt actuator 70 is pivotally coupled at a top end on the first duct of the respective discharge spout 50 such that extension and retraction of the tilt actuator varies the angular orientation of the discharge spout about the horizontal pivot shaft 60 relative to the main frame 26. The tilt actuator 70 is coupled to the respective discharge spout so as to be pivotal together with the discharge spout about the vertical swing axis.

In this manner, each discharge spout is operable from a stored position to a working position thereof. In the stored position the discharge spout extends vertically and parallel along the rear side of the main frame 26 of the elevating assembly in the working position or along the top side of the main frame of the elevating assembly in the stored position thereof. In the working position, the discharge spout can be controlled by the extension actuator 56, the swing actuator 68 and the tilt actuator 70 so that the discharge opening at the bottom discharge end of the spout 50 can be repositioned in a large variety of positions and orientations relative to the main frame 26.

The main frame 26 of the elevating assembly further supports a ladder frame 74 spanning the full height of the elevating assembly from a bottom end in proximity to the base frame to a top end in communication with a walkway 76 extending about the full circumference of the main frame 26 adjacent the discharge end of the elevating assembly. The ladder 74 is positioned adjacent the rear side of the frame of the elevating assembly in a manner which does not interfere with movement of any of the components of the system between the stored and working positions thereof respectively. The walkway 76 is surrounded by suitable guard rails in the usual manner and is located so as to protrude longitudinally beyond the first end of the base frame when the elevating assembly is pivoted into the stored position. Fall protection anchoring locations are provided along the guard rails or generally in proximity to the location of the walkway relative to which fall protection tethers for workers can be secured.

The system 10 further includes a main conveyor assembly for conveying particular material in the longitudinal direction along the base frame from the first end to the elevating assembly 24 at the second end thereof. The main conveyor assembly includes a first main conveyor 78 and a second main conveyor 80 which are substantially identical to one another and which extend alongside one another substantially the full length of the base frame at laterally opposing sides of the base frame.

Each main conveyor comprises an endless conveyor belt supported on rollers such that the conveyor defines a main section 82 where the upper run of the conveyor belt extends generally horizontally along a majority of the length of the base frame from the first end towards the second end thereof and an inclined section 84 where the upper run extends at an upward and rearward incline from the rear of the main section 82 to the discharge end of the conveyor located directly over the intake opening of the intake chute 44 of the elevating assembly in the working position.

The rollers supporting the conveyor belt of each conveyor include a first end roller 86 spanning the full width of the respective conveyor at the first end of the base frame. The first end roller is a large diameter roller spanning the full height between the upper and lower run of the conveyor belt while having an outer surface of material with a high coefficient of friction for suitably gripping the belt to drive rotation of the conveyor belt. A suitable drive motor 88 is operatively connected to each first end roller 86 for operation independent of the other driver roller so that the main conveyors can be operated independently of one another.

Each conveyor further includes a second end roller 90 also spanning the full width of the conveyor, but at the opposing discharge end over the intake opening of the intake chute of the elevating assembly. The second end roller 90 is also a large diameter roller of similar diameter to the first end roller.

A plurality of intermediate roller assemblies 92 of reduced diameter relative to the first and second end rollers are provided at evenly spaced positions in the longitudinal direction across the full length of the upper run of each main conveyor for supporting the upper run of the belt thereon. Each intermediate roller assembly 92 comprises a centre roller, and two side rollers at laterally opposing sides of the centre roller such that the two side rollers extend upwardly and laterally outwardly at opposing inclinations so that the centre roller and the two side rollers collectively define a cradle shape and such that the intermediate roller assemblies 92 collectively support the upper run of the conveyor belt of each conveyor to follow a general trough shape containing particular material on the upper surface thereof as it is conveyed from the first end of the base frame to the discharge end of the conveyor.

At the transition between the main section 82 and the inclined section 84, a lower transition roller 94 is provided about which the lower run of the conveyor belt extends. The lower transition roller is a flat roller spanning the full width of the respective conveyor so that the lower run of each conveyor belt similarly includes an inclined section extending between the second end roller and the lower transition roller and a main section extending between the lower transition roller and the first end roller; however, the inclined and main sections of the lower run support the belt in a generally flat configuration instead of the trough shape of the upper run.

Also at the transition between the main section 82 and the inclined section 84, a pair of upper transition wheels 96 are provided on each conveyor in which the two wheels have a narrow width in the lateral direction and each wheel is aligned at a respective fold in the trough shape of the upper run of the belt corresponding to the junction of the centre roller with a respective one of the side rollers of one of the intermediate roller assemblies therebelow. The transition wheels 96 roll along the top side of the upper run of the conveyor belt of each conveyor to hold the conveyor belt down against the intermediate rollers 92 therebelow to form the bend in the upper run of the conveyor belt between the horizontal main section and the inclined section.

In order to transfer particulate material from the transport trucks onto the main conveyors, a plurality of feed conveyors 106 are provided. In the illustrated embodiment, at least 2 feed conveyors are provided at each of the two laterally opposing sides of the base frame. In this instance the feed conveyors at laterally opposing sides communicate with respective ones of the two main conveyors 78 and 80 at laterally opposing sides of the base frame and the feed conveyors extend laterally outwardly perpendicularly to the longitudinal direction of the base frame in opposing lateral directions in respective working positions thereof. Alternatively, when only operating a single main conveyor on the base frame, the feed conveyors 106 may only be mounted along one side of the base frame to extend in a common lateral direction in the working positions thereof.

Each feed conveyor comprises a roller carriage having a respective roller carriage frame supported for longitudinal sliding or rolling movement in the longitudinal direction along the base frame. Each carriage frame supports a plurality of rollers thereon which engage respective portions of the base frame to adequately support the respective feed conveyor for movement in the longitudinal direction of the base frame. More particularly the carriage frame supports a set of first rollers 110 thereon for rotation about respective upright axes while situating the first rollers directly above the top flange of the main beam 14 at the respective side of the base frame. The first rollers include inner rollers and outer rollers at laterally opposed inner and outer sides of a guide flange 112 oriented in the longitudinal direction of the base frame to protrude upwardly from the top flange thereof and provide the function of a track along the base frame.

The rollers in each carriage frame also include a set of the second rollers 114 including upper and lower rollers for rolling engagement with opposing top and bottom sides of the top flange of the respective side beam 14 of the base frame. To provide yet further support so that the feed conveyors may be supported in a cantilevered relationship protruding from the base frame in the lateral direction, the carriage frame includes a support plate 116 supported at the outer side of the respective beam 14 which supports a set of third rollers 118 thereon in which the third rollers are supported in rolling engagement with respective top and bottom rails 120 fixed onto respective inner surfaces of the top and bottom flanges of the beam 114.

The carriage frame 108 supports a vertical swing shaft 122 thereon defining a vertical swing axis of the respective feed conveyor. A locking plate 124 is carried on the swing shaft 122 for pivotal movement together with the feed conveyor about the swing axis relative to the base frame. A series of lock apertures in the locking plate 24 align with a pin aperture 126 on the carriage frame as the feed conveyor is varied in angular orientation about the swing axis. A suitable spring pin (not shown) is mounted on the carriage frame for cooperation with the pin aperture in which the spring pin is biased into engagement from the pin aperture into a selected aperture in the locking plate 124 to lock the feed conveyor at a selected orientation about the swing axis relative to the base frame. Pulling the pin against the biasing of the spring thereof releases the pin from the locking plate to enable pivoting of the feed conveyor to a new angular position and corresponding alignment of the spring pin with a different aperture in the locking plate 124.

Each feed conveyor 106 further includes a tilt frame 128 which is pivotally coupled to the top end of the swing shaft 122 by a horizontal pivot shaft defining a horizontal tilt axis of the feed conveyor relative to the base frame. A tilt actuator 130 is coupled between the tilt frame 128 and the bottom end of the swing shaft 122 such that the tilt actuator and the tilt frame are pivotal together with the feed conveyor and the swing shaft 122 relative to the carriage frame while maintaining control over the tilt angle by extending and retracting the tilt actuator throughout the range of angular positions about the vertical swing axis.

Each feed conveyor further includes a main frame comprised of two side rails 132 spanning the full length of the conveyor at opposing sides thereof. Suitable structural crossbars are connected laterally between the side rails to form the overall frame of the feed conveyor. Each of the side rails is generally C-shaped in profile in which the open sides of the channels forming the side rails face outwardly and away from one another. In this instance the tilt frame 128 supports two rollers 134 thereon in alignment with each of the side rails 132 such that a set of four rollers in a square relationship relative to one another are supported in rolling engagement along respective ones of the side rails so as to support the main frame of the conveyor for longitudinal sliding movement in the longitudinal direction of the feed conveyor relative to the tilt axis of the tilt frame and the swing axis of the carriage frame upon which the main frame of the feed conveyor is supported.

A bottom pan 136 spans across the bottom side of the main frame of the feed conveyor. A suitable chain defining a rack 138 is fixed onto the bottom of the pan 136 to extend in the longitudinal direction of the feed conveyor along substantially the full length thereof. A hydraulic orbit motor 140 is mounted on the tilt frame 128 with a gear mounted on the rotary output thereof in meshing engagement with the rack 138 such that actuation of the hydraulic motor 140 in two opposing directions of rotation drives longitudinal displacement of the main frame of the feed conveyor in two opposing longitudinal directions along the rollers 134 of the tilt frame to extend and retract the feed conveyor.

Each feed conveyor further comprises an endless belt conveyor supported therein having an upper run and a lower run spanning the full length of the main frame of the conveyor between a pair of end rollers 142 of the conveyor. The upper run may be supported spaced above the lower run by a plurality of intermediate rollers (not shown) or a suitable pan supporting the upper run of the conveyor belt in sliding relationship thereon. A suitable motor 144 is mounted on the main frame of the feed conveyor in operative connection to one of the end rollers 142 to drive rotation of the roller and in turn drive rotation of the conveyor belt of the feed conveyor to convey particulate material thereon from the inlet end 146 to the discharge end 148 of the feed conveyor.

The top side of the feed conveyor remains open above the upper run of the conveyor belt adjacent the inlet end thereof to define a top opening spanning the full width of the belt and spanning a substantial portion of the length of the belt through which particulate material is received when discharge from the discharge gate of a transport truck position thereabove. A perimeter frame member 150 is shown mounted about the perimeter of the intake opening of the feed conveyor for supporting a perimeter wall such as a flexible material wall or alternatively a rigid hopper wall in further embodiments.

A rigid shroud 152 encloses the remainder of the area above the conveyor belt between the inlet opening and the discharge end of the feed conveyor. A discharge outlet 154 is provided at the discharge end of the conveyor forming an enclosed chute tapering downwardly and longitudinally outwardly to a discharge opening at the bottom side thereof which is longitudinally beyond the discharge end of the belt. Material conveyed by the feed conveyor thus remains contained by the shroud and the discharge outlet that is conveyed over the discharge end of the feed conveyor up to the discharge opening at the outlet end of the feed conveyor.

As described above, the feed conveyors can be positioned in a working position to extend laterally and perpendicularly outwardly relative to the base frame. While in the working position, the carriage frame can be displaced along the base frame so as to vary the position of the feed conveyor in the longitudinal direction of the base frame for alignment of the inlet opening of the feed conveyor with the discharge gate of a transport vehicle to be unloaded.

In the working position, the feed conveyor can be extended and retracted in the longitudinal direction of the feed conveyor corresponding to the lateral direction relative to the base frame. In one instance, the feed conveyor can be retracted towards a stored position by longitudinally displacing the feed conveyor so that the inlet end is displaced laterally inwardly sufficiently to provide clearance for a transport vehicle to drive by in the longitudinal direction of the base frame alongside the base frame to align a different discharge compartment of the transport vehicle with the feed conveyor. The feed conveyor is then extended again below the next compartment of the transport truck.

Alternatively, and more preferably it is the feed conveyor which is displaced while the transport vehicle remain stationary to align the feed conveyor with different unload compartments of the transport vehicle.

In yet a further embodiment, if a new transport vehicle is approaching or a transport vehicle has completed unloading and is departing, the feed conveyors can be displaced into a stored position by pivoting the feed conveyors about the upright swing axes thereof until the inlet end is repositioned above the base frame to provide sufficient lateral clearance for the transport vehicle to pass.

In the storage position, each feed conveyor is pivoted so that the longitudinal direction of the feed conveyor is parallel to and aligned with the longitudinal direction of the base frame with the feed conveyor assuming a horizontal orientation directly above a respective one of the beams 14 of the base frame while being fully occupied within a vertical space between the main conveyors therebelow and the elevator frame in a storage position thereabove.

The system 10 according to either of the illustrated embodiments of FIGS. 1 and 15 further includes a platform 184 provided on the base frame spaced above the transition wheels of the main conveyors towards the second end of the base frame but at a location spaced longitudinally inwardly from the lateral beam 28 and below the elevation of the lateral beam 28. The platform can support a hydraulic system for supplying all of the actuators of the conveyor system and a respective motor for driving the pump of the hydraulics. The motor and the hydraulic system can be supported on the platform such that it does not interfere with movement of the feed conveyors along the full length of the horizontal section of the main conveyors while also not interfering with displacement of the elevating assembly into the stored position thereof as the components supported on the platform 184 remain below the elevation of the lateral beam 28 and the cradle frame 30 that support the elevator frame thereon in the stored position.

The platform 184 may also support various control components including a programmable computer controller including a memory storing programming instructions and a processor for executing the instructions to execute various functions of the system described herein and for generating suitable actuation signals for all of the actuators by controlling suitable solenoid valves that supply and/or interrupt of the supply of hydraulic fluid to the various actuators.

The system 10 further includes a main shroud (not shown) which fully encloses the main conveyors along the full length thereof. The shroud may be formed of various materials including telescoping or overlapping rigid panels, flexible materials including materials held under tension, materials which can be rolled up, or accordion-like materials. The shroud is provided with an access opening therein in association with each of the feed conveyors in which the access opening is suitably sized for receiving the discharge outlet of a respective feed conveyor therein. The material forming the shroud is suitable so that the access opening associated with each feed conveyor is repositionable along the length of the horizontal section of the main conveyors together with the positioning of the respective feed conveyors along the length of the base frame.

The system may further include a plurality of cameras generating a live video feed at various critical locations on the system such as at the communication of the discharge chutes into the discharge spouts, at the discharge of each feed conveyor depositing material onto respective main conveyors, or at the vibrating screen spanning the intake chute at the transition from the main conveyors to the elevating assembly. The video feeds from the cameras may be related to operator controls at the platform 184 or may be communicated wirelessly to other remote monitoring equipment.

The system may be further provided with a plurality of different sensors for measuring quantity of materials at various locations, or for detecting the relationship of various movable components of the system relative to one another. In one instance, proximity type sensors or other sensors capable of detecting movement may be provided along laterally opposing sides of the base frame to detect presence and/or movement of vehicles in the longitudinal direction alongside the base frame. The sensor data can be communicated to the central computer controller of the system which is capable of performing various automated functions related to operation of the conveyor system 10 as a whole. In one instance, if it is detected that the feed conveyors are deployed and that a transport vehicle is in movement alongside the base frame, the system may automatically displace the feed conveyors 106 into the stored positions thereof.

In other instances, the controller of the system may receive data from other adjacent equipment including level monitoring of downstream transfer equipment, handling equipment, or storage equipment. In one example level sensors are provided for monitoring the level of particulate materials in a storage bin receiving particulate material from the conveyor system 10 of the present invention. In the event that a monitored level is detected by sensors which exceeds a prescribed threshold stored on the controller, the controller can initiate a shutdown sequence. Typically this would initially involve shutting down the feed conveyors while maintaining the main conveyors operational sufficiently to clear particular material from the main conveyors. Once the main conveyors are cleared, the elevating assembly can maintain operation for a prescribed duration until the elevating assembly is cleared of particulate material. Alternatively all of the various components may be immediately shut down until the discharge spouts can be redirected to other equipment or storage locations. When using volume or weight monitoring equipment at one or more locations within the system, such as at the feed conveyors, at the main conveyors, at the elevating assembly, or at the discharge spouts, the amount of material flowing through the system can be tracked and recorded for subsequent use in various forms.

Turning now more particularly to the first embodiment shown in FIGS. 1 through 13, the system 10 in this instance further includes a screen assembly spanning across the intake opening of the intake chute of the elevating assembly so that the material discharged from the first and second main conveyors must pass through the screen assembly before entering the intake chute of the elevating assembly. The screen assembly is supported on two side members 98 which are fixed onto the main frame 26 of the elevating assembly in fixed relation to the intake chute at laterally opposing sides of the intake opening. Two support arms 100 are supported on the two side members 98 respectively by resilient springs 102 such that the support arms 100 are resiliently suspended relative to the intake chute at laterally opposing sides of the intake opening.

A screen member (not shown) is mounted in fixed relation to span between the two support arms 100 in a common plane therewith so that the screen member is resiliently supported to span over top of the intake opening. The screen member is supported such that it extends longitudinally at a downward slope from a rear edge to a front edge of the screen member in the longitudinal direction of the base frame.

A boundary panel 104 extend upwardly from the rear edge and both side edges of the screen member to contain the particulate material being discharged from the main conveyors and for redirecting the discharge material downwardly through the screen member and into the intake opening of the intake chute therebelow. The front edge of the screen member remains a free edge with no boundary such that larger particles which cannot pass through the prescribed opening size of the openings in the screen member will migrate across the upper surface of the vibrating screen member to be discharged over the front edge of the screen member as opposed to the remainder of the particular material which passes through the openings in the screen member into the intake opening of the intake chute therebelow.

A suitable vibrating motor (not shown) is operatively connected to the screen member to cause vibration of the screen member relative to the main frame of the elevating assembly. The main conveyors and the screen member are arranged to longitudinally overlap one another such that the front edge of the screen member terminates below the main conveyors and the discharge end of the main conveyors are located directly above an intermediate location of the screen members between the front and rear edges thereof.

The system 10 according to the first embodiment of FIG. 1 further includes two outriggers 156 which are pivotally supported at laterally opposing sides of the elevator frame. Each outrigger includes (i) an upper frame portion 158 spanning laterally outwardly from the respective side of the elevator frame in a working position thereof at a location spaced above a ground surface upon which the system is supported and (ii) an outer frame portion 160 extending vertically downwardly from an outer end of the upper frame portion 158 at a location spaced laterally outwardly from the respective side of the base frame. In this manner each outrigger defines a respective access opening spanning a full height between the upper frame portion 158 and the ground surface and spanning a full width between the respective side of the base frame and the outer frame portion 160 which is suitably sized to provide clearance for a transport vehicle to pass therethrough when the transport vehicle is positioned alongside the base frame for movement in the longitudinal direction of the base frame.

The outriggers are coupled to the elevator frame adjacent the rear side of the elevator frame at a location spaced rearwardly of the lift axis of the elevator frame defined by the pivotal connections of the elevator frame to the lateral beam 28 on the base frame. In this manner, the outriggers may remain fully deployed in the working position thereof as the elevating assembly is pivoted from the working position towards the stored position thereof without any interference of the outriggers preventing the storage of the elevating assembly.

The upper frame portion 158 in the working position generally comprises a truss framework lying in a vertical plane to extend laterally outwardly from the base frame. More particularly the upper frame portion includes a top member 162, a bottom member 164 and a plurality of post and struts connected therebetween to form the truss framework.

The main frame of the elevating assembly includes a mounting frame portion 166 extending laterally outwardly from the main frame of the elevator in fixed relation to the elevator frame to provide an anchoring location for the lift actuators 32 respectively. The mounting frame portion similarly includes top and bottom frame members for alignment with the top and bottom members 162 and 164 of the upper frame portion and provide pivotal mounting locations for the inner ends of the top member and the bottom member thereon respectively. In this manner an inner section 167 of each upper frame portion is pivotally connected to the respective mounting frame portion 166 for pivotal movement about a first fold axis which is vertically oriented in the working position of the elevating assembly.

A first fold actuator 168 is pivotally coupled between the inner section of the upper frame portion and the respective mounting frame portion 166 on the elevator frame so that actuation of the actuator 168 displaces the inner section to the stored position thereof. In the stored position, the inner section 167 lies parallel to the corresponding side surface of the elevator frame.

The upper frame portion also includes an outer section 170 including a respective portion of the top member 162 and the bottom member 164 which is pivotally coupled at the outer end of the inner section 167 about a second vertical fold axis. The outer section pivots relative to the inner section through a range of 180°. In the working position, the outer section pivots rearwardly against the rear side of the inner section. In the stored position, the outer sections lie flat against outer sides of the respective inner sections when the outriggers are folded against laterally opposing sides of the elevator frame.

A second fold actuator 172 provides the actuation to control the pivoting of the outer section relative to the inner section between the working and stored positions thereof. To actuate 180° folding of the outer section relative to the inner section, a crank member 174 is pivotally coupled on the inner section 167 so that the second fold actuator 172 is pivotally coupled between the inner frame section the crank member, while an over-centre link member 176 is in turn pivotally coupled between the crank member 174 and the outer section 170 to define a linkage suitable for folding the outer section relative to the inner section through 180° while the fold actuator is linearly extended and retracted.

At each folding axis, a locking assembly is provided to selectively lock the sections of the upper frame portion relative to one another in the working position. Each locking assembly includes a lock actuator 178 in the form of a linear hydraulic actuator supported on the inner section 166 of the frame. The lock actuator is vertically oriented and coupled between opposing top and bottom locking pins 180 which are vertically slidable on the inner section. The opposing pins 180 are extended into cooperating apertures on the adjacent section of the frame to lock the frame sections in the working position. When retracting the lock actuator 178, the pins are vertically displaced inwardly towards one another in a guided movement within respective tracks formed on the inner section of the frame so that a single actuator enables retraction of both pins 180 at the respective fold axis into a released position thereof that subsequently allows the fold actuator to actuate the folding between the stored and working positions thereof. Extending the lock actuator 178 extends both pins 180 into the respective apertures on the adjacent frames.

Each outer frame portion 160 comprises a vertical post depending downwardly from the outermost end of the outer section 170. An adjustable foot 182 is provided at the bottom end of the post for adjusting the height of the post to provide some leveling of the outriggers relative to the ground.

Turning now more particularly to the second embodiment shown in FIGS. 15 to 20, the system 10 in this instance is substantially identical to the previous embodiment with the exception of the features described in the following.

In the second embodiment according to FIG. 15, the system replaces the outriggers 156 with a platform 200 which is adapted to receive the second end of the base frame supported thereon and be selectively coupled to the base frame in rigid connection therebetween such that the platform 200 provide the function of the outriggers 156 without any interference with vehicles unloading into the system 10 due to the ability of the platform to accept vehicles driving over the platform.

The system 10 according to the embodiment of FIG. 15 is further provided with a plurality of lifting leg assemblies 202 which can be actuated to lift the bottom of the base frame from an engaged position on a supporting surface to an elevated position spaced above the supporting surface, for example to accept a trailer frame below the base frame for loading the base frame onto the trailer for transport for example.

The system 10 according to the embodiment of FIG. 15 also includes feed conveyors 106 which are operable in a first configuration to unload into the first main conveyor 78 from one side of the base frame and in a second configuration to unload into the second main conveyor 80 from the same side of the base frame so that material can be unloaded from a single transport vehicle into either one of the main conveyors 78 or 80.

The platform 200 has a rigid frame which is elongate in a longitudinal direction of the platform. The frame includes a plurality of support beams 202 extending in a generally common horizontal plane of the platform across a full-length of the platform at laterally spaced apart positions while remaining parallel to one another. Two of the support beams 202 are provided at opposing sides of the frame, and two of the support beams 202 are provided at laterally opposing sides of a central cable passage 204 which extends the full length of the platform in the longitudinal direction at a laterally centred location.

A plurality of crossbars 206 are connected laterally between adjacent ones of the support beams to structurally join the support beams to form the rigid structure of the frame of the platform. The crossbars 206 that are connected between the support beams 202 on either side of the central cable passage 204 are located close to the bottom side of the platform so as to be spaced below the top side of the platform such that the cable passage 204 is uninterrupted in the longitudinal direction above the crossbars 206 at the cable passage 204 while being recessed below the upper supporting surface of the platform structure.

A plurality of decking plates 208 are mounted to span across the gap in an elongate row of plates in the longitudinal direction between each adjacent pair of the support beams 202. Each decking plate overlaps the top sides of the respective pair of support beams at opposing sides thereof to support the decking plate at the top side of the platform to define a portion of the upper supporting surface of the platform that receives vehicles rolling over the platform. Support flanges 210 protrude inwardly from the support beams 202 at opposing sides of the cable passage at a location recessed below the upper supporting surface to support the decking plates 208 along opposing edges thereof at the location of the cable passage. The decking plates over the cable passage can thus be much thicker and structurally self-supporting as compared to the remaining decking plates. The remaining decking plates may include additional supporting structure therebelow such as auxiliary crossbars connected between the support beams 202 so as to be substantially flush with the top side of the support beams in a manner which provides support to thinner decking plates engaged thereon.

Each of the longitudinally opposing ends of the platform includes a pair of lateral bars 212 which are mounted coaxially with one another within the common plane of the support beams and perpendicularly to the longitudinal direction of the platform so as to provide a suitable anchoring location for a winch truck for example to permit ease of transport handling of the platform structure. The pair of lateral bars 212 at each end of the platform are spaced apart from one another with a gap therebetween in the lateral direction which is in alignment with the cable passage 204 such that the cable passage 204 is uninterrupted across the full length of the platform. The cable passage is thus suitable for receiving transmission cables therein which communicate between auxiliary equipment used in cooperation with the conveyor system 10 described herein and the control systems of the conveyor system 10 in a manner which does not interfere with the ability for vehicles to drive over the platforms in close proximity to laterally opposing sides of the base frame for unloading material into the feed conveyors 106 as described above.

The platform 200 may be near in length to the length of the base frame, for example the platform may be 40 feet in length for cooperation with standardized transport equipment; however, the platform is intended to be rigidly coupled to the base frame in perpendicular relation to the longitudinal direction of the base frame. The platform has suitable structural strength to receive the second end of the base frame supported centrally thereon such that the general footprint of the base frame supported on the platform is generally T-shaped.

The base frame 12 is mounted on a central portion of the platform such that in the mounted position the platform structure effectively defines two outrigger portions 214 extending outwardly in the lateral direction of the base frame from laterally opposing sides of the base frame. Each of the outrigger portions 214 extends outwardly from the base frame by a distance exceeding a standard transport truck lane to accommodate the full width of a transport truck driving over the outrigger portion.

Rigid connection between the platform and the base frame is accomplished by four rigid connections 216 in which each rigid connection includes a rigid mounting bar 218 which is permanently affixed to the top side of one of the support beams 202 and/or one of the crossbars 206 of the structural frame of the platform. The rigid mounting bar 218 defines a first mounting aperture thereon. Each rigid connection also includes a mounting flange 222 protrude laterally outwardly from a respective one of the main beams 14 of the base frame 12 to define a second mounting aperture. A rigid link member 222 of the rigid connection is coupled at opposing ends onto the mounting apertures of the mounting bar 218 and the mounting flange 220. Each rigid link member comprises a turnbuckle having oppositely threaded connections at opposing ends thereof so that rotation of the central turnbuckle portion of the rigid link member enables the overall length of the link member to be adjusted.

Coupling of the base frame 12 to the platform 200 includes depositing the second end of the base frame onto the central portion of the platform in a perpendicular relation thereto so that each mounting flange 220 of the base frame is located approximately in alignment above a respective one of the mounting bars 218 on the platform. The rigid link members 212 are then connected at opposing ends to the respective mounting apertures and the length of the link member is adjusted until the link member is under suitable tension so that the rigid connections 216 collectively affix the base frame 12 in relation to the platform while the outrigger portions 214 of the platform provide structural stability to the raised elevating assembly of the system 10.

The platform 200 further provided with a set of two guardrails 224 on each outrigger portion 214 such that the guardrails 224 within each outrigger portion are in line with one another to form a continuous rail assembly which is oriented generally parallel to and alongside a respective one of the sides of the base frame. The guardrails 224 comprises rigid members which are parallel and spaced above the upper supporting surface of the platform at a location spaced outwardly from the opposing sides of the base frame to be positioned outwardly of the respective rigid connections 216 that are located between the guardrails and the base frame. The remaining width of each outrigger portion 214 in the lateral direction of the base frame from the respective guardrails 224 to the respective end of the platform 200 remains at least the width of a standard transport truck lane to accommodate the full width of a transport truck driving over the outrigger portion.

A set of four of the lift leg assemblies 202 are provided at the four corners of the base frame 12 to assist in loading onto a trailer frame as noted above, or for temporarily lifting the base frame to accept leveling blocks therebelow, or to provide some additional outrigger support when deployed. Two of the lift leg assemblies are provided along each of the laterally opposing sides of the base frame at longitudinally opposing ends of the base frame.

Each lift leg assembly 202 is supported on the base frame by a corner post 226 rigidly connected to the base frame 12 to extend vertically upward from the junction of the main beam 14 and one of the lateral beams 20 of the base frame at the end of the base frame. The corner post is rigidly affixed to the base frame. The corner post 226 supports an upper pivot 228 at the top end thereof and a lower pivot 230 near the bottom of the base frame in which each of the pivots comprises two horizontal protrusions which protrude outwardly in the lateral direction of the base frame to support a respective vertical pivot shaft connected between the two protrusions. The upper pivot 228 and the lower pivot 230 are aligned with one another such that the vertical pivot shafts thereof define a common pivot axis of the lift leg assembly.

A vertical sleeve 232 is coupled to the upper and lower pivots of the lift leg assembly by an upper horizontal connecting arm 234 and a lower horizontal connecting arm 236 respectively. The sleeve 232 is rigidly connected between the upper arm 234 and the lower arm 236 so as to be pivotal together with the upper and lower arms about the respective pivot shafts of the upper and lower pivot upon which the inner ends of the arms are pivotally supported. A leg member 238 is vertically slidable within the vertical sleeve 232 with a hydraulic jack (not shown) being mounted within the sleeve 232 between a top end of the sleeve 232 and a top end of the leg member 238. The jack is operable to extend and retract the leg member relative to the vertical sleeve so as to be operable between a retracted configuration fully contained within the sleeve with the bottom of the leg being located at or above the bottom of the base frame and a lifting configuration in which the leg member protrudes downwardly from the vertical sleeve 232 so that the bottom end of the leg is space below the bottom end of the base frame.

While in the retracted configuration the leg member 238 can be pivoted between a stored position in which the upper and lower arms extend generally in the longitudinal direction of the base frame 12 adjacent opposing sides of the base frame and a working position in which the upper and lower support arms extend laterally outwardly in perpendicular relation to the longitudinal direction of the base frame such that the leg members 238 are spaced laterally outwardly from opposing sides of the base frame. Deploying the leg members 238 towards the lifting configuration until the bottoms of the legs are substantially flush with the bottom side of the base frame enables the lift leg assemblies to provide outrigger support in addition to the outrigger support provided by the platform 200. A suitable locking pin 240 is inserted through cooperating apertures in the protrusions of the pivots and the respective arms to selectively retain the lift leg assembly in either one of the stored or working positions.

The lift leg members 238 are typically only deployed into a fully extended position to raise the base frame spaced above the ground when the elevator assembly has been pivoted into the transport position. The lift leg members 238 can be used to raise the base frame to a sufficient height spaced above the ground to receive the deck of the transport trailer beneath the base frame for loading onto the trailer. Lifting of the base frame can also be done when inserting the platform 200 below the base frame when the base frame has already been deposited at a worksite. In yet a further arrangement, the lift leg members 238 can be used to raise the base frame above the ground to enable cleanup of spilled material beneath the base frame 12 which may have resulted from overloading of the conveyor for example.

Even when the lift leg assemblies are deployed into the working position protruding laterally outwardly from opposing sides of the base frame 12, the leg assemblies only protrude laterally outward by a distance which is approximately equal to the spacing of the guard rails 224 from the opposing sides of the base frame 12 such that deployment of the lift leg assemblies into the working positions thereof does not interfere with the ability for vehicles to drive over the remaining width of the outrigger portions 214.

Figure 20:
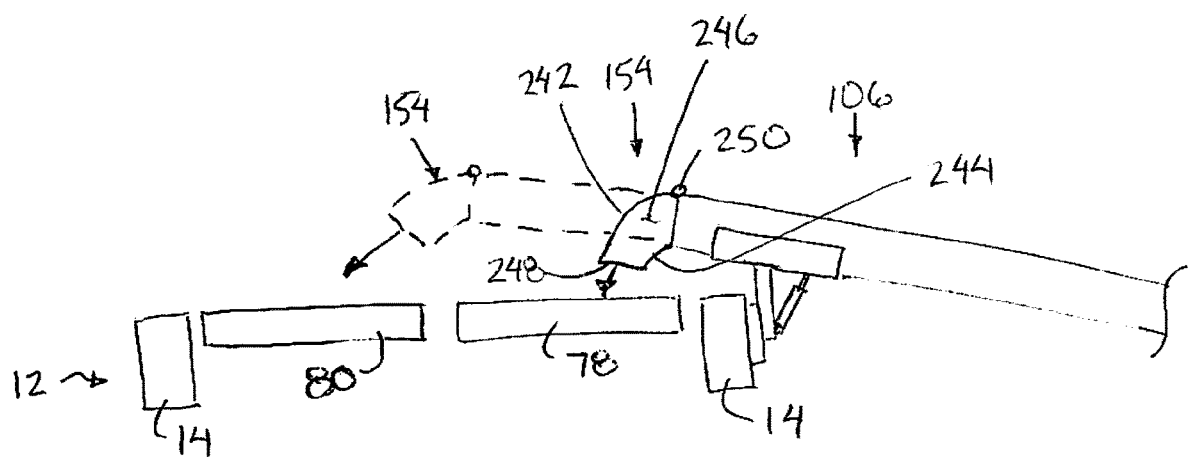
FIG. 20 is a schematic representation of one of the feed conveyors according to the second embodiment of FIG. 15 shown in solid line in a first configuration for discharging into a first one of the main conveyors and shown in broken line in a second configuration for discharging into a second one of the main conveyors.

As shown in FIG. 20, the feed conveyors 106 in the system 10 according to the embodiment of FIG. 15 are operable in either one of a first configuration shown in solid line or a second configuration shown in broken line.

The discharge outlet chute 154 in this instance includes a top wall 242 forming the top side of the chute, a bottom wall 244 forming a bottom side of the chute, and opposing side walls 246 enclosing opposing sides of the chute. The walls of the chute form a passage that is reduced in cross-sectional area from an inlet end receiving material discharged from the conveyor belt of the feed conveyor 106 to an outlet end defining the discharge opening 248 of the outlet chute 154. The discharge chute 154 is pivotally coupled at the top side of the shroud of the feed conveyor 106 by a pivot coupling 250 defining a horizontal axis of pivotal movement of the discharge outlet chute 154 relative to the remainder of the feed conveyor 106. The chute 154 is pivotal from a first angular orientation to a second angular orientation. In the first angular orientation, the discharge opening 248 is located at a first distance from the discharge end of the conveyor belt with the discharge opening facing primarily downwardly. In the second angular orientation, the discharge opening 248 is displaced to a second distance greater than the first distance with the discharge opening facing in a more horizontally outward orientation than the first angular orientation. A suitable handle 252 can be used to manually adjust the outlet chute 154 between the first and second angular orientations thereof. A pin may be used through cooperating apertures in the handle and in a fixed structure of the housing of the feed conveyor to retain the chute in either one of the first or second angular orientations.

The feed conveyor 106 according to the embodiment of FIG. 15 remains movable in the conveying direction thereof relative to the tilt frame so as to vary the lateral position of the discharge end of the feed conveyor relative to the base frame. Accordingly, in the first discharge configuration, an operator can initially position the discharge end of the feed conveyor over the first conveyor 78 if collecting material from a transport vehicle along the first side of the base frame while the discharge chute 154 remains in the first angular orientation for depositing material onto the first conveyor 78. Alternatively, in the second discharge configuration, the operator can position the discharge end of the feed conveyor further inward relative to the base frame so as to be nearer to the second conveyor 80 than the first discharge configuration. The operator can also displace the discharge chute 154 into the second angular orientation thereof such that the discharge outlet will be better oriented and positioned for depositing material onto the second conveyor 80 while still collecting material from a transport truck along the first side of the base frame.

Figure 19:
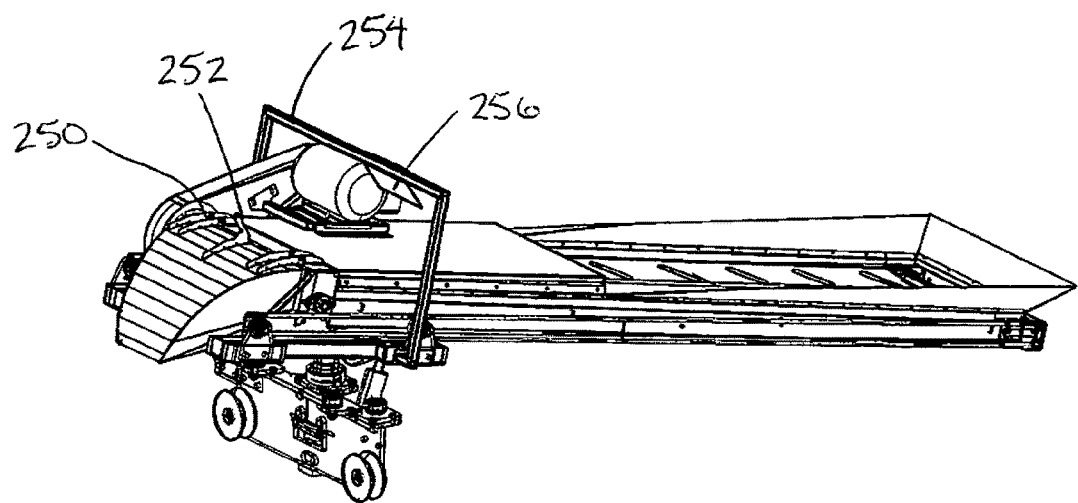
FIG. 19 is a perspective view of one of the feed conveyors according to the second embodiment of FIG. 15.

As shown in FIG. 19, the feed conveyor 106 also includes a support arm 254 extending overtop of the feed conveyor in connection to the tilt frame 128 such that the feed conveyor belt can be longitudinally displaced relative to the support arm 254. The support arm 254 provides a mounting location for a control panel 256 locating operator controls thereon for controlling various operating characteristics of the feed conveyor including the unloading rate of the feed conveyor or the position and angular orientation of the feed conveyor relative to the base frame. The control panel 256 can be centrally located along the support arm 254 in the lateral direction of the feed conveyor so as to be readily accessible by an operator from either side of the feed conveyor.

According to a further aspect of the feed conveyor 106, suitable drive motors may be connected to some of the rollers which are engaged for rolling movement along a respective main beam 14 of the base frame. Operation of the drive motors can be accessed through the control panel 256 of the feed conveyor such that position of the feed conveyor along the base frame can also be actuated by an operator.

The feed conveyor 106 according to the second embodiment of FIG. 15 may also include a vibrating screen assembly spanning the inlet opening of the feed conveyor instead of providing a vibrating screen assembly on the side members 98 at the intake housing 38 of the elevating assembly as described in the first embodiment.

Figure 18:
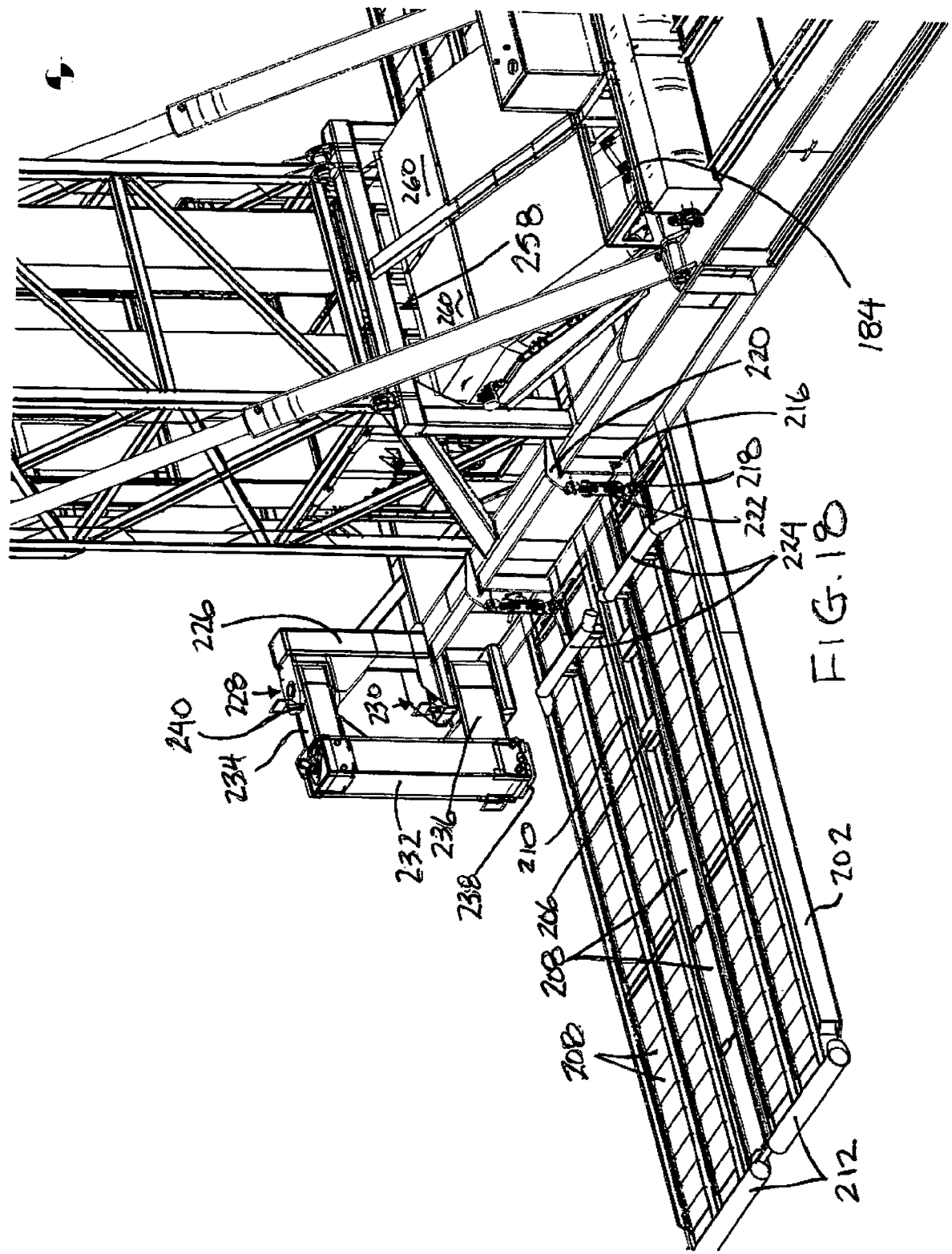
FIG. 18 is a perspective view of the link members rigidly connecting the base frame to the platform of the portable conveyor system according to the second embodiment of FIG. 15.

The entirety of the main conveyors are typically covered with suitable shroud members to prevent the escape of dust from the materials being conveyed. As shown in FIG. 18, a clearance gap 258 is provided between the inclined shrouds 260 enclosing the inclined portions of the main conveyors and the lateral beam 28 thereabove which pivotally supports the elevating assembly relative to the base frame 12. It is desirable to maintain visibility through the clearance gap 258 to observe how material is discharging from the main conveyors into the intake chutes 44 of the elevator assembly. In order to maintain visibility while preventing the escape of dust, transparent panels, for example clear flexible tarps, may be supported to span across and enclose the gap 258. The panels can be retained on the base frame 12 using releasable fasteners to provide selective access or for cleaning and the like for example. Releasable fasteners which may be suitable for attaching and removing the transparent panels relative to the gap 258 include magnetic fasteners, snap fasteners, eyelets that are received on hooks, or a variety of other known releasable fastener types.

In further embodiments, the main conveyor assembly may comprise a single conveyor which is operational to feed both or a selected one of two bucket elevators. Alternatively, two main conveyors may be provided along the base frame for feeding a single common bucket elevator. In yet further arrangements a single main conveyor may feed a single bucket elevator. In either instance, plural feed conveyors 106 are envisioned which may be positioned optionally along a common side to unload trucks from only one side of the base frame, or alternatively along both sides for unloading transport vehicles from either side of the base frame onto a common main conveyor or onto respective separate main conveyors.

In yet further embodiments, one of the feed conveyors 106 may be operatively connected directly to the intake chute of an elevating assembly such as the elevating assembly of the present invention which comprises one or more bucket elevators. In this instance, the carriage frame 108 would be mounted at the intake chute of the elevating assembly so that the tilt frame 128 remains substantially as described above to allow swinging movement about a vertical swing shaft 122, while tilting can remain under control of the tilt actuator, and extension and retraction can remain under control of motor 140 for swinging, tilting and extending the feed conveyor relative to the intake chute of the elevating assembly.

In the illustrated embodiments, the central divider within the intake chute of the elevating assembly is a fixed divider so that material from the main conveyor on one side of the base frame always feeds the same bucket elevating assembly while the other main conveyor feeds the other bucket assembly; however, in further embodiments the central divider may comprise an adjustable baffle which can be laterally adjusted across the intake opening of the intake chute such that either main conveyor may be redirected towards either one of the bucket elevators. This is particularly advantageous in the event of failure of any one component of the overall system as the remaining components can remain operational in this instance. For example, if one of the bucket elevators undergoes a failure, a single bucket elevator can be used to receive particulate material unloaded from transport trucks on both sides of the base frame due to both main conveyors in this instance being enabled to be redirected to the same remaining operational bucket elevator. Likewise, suitable adjustable baffles could be arranged at the discharge chutes of the bucket elevators such that any one bucket elevator may be redirected into a selected one of either of the discharge spouts to maintain flexibility of the system overall.

When it is desired to transport the system between different sites, the elevating assembly is pivoted into the stored position thereof followed by pivoting of the outriggers into their respective stored positions at laterally opposing sides of the elevator frame. The discharge spouts 50 extend parallel to the elevator frame along the top side thereof in the stored position. The feed conveyors can be longitudinally extended and then tilted upward into a horizontal orientation which then enables the feed conveyors to be pivoted about the respective swing axes thereof until the feed conveyors are parallel to the longitudinal direction of the base frame lying alongside the top of a respective one of the beams 14 of the base frame to be received in the space between the main conveyors on the base frame therebelow and the elevator frame in the stored position thereabove. In the resulting transport configuration, the system 10 can be loaded onto a flat bed hauler such as a truck bed or trailer using a winch hooked onto one of the crossbars at the end of the base frame, or alternatively by using hydraulic lifting cylinders which lift the base frame and allow a trailer to be displaced under the lifted base frame for depositing the base frame onto the transport vehicle.

In order to deploy the system at a selected deployment site, the skid is deposited as a single unit onto a suitable ground surface from transport equipment. The outriggers are typically unfolded into the working position thereof using the corresponding actuators followed by actuation of the lock actuators to lock the outriggers in the extended position. The elevating assembly is then pivoted upward into the working position thereof. The system 10 is positioned adjacent to any related equipment, such as a blender, or various storage silos when handling particulate material such as proppant used in a hydraulic fracking operation in the field of oil production. Using the actuators of the discharge spouts, the spouts can be directed into the intake hoppers or intake openings of the adjacent related equipment. The outrigger feet are extended to engage the ground as the system is levelled. Various cabling can be used for anchoring the system relative to adjacent equipment including rig mats and the like. The system may be linked to other equipment adjacent thereto using various rigid couplings as well for additional stability. The controller of the system 10 may also be connected in electronic communication with other adjacent equipment equipped with monitor levels and sensors of various types to communicate the sensed data to the controller of the system 10 to perform some of the functions described above.

Once the system is deployed, the system 10 is used to unload transport vehicles carrying particulate material and to transfer the particulate material to an elevated location. For example, the system 10 is well-suited for use with highway truck tractors hauling elongated transport trailers with large containment compartments for particulate material supported thereon which can be discharged through respective discharge gates below each compartment along the length of the trailer. In this instance, the transport vehicles including the towing truck and the trailer can pass through the access openings in the outriggers for positioning along both sides of the base frame. With the vehicles in close proximity to the base frame along either side of the base frame, the corresponding feed conveyors 106 adjacent to the vehicles are deployed from the stored position to the working position thereof to align the intake opening at the inlet end of the feed hopper below a selected discharge gate of the transport truck.

Typically, the operator aligns a first feed conveyor 106 with a first gate for discharging material therethrough while the first feed conveyor 106 is operational. During the unloading of a first compartment with the first feed conveyor, a second feed conveyor 106 is aligned with a second discharge gate. Upon complete discharging of the first compartment, the second gate is opened and the second feed conveyor is operated to immediately begin unloading a second compartment. During the unloading of the second compartment, the first feed conveyor is repositioned for alignment with a third discharge gate associated with a third compartment to enable the third compartment to be unloaded immediately upon completion of the unloading of the second compartment. This process continues until the vehicle has completely unloaded. Once complete unloading has taken place, the feed conveyors are returned to a stored position to enable the vehicle to depart by continuing to move past the base frame in the longitudinal direction of the base frame. An operator control panel may be located at each feed conveyor for providing the operator with ready controls to operate the actuators of the feed controller and any other actuators of the system 10 as may be required to perform an unloading operation.

The system may be provided with various additional equipment such as lights on the elevated areas of the elevating assembly to light up the work area for trucks and operators as well as floodlighting the well site. Weighing mechanisms could be installed on the conveyors and other locations including optical weighing equipment, Software Scales™, belt scales, or strain gauges on the hopper discharges for example. The operator in this instance could set a discharge rate on the conveyor and the system would be weighing it and adjusting the hopper actuators to open and close to ensure that the right amount of volume has been discharged. The system could tie in a shutdown procedure on the elevator units to high limit sensors or high limit warnings of equipment such as downstream silos so that the silos are not overfilled. Once a high limit is signalled, then the specific elevator which is filling the silo will be given time to shut down as the operator would receive an alarm and the truck unload conveyors which shut down which would let the main conveyor and the elevator clear themselves of material.

Figure 14:
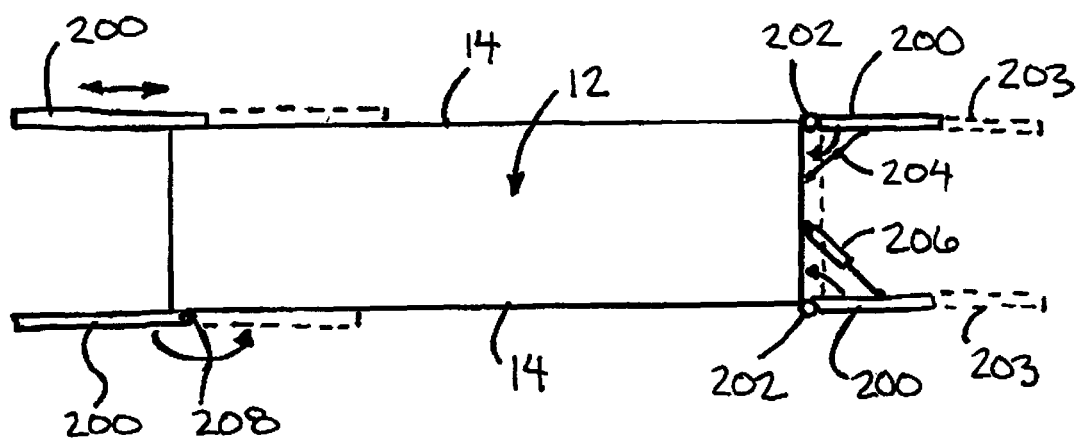
FIG. 14 is a schematic top plan view of the portable conveyor system in which optional guard rails are supported on the base frame according to the first embodiment of FIG. 1.

Turning now to FIG. 14, the conveyor system in this instance is represented schematically with optional guardrails 300 supported thereon. The guardrails 300 each comprise a rigid structural barrier mounted at a suitable height above ground to act as a barrier which prevents vehicle traffic across the path of the guardrail. Although various embodiments of the guardrails 300 are represented schematically, in each instance the guardrails are mounted such that in a working position, one guardrail is mounted at each corner of the rectangular footprint of the base frame such that a set of four guardrails 300 are provided on the base frame with the guardrails protruding longitudinally outward from opposing ends of each of the two side beams 14 of the base frame. Furthermore, in each instance the guardrails can be locked in the working position, or released from the working position for movement relative to the base frame into a stored position in which each guardrail extends in a substantially non-protruding manner along a boundary of the base frame.

In the illustrated embodiment, two of the guardrails 300 are shown coupled to the base frame by respective hinges 302 situated at the end of the base frame such that each guardrail 300 can be pivoted about a vertical axis of the hinge between the working position and the stored position through a range of 90° such that in the stored position each guardrail 300 extends along the end of the base frame in the lateral direction of the base frame. In some instances, a hinged brace 304 may be used to provide additional support to lock the guardrail 300 in the working position in which the brace is foldable or otherwise releasable to enable pivoting into the stored position as may be desired. Alternatively, a guard actuator 306 such as a linear hydraulic actuator may be pivotally coupled between the base frame and the guardrail 300 to actuate movement of the guardrail between the working and stored positions thereof while also providing support to retain the guardrail in the working position when desired. When hinged at the ends of the frame, each guardrail further includes a telescoping extension portion 303 which is telescopically extended to increase the overall length that the guardrail protrudes from the base frame in the working position.

In a further embodiment, the guardrail 300 may be pivotally coupled to the base frame by a hinge 308 situated at the side of the base frame such that the guardrail 300 can be pivoted about a vertical axis of the hinge between the working position and the stored position through a range of 180° such that in the stored position the guardrail 300 extends along the side of the base frame in the longitudinal direction of the base frame. Various forms of braces and/or actuators may also be used to displace the guardrail and to support the guardrail in the working position similarly to the previous embodiment.

In yet a further embodiment, the guardrail 300 may be coupled to the base frame for longitudinal sliding movement. In this instance the guardrail is retracted relative to the boundary of the base frame by sliding the guardrail in the longitudinal direction from the working position to a stored position in which the guardrail extends alongside the respective side of the base frame without substantially protruding longitudinally beyond the end of the base frame. Suitable braces and/or actuators may again be provided to displace the guardrail and to support the guardrail in the working position similarly to the previous embodiments.

Use of guardrails improves safety because when the truck is exiting the unloading area, they will be required to manoeuvre straight for some distance before starting to make their turn. This feature is particularly important when using Super-B trailer combinations, as the rear trailer will otherwise naturally start navigating along the curve faster than the tractor pulling it, which would mean that it is possible that it would hit the components supported on the base frame of the portable conveyor system. It is particularly advantageous to force drivers of transport vehicles to extend further past the base frame in the longitudinal direction before initiating a turn when trucks enter the path alongside the base frame at the second end where the elevator is located and then navigate alongside the main conveyor for unloading because the operator of the transport vehicle has reduced visibility of the first end of the base frame when exiting in this instance as opposed to exiting at the second end where the tower frame of the elevator assembly provides a more clear visual guide as to the location of the end of the base frame.

In further embodiments, the platform area 184 which supports a hydraulic reservoir for the hydraulic systems of the conveyor system 10 in the illustrated embodiments of FIG. 1 and FIG. 15 may also be used to support a large display screen for displaying various data thereon which is readily visible to operators of the feed conveyors 106. In this manner, various sensed data such as the mass of material being conveyed, or the rate that the material is being conveyed, by either of the main conveyors, or of individual feed conveyors can all be collected and communicated by the control system for display on the large display screen at the platform area 184. When communicating with downstream equipment such as storage silos receiving the material being conveyed by the conveying system 10, various characteristics of the downstream equipment such as the total tonnage being loaded into storage silos can also be communicated back to the control system of the conveyor system 10 for display on the display screen at the platform area 184.

Figure 21:
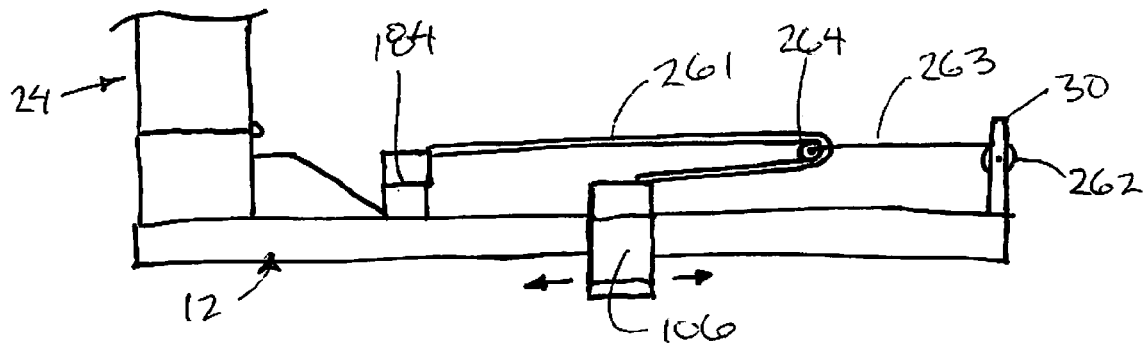
FIG. 21 is schematic representation of a cable management system for linking said at least one feed conveyor to a main hydraulic system of the portable conveyor system according to either of the embodiments described herein.

Turning now to FIG. 21, the conveyor system 10 according to any of the previous embodiments may further include a cable management assembly for managing transmission cables and/or hydraulic transmission lines 261 of various forms which are communicated from the control system and hydraulics at the platform area 184 to each of the individual feed conveyors 106. In one example, a cable management assembly is associated with each feed conveyor in the form of a reel 262 rotatably supported on the cradle frame 30 at the first end of the base frame away from the elevator assembly. The reel 262 includes a tension cable 263 wound onto the reel with the reel being biased in a direction which winds the tension cable onto the reel. A shiv 264 is rotatably supported at the free end of the tension cable. The communicating lines between the platform area 184 and the associated feed conveyor extend in the longitudinal direction of the base frame from the platform area 184 up to the shiv 264, then extend 180° about the shiv, and then return in the longitudinal direction from the shiv 264 to the respective feed conveyor 106. As the feed conveyor is displaced longitudinally along the base frame, any slack in the communicating lines 261 is taken up by the tension cable 263 which remains biased to be wound back onto the reel 262. As the feed conveyor is displaced away from the cradle frame 30, the shiv will be displaced away from the cradle frame 30 proportionally to the movement of the feed conveyor 106 away from the cradle frame to deploy the tension cable from the reel against the biasing of the reel. When multiple feed conveyors 106 are provided on the base frame, an independent cable management system may be provided in association with each feed conveyor for managing the respective transmission lines communicating with that feed conveyor.

Figure 22:
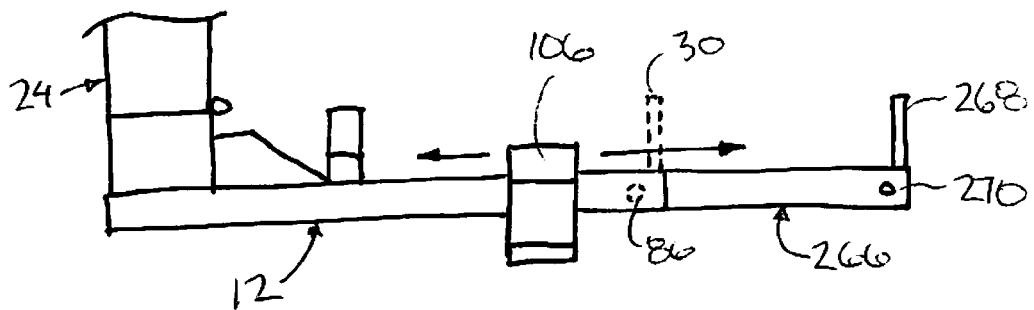
FIG. 22 is a schematic representation of a modular frame shown mounted in series with the base frame of the portable conveyor system according to either of the embodiments described herein.

Turning now to FIG. 22, the conveyor system 10 according to any of the previous embodiments may be further provided with a base frame 12 having a main section as described above which is shorter in length than the illustrated embodiments but which maintains a cradle frame 30 and a first end pulley for the main conveyors at the first end of the base frame. As shown in FIG. 22 however, the base frame may cooperate with an auxiliary modular frame section 266 having respective main beams which are substantially identical to the main beams 14 of the main base frame 12. The modular frame 266 can be coupled longitudinally in series with the base frame at the first end thereof such that the side beams of the modular frame are continuous with the laterally opposing side beams of the base frame. The side beams of the modular frame 266 would be substantially identical in configuration with regard to the spacing therebetween, the size, and the arrangement of rails and guide flanges on the beams such that the side beams of the modular frame are suitable for supporting the feed conveyors for rolling movement in the longitudinal direction thereof in a manner which is identical to the main beams supporting the feed conveyors 106 on the base frame 12. The modular frame 266 also provides an auxiliary cradle frame 268 at one end thereof opposite from the base frame 12 and first end rollers 270 supported thereon for supporting the first ends of the main conveyors thereon in an identical manner to the base frame when the base frame is used alone. The belts of the main conveyors are replaced with longer belts in this instance and additional intermediate roller assemblies 92 are provided on the modular frame 266 such that the modular frame effectively extends the overall length of the main conveyors and the base frame 12 upon which they are supported but otherwise operates in a substantially identical manner. The modular frame 266 thus enables the feed conveyors to be longitudinally displaced along the base frame, across the junction of the base frame and the modular frame, and onto the modular frame 266 so as to enable the feed conveyors 106 to collect material from transport vehicles and deposit the collected material onto the main conveyors from an operating position along either one of the base frame or the modular frame.

Figure 23:
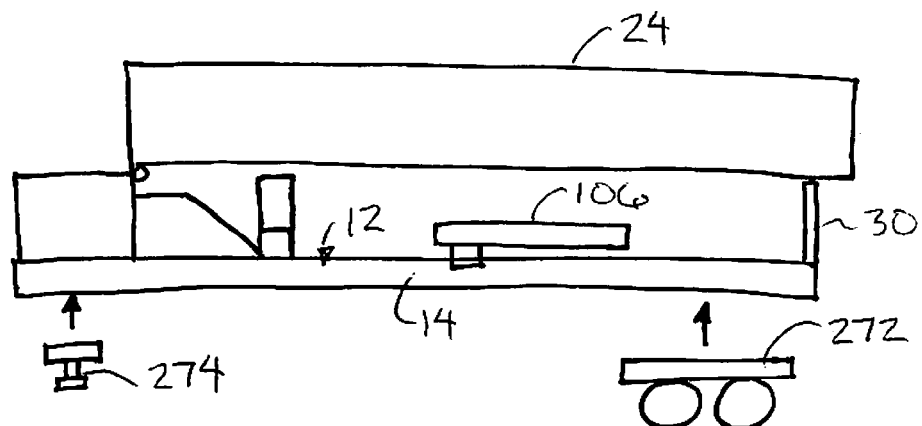
FIG. 23 is a schematic representation of a wheeled attachment for converting the base frame to a trailer frame according to either of the embodiments described herein.

Turning now to FIG. 23, the conveyor system 10 according to any of the previous embodiments may be further adapted so that the base frame 12 can be converted into a trailer frame for ready transport in which the main beams 14 of the base frame provides the main structural support to the resulting trailer frame. In this instance, one or more wheel assemblies 272 can be selectively coupled to the bottom side of the base frame when the base frame is lifted by the lifting leg assemblies or other suitable lifting equipment for example. The base frame 12 can also be modified to accept attachment of a hitch pin 274 or other suitable hitching connector either at the bottom side of the frame or at the end of the frame for suitable connection to a towing vehicle to complete conversion of the base frame 12 to a trailer frame. Some options of attachments for conversion of the base frame to a trailer frame include a pintle hitch attachment, a removable gooseneck, or other trailer connections. The removable wheel assemblies provide rear axles and may form part of an assembly such as a removable dolly. Alternatively, wheels may be pinned on to respective hubs on a fixed axle or other structure storable on the base frame or removable from the base frame.

Figure 24:
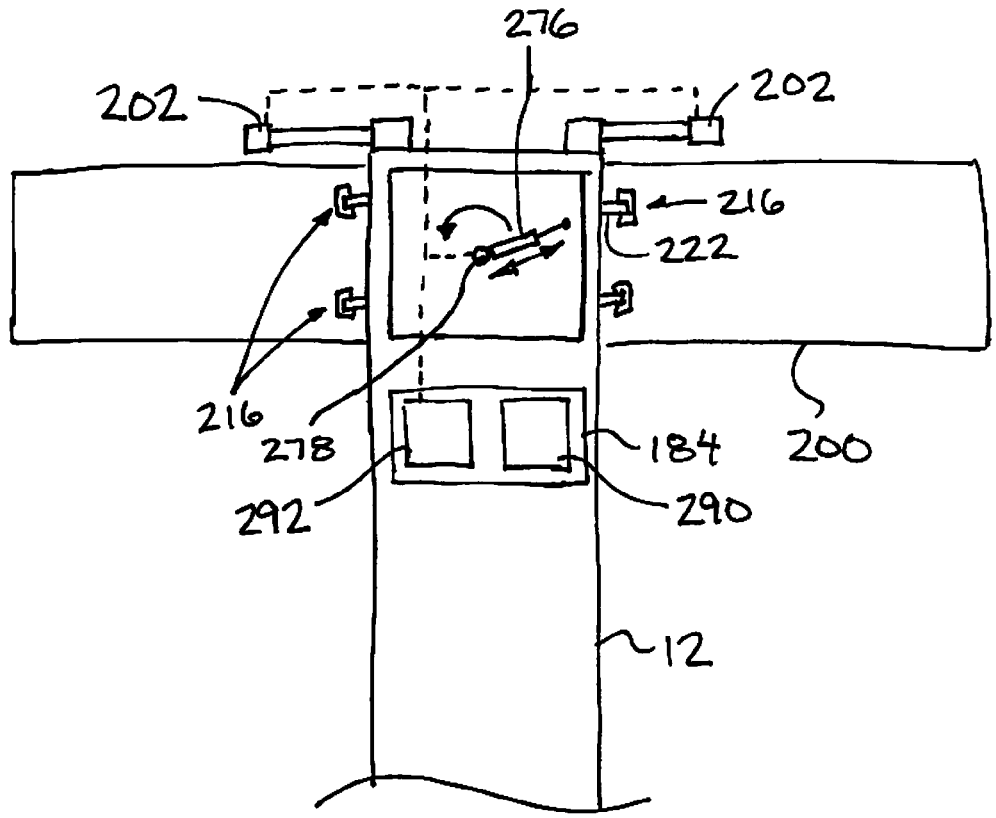
FIG. 24 is a schematic representation of a positioning actuator for repositioning the base frame of the conveyor system relative to the platform structure that provides outrigger support and of a secondary hydraulic system that can function as a back up to a primary hydraulic system of the conveyor system.

Turning now to FIG. 24, the platform 200 in this instance may optionally be provided with a positioning actuator 276 in the form of a linearly actuating hydraulic piston cylinder which is coupled to the platform for pushing against the base frame to reposition the base frame relative to the platform during assembly of the conveyor system upon initial installation at a site. More particularly, the platform 200 in this instance includes a central socket which is located at a central location in the lateral and longitudinal directions of the platform so as to be open to the top side of the platform to receive a vertical pivot shaft 278 therein. One end of the positioning actuator 276 is coupled to the vertical pivot shaft such that the actuator is pivotal about a vertical axis of the shaft within an actuation plane which is horizontal and parallel to the upper supporting surface of the platform. The linear actuating direction of the actuator is thus adjustable in any direction extending radially outward from the vertical pivot shaft by pivoting of the actuator about the vertical axis of the pivot shaft. In use, the base frame 12 is typically initially placed on the platform such that an open area of the base frame that typically receives the elevator assembly in the working position thereof is aligned over the central portion of the platform 200 locating the positioning actuator thereon. If some small realignment of the base frame relative to the platform is required in order to align the connection points for the rigid link members 222 forming the rigid connections 216 between the base frame 12 and the platform 200, then the positioning actuator is pivoted so that the actuation direction thereof aligns with the direction of realignment required between the base frame 12 and the platform 200. Subsequent actuation of the actuator will displace the base frame relative to the platform in the desired manner. Once proper alignment has been achieved, the rigid connections 216 can be formed and the positioning actuator 276 can be removed so as not to interfere with displacement of the elevator assembly from the transport position to the working position thereof.

The hydraulic systems of the conveyor system 10 may include a primary hydraulic pump 290 which supplies most of the operating components of the conveyor system 10 during normal operation thereof and a secondary hydraulic pump 292 which can function independently or as a backup to the primary hydraulic pump 290. The primary hydraulic pump 290 can be electrically driven from an available electrical supply at the worksite, whereas the secondary hydraulic pump 292 may be driven by a gas generator carried on the base frame 12 at the location of the supporting platform 184 together with the primary and secondary pumps. In a preferred arrangement, the secondary hydraulic pump 292 is operatively connected to the positioning actuator 276 and the actuators of the lifting legs 202 such that use of the lifting legs for unloading the base frame 12 from a transport vehicle to position the base frame on the platform 200 as well as use of the positioning actuator 276 to optimize alignment of the base frame 12 with the platform 200 can be accomplished using the gas generator operating the secondary hydraulic pump upon initial deployment at a worksite before an electrical supply may be available for operating the primary hydraulic pump 290. The secondary hydraulic pump is no longer required to operate other than in the capacity as backup to the primary hydraulic pump once the base frame 12 has been set up on the platform 200 in a working configuration.

In further embodiments, flood lighting can be provided at various locations on the base frame, or on the frame of the elevating assembly to provide illumination to the entire surrounding site including the truck loading areas along both laterally opposing sides of the base frame 12. The lights may be repositionable as desired to accommodate different site configurations to ensure safe working conditions in the truck unload area and other areas.

To provide further structural stability to the elevator assembly, various anchors may be penetrated into the earth at the location of the platforms 200 or below the base frame at various locations to adequately secure the base frame 12 and the platform 200 relative to the ground. Releasable connection points on the platform 200 or the base frame 12 enable rigid connection of the frames to the embedded anchors in the ground.

In addition to various sensors for collecting data regarding sensed mass or volume of materials being conveyed through the various components of the conveying system 10, the control system may also collect data from video cameras mounted at various locations for monitoring the flow of materials through the conveying system 10. Cameras may be further provided on the discharge spouts to capture video footage of the discharge ends of the spouts to assist in alignment of the spouts with cooperating downstream equipment. The cameras may have Wi-Fi functionality and may respond to pan, tilt and zoom instructions to assist in optimizing the captured images.

The feed conveyors 106 are supported for rolling movement along the respective sides of the base frame while remaining readily releasable from the base frame by displacement of one or more support rollers into a released position relative to the rails upon which they are supported for rolling movement in use. Due to the ability for the feed conveyors to be quickly removed or attached from the base frame 12, it may be desirable to provide a spare feed conveyor stored on the frame of the elevating assembly or the base frame at a location which does not interfere with normal operation of the conveying system 10 and which does not interfere with displacement of the elevating assembly between working and transport positions thereof. Suitable releasable mounts would be used in this instance to releasably support the spare feed conveyor in fixed relation on the frame when stored, while enabling the spare feed conveyor to be readily deployed onto the base frame for operation to replace a different feed conveyor which becomes inoperative. All of the feed conveyors 106 are identical and interchangeable with one another.

The inlet of each of the discharge spouts 50 at the location of the discharge housing 36 at the top of the elevating assembly 24 may be provided with a suitable grate or safety bar extending across the inlet opening of the spout in a manner which does not interfere with loading of particulate material into the spout but which restricts the size of the openings. In this manner, in the event of one of the buckets from the bucket elevator within the elevating system coming loose from its operating position, the broken bucket will not enter the ducts 52 and 54 of the discharge spouts 50 and prevent further damage. Simply unbolting the flexible connection to the telescopic spouts 50 is sufficient to access the broken bucket and remove the bucket without further damage.

In further embodiments, the main conveyors may be reconfigured so as to each comprise a single linear conveyor without an inclined section being required if the entirety of the linear conveyor is provided with an upward slope from the first end towards the second end of the base frame 12. The second end of the conveyor would be sufficiently elevated in this instance to enable discharging into the intake housing 38 of the elevating assembly. The feed conveyors 106 in this instance would be appropriate configured for discharging into the greater height of the main conveyor towards the second end of the base frame.

In yet a further embodiment, each main conveyor may comprise two separate conveyors including a main horizontal conveyor occupying the location of the main sections of the illustrated main conveyor and an inclined conveyor occupying the location of the inclined sections of the illustrated main conveyors.

When incorporating belt scales to monitor the mass of material being conveyed by the main conveyors, the control system can monitor the input from the belt scales and respond by controlling the feed conveyor motors to slow down the rate of material being fed from the feed conveyors 106 into the main conveyors to ensure that the main conveyors and the elevators cannot be overloaded.

In further embodiments, the main conveyor belts can be supported on the base frame such that the main conveyors can be elevated into an out-of-use position relative to the base frame. The conveyors would typically only be elevated when not operational to provide access beneath the main conveyor to collect spilled materials for example, without having to displace the base frame or the elevating assembly.

Figure 25:
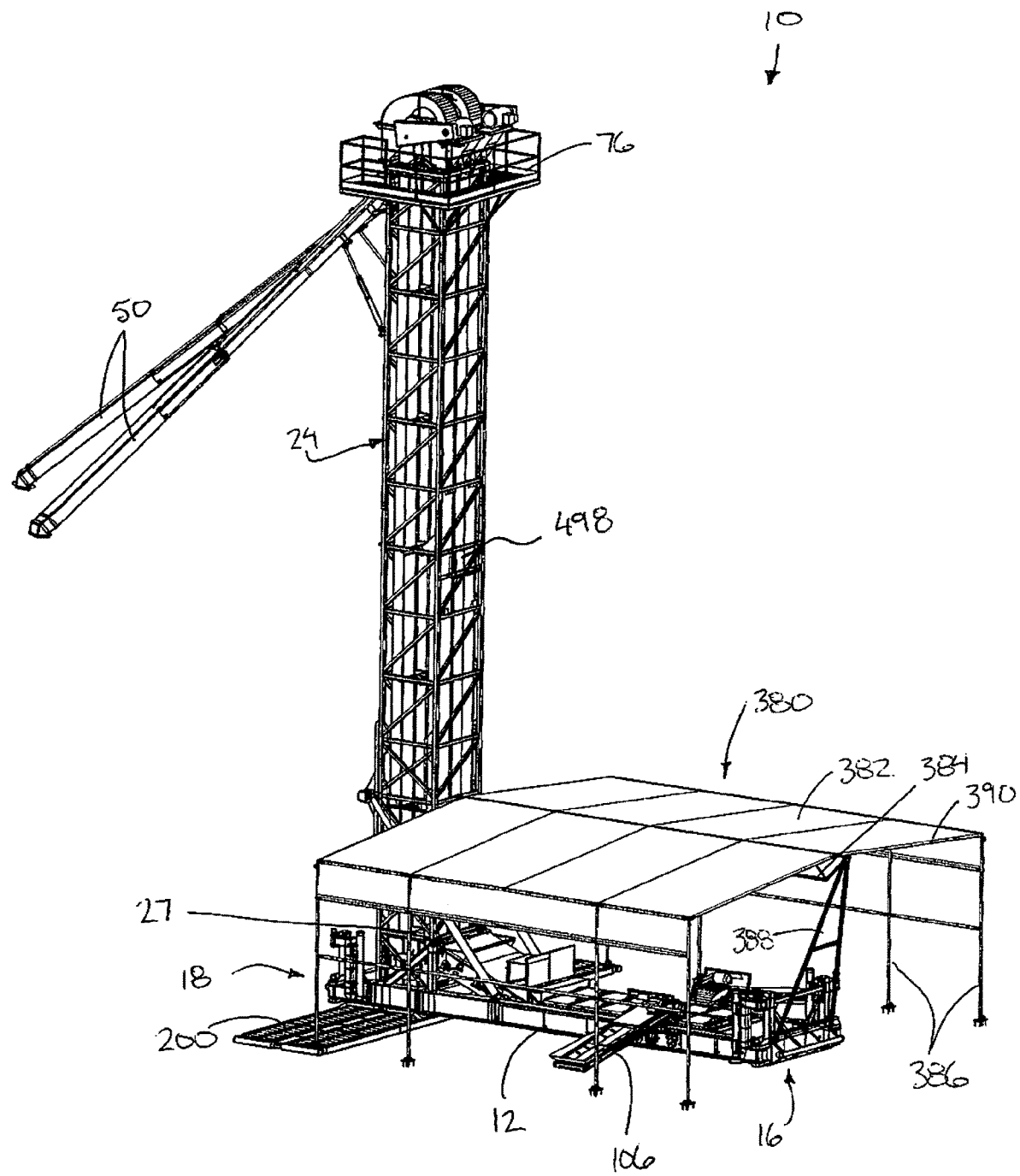
FIG. 25 is a perspective view of a third embodiment of the portable conveyor system according to the present invention in an extended working position.

In further embodiments, such as illustrated in FIG. 25, the truck unloading area that receives transport trucks along laterally opposing sides of the base frame 12 may be fully or partially covered by a suitable cover system 280. The cover system 380 may include various collapsible frame members 382, 386, 388 which can be mounted on the base frame 12 to extend upwardly and laterally outwardly over top of the unloading areas with sufficient clearance to accept typical transport trucks under the cover system 380. In further embodiments, various covers 382, such as a pliable material such as, but not limited to, fabrics, polymers, or hybrid materials to accommodate tent-like structures may be supported to extend over the base frame 12 or extend over the entirety of the base frame 12 and the truck unloading areas to ensure that any materials being conveyed are kept dry from rain or snow as well as keeping operators dry, or in the shade during sunny weather.

Figure 26:
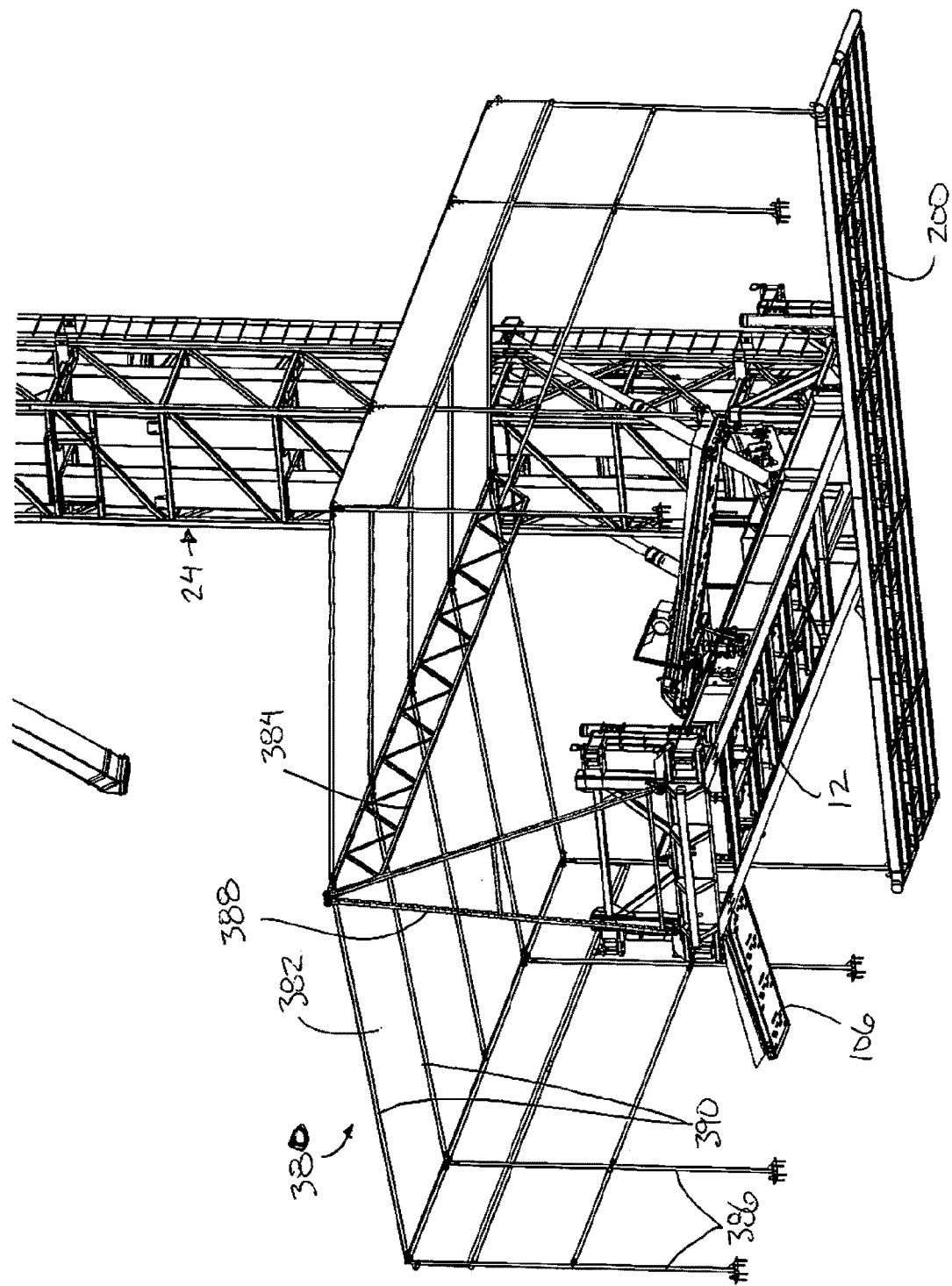
FIG. 26 is another perspective view of the cover system of the portable conveyor system according to the embodiment of FIG. 25.
Figure 27:
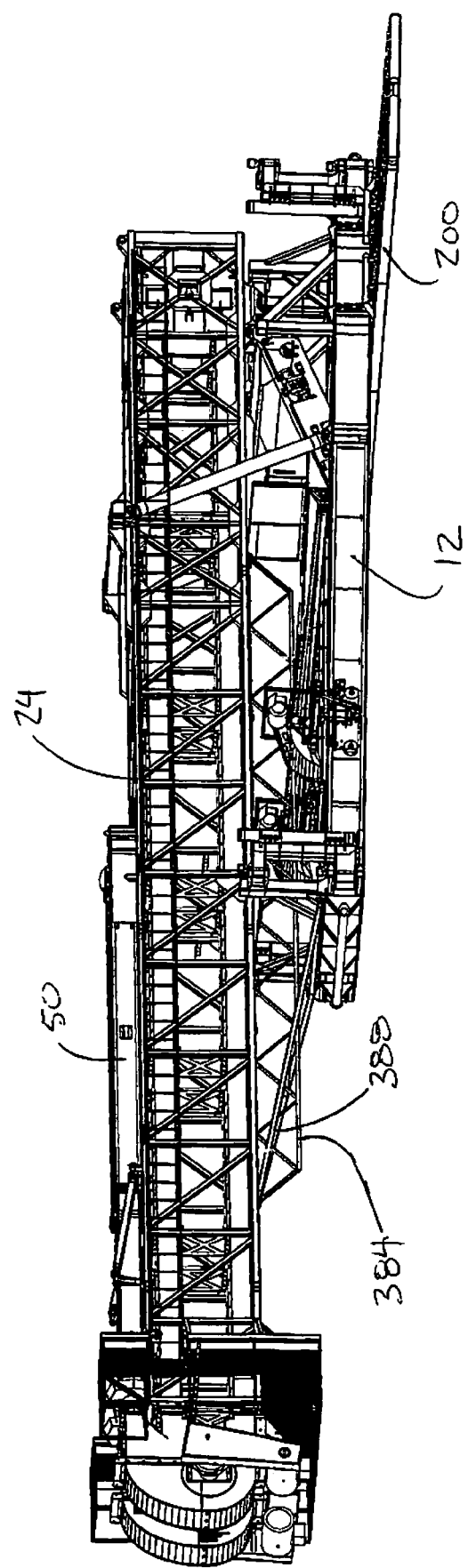
FIG. 27 is a perspective view of the portable conveyor system according to the embodiment of FIG. 25, shown in a stored transport position.
Figure 2B:
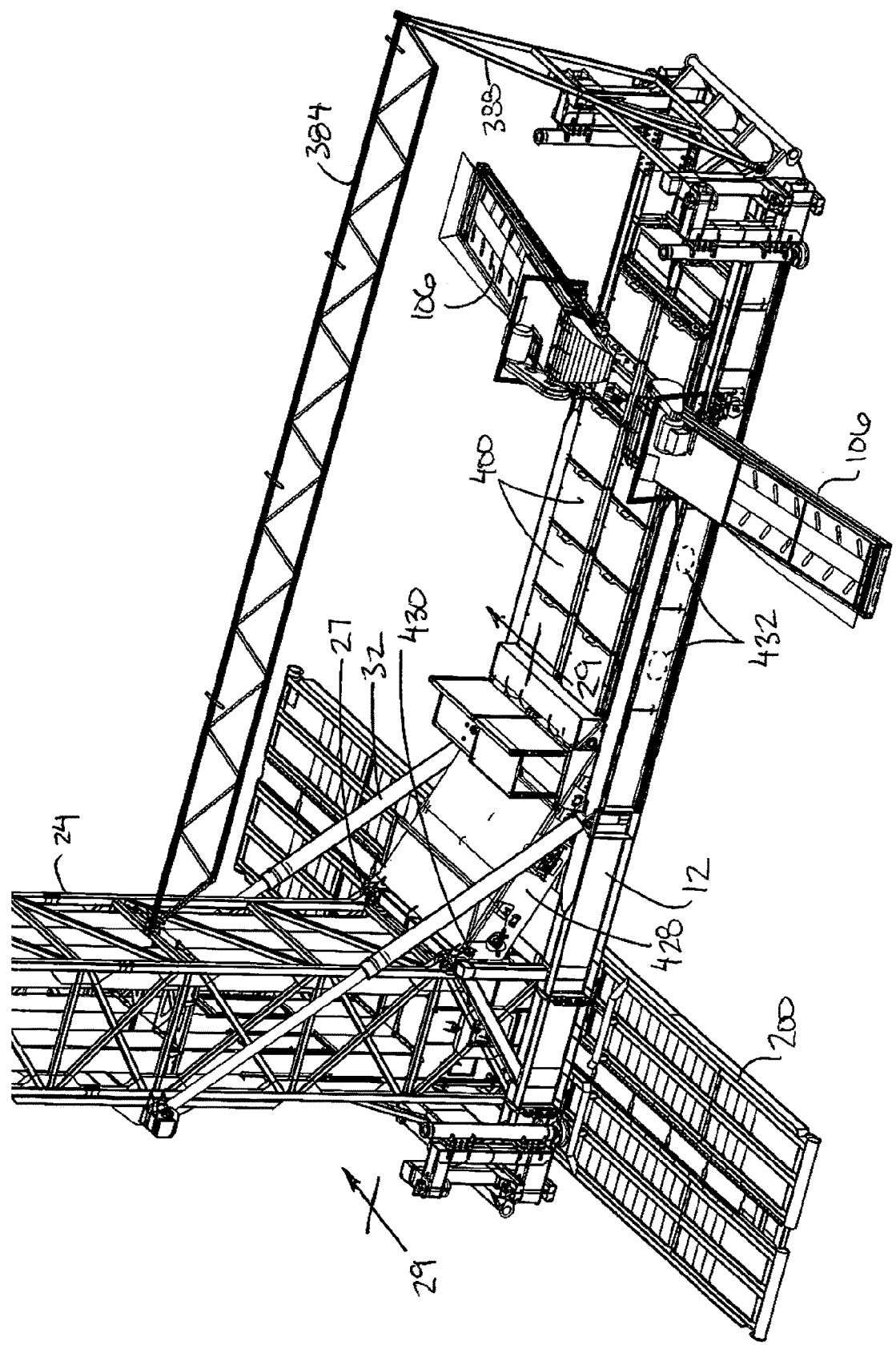
FIG. 2 is another perspective view of the portable conveyor assembly according to the first embodiment of FIG. 1 showing a bottom side of the assembly in a transport mode.

As illustrated in FIGS. 25 to 27, a cover system 380 may be deployable to extend over the main section 82 of the base frame 12, outward beyond the feed conveyors 106 to span over an operating area covered by the feed conveyors 106. The cover system 380 utilizes the cover 382 to extend over the area to be protected. The cover 382 may be a unitary component or may be in separate sections. The cover 382 may be rollable, such as a fabric or pliable polymer material, or may be foldable, such as a fabric, pliable polymer material, or paneled material. The cover system 380 may include a central support member 384 that extends from the main frame 26 of the elevating assembly 24 outward over the base frame 12. The central support member 384 is, in one embodiment, hingedly attached to the elevating assembly 24, such that the central support can pivot between a stowed position (vertical) to a deployed position (horizontal). The central support member may be a single beam, or a truss member as shown in the illustrated embodiment which extends longitudinally between a first end hinged onto the elevating assembly and an opposing second end opposite the elevating assembly.

The cover system 380 may be entirely removable from the elevating assembly 24, such as when not in use or for storing during transport. The central support 384 may be a solid, rigid structure such as a beam or pole. Alternatively, the central support 384 may be a flexible structure such as a rope, chain, band, or the like.

The central support 384 may be cantilevered to the main frame 26. Alternative, the central support 384 may be engaged with a support cable or wench to provide further support to the cover system 380.

The central support 384 may engage with a central support upright 388 to provide additional support when deployed. The central support upright 388 extends from the central support 384 to a solid surface, such as a portion of the base frame 12 or to the ground. The central support upright 388 may further be hingedly connected with the central support 384 to allow the structured to be stowed vertically.

In the illustrated embodiment, the central support member 384 extends horizontally and longitudinally outward from the main frame of the elevating assembly in a deployed position. The support upright 388 is pivotally coupled at an upper end to the outer end of the central support member 384 and is pivotally coupled at a lower end to the first end of the base frame. In this manner, the upright 388, the base frame 12, the central support member 384 and the main frame of the elevating assembly collectively form a four-bar linkage which collapses automatically to an undeployed position shown in FIG. 27 as the elevating assembly is displaced to the transport position.

The cover 382 may be deployable from the central support 384. For example, the cover 382 may wrap around the central support 384 or may be engaged with a spool, which may be biased to retract the cover 382. As seen in FIGS. 25 to 27, the cover 384 may include a plurality of cover support uprights 386 associated with each side of the base frame 12 where vehicles will unload. The cover support uprights 386 provide support to the cover 382 such that the central support 384 does not carry the entire load of the cover 382. In some embodiments, additional supports may be utilized, extending from the central support 384 to the cover support uprights 386 and/or from one upright support to an adjacent one.

In some embodiments, the cover support uprights 286 are engageable with each other. For example, adjacent cover support uprights 286 may be pivotable and are securable to each other, such as through a locking mechanism, threading, or other physical connection. In one embodiment, the cover support uprights 286 when joined as a pair are stowable within a pocket of the cover 382, such as may then be retracted or stowed along with the cover, such as by wrapping about a spool or being wound at the central support 384.

In a further embodiment the cover system 380 is engaged with one or both of the base frame 12 and the main frame 26 when in the transport state, such as illustrated in FIG. 1 and discussed above. For example, the central support 384 may attach to a portion of the main frame 26 and the cover 382 extends over the base frame and main frame 26. The cover may be secured to a transport trailer, rail car or the like. In one embodiment, the paired cover support uprights 286 are further secured to the transport trailer, rail car or the like, such where stowed in a pocket of the cover 382 or otherwise in a manner to secure the cover to the transport trailer, rail car or the like. This may facilitate a more secure retention of the system 10, may improve aerodynamics for transport, and/or may protect the system 10 from damage.

Turning now more particularly to the illustrated embodiment of the cover system 380 in FIGS. 25 to 28, the central support member 384 extends horizontally in the longitudinal direction of the base frame at a location spaced above the base frame so as to be generally centred in the lateral direction. The central support member 384 spans the full length of the base frame and beyond from a first end hinged to the mainframe of the elevating assembly to an opposing second end which is pivotally coupled to the central support upright 388. The central support upright 388 defines an A-frame which is pivotally supported at laterally opposing sides of the base frame at the bottom end thereof while being centrally pivoted to the central support member 388 at the top end thereof. In the working position shown in FIG. 26, the central support member forms an apex or ridge of the cover sheet 382 with two side portions of the cover 382 being defined at laterally opposing sides extending downwardly and outwardly from the central ridge.

To provide support to the cover sheet 382, a plurality of roof support members 390 are connected along each side of the central support member 384 to extend laterally outwardly therefrom at a downward slope for connection at the outer end thereof to the top end of a respective support upright 386. The support uprights 386 form a row of longitudinally spaced apart uprights at a location spaced laterally outwardly from each of the laterally opposing sides of the base frame once the cover is erected. The support uprights 386 are spaced apart from the side of the base frame and the height of the uprights support the cover at a sufficient height such that a traffic lane or passageway is defined extending longitudinally along each of the opposing sides of the base frame of suitable dimensions to allow passage of a suitable transport truck such as a highway truck tractor and trailer combination passing longitudinally therethrough under the cover.

The roof support members 390 and the support uprights 386 are all connected to one another and to the central support member 384 with releasable pin or bolt connections to permit disassembly thereof when the cover 382 is retracted. In a preferred arrangement, each of the side portions of the cover is rolled up onto a respective roller or drum extending the length of the central support member at a respective side of the central support member. The rolled up side portions of the cover can remain stored at opposing sides of the central support member 384 as the central support member is pivoted from the working position to the stored position shown in FIG. 27. In the stored position of FIG. 27, the cradle frame 30 at the first end of the base frame may include a suitable gap formed centrally therein to accommodate passage of the truss of the central support member 384 extending therethrough.

Figure 30:
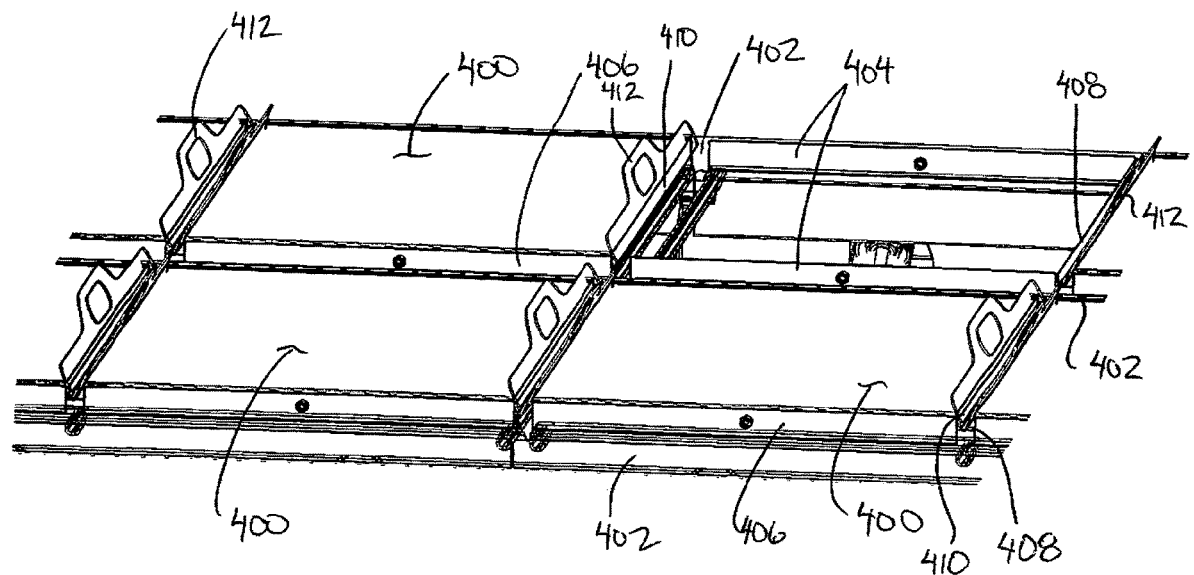
FIG. 30 is a perspective view of a portion of the shroud over the main conveyor assembly in the portable conveyor system according to the embodiment of FIG. 25.

The cover system 380 noted above is suitable for keeping precipitation out of the main conveyors, however, it remains desirable to further to provide shade for operators unloading trucks and to further maintain a suitable shroud or cover directly over the main conveyors to contain dust as described above. Although the cover may assume various configurations using flexible materials which are rolled up or extended or removed in various manners, in the illustrated embodiment of FIG. 30, the shroud for the main conveyor comprises a plurality of removable cover panels 400 supported in series with one another in a longitudinal row over each of the main conveyors. The main conveyor assembly in this instance is enclosed by suitable rails 402 along the top side thereof which supports the cover panels 400 to span across the opening between the rails. Each cover panel 400 spans a full width of the opening between the rails. At a desired discharge location for each one of the feed conveyors 106, the corresponding cover panel 400 can be removed such that the exposed portion of the opening between the rails allows material to be discharged from the feed conveyor onto the main conveyor through the exposed portion of the opening.

A set of upstanding flanges 404 are provided along each of the rails 402 at opposing sides of the top opening of each main conveyor. Each cover panel 400 extends laterally across the opening beyond the upstanding flanges 404 so that depending flanges 406 at laterally opposing sides of the cover panel extend downwardly over the outer sides of the respective upstanding flanges 404 to hold the lateral position of the cover panel relative to the main conveyor. Cooperating fastener holes may be provided in the flanges to permit insertion of pins or fasteners which hold the cover panels in fixed relation to the frame or housing of the respective main conveyor.

To prevent precipitation leaking through the gap between adjacent panels 400 and to provide a more secure connection between adjacent panels to prevent escape of dust therethrough, each cover panel 400 is provided with a channel 408 at a first end of the panel to span laterally across the full width thereof and a depending flange 410 at the longitudinally opposing end which also spans the full width in the lateral direction of the panel. The channel forms a trough having an open top side which receives the depending flange 410 of an adjacent cover panel inserted downwardly therein. The channel thus acts as a gutter to direct precipitation laterally outwardly to opposing sides of the conveyor. A pair of handles 412 may be further fixed at longitudinally opposed ends of each cover panel to facilitate manual handling of the cover panels by operators removing and reattaching the cover panels to the housing of the main conveyor.

Figure 38:
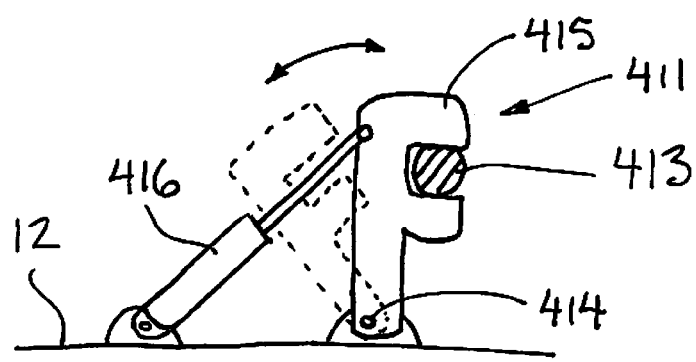
FIG. 38 is a schematic representation of the clamp for securing the elevating assembly in the extended working position according to the embodiment of FIG. 25.

Turning now more particularly to FIG. 29, the main frame of the elevating assembly 24 is again shown pivotally connected by pivots 27 which pivot the frame of the elevating assembly relative to the lateral beam 28 of the base frame 12 under control of the lift actuators 32. Once the elevating assembly is erected into the working position, the frame of the elevating assembly 24 may be fixed in the working position relative to the base frame independently of the lift actuators 32 by use of a set of clamps 411 fixed onto the base frame at the second end thereof for selective engagement onto latch bars 413 fixed onto the main frame of the elevating assembly 24. The latch bars 413 are fixed onto the rear side of the elevating assembly opposite the main conveyors at the bottom end thereof in close proximity to the bottom side of the elevating assembly. As seen in FIG. 38, in one embodiment, the clamp 411 is a "c" clamp that engages with the latch bars 413. The c-clamp may be utilized for securing the latch bars 413 to secure the elevating assembly 24 to the base frame 12. The c-clamp includes a hinge pin 414 and a securing end 415 that transitions from an open position to a closed or secured position. The c-clamp may be pivoted about the pivot pin to capture the latch bar 413. A hydraulic device 416 may be used to position the c-clamp. As the c-clamp pivots and captures the latch bar 413, a securing device, such as the securing end 415, is positioned to secure the latch bar 413 within the clamp. The clamp 411 provides a mechanical connection between the elevating assembly 24 and the base frame 12 to secure the two structures, such as against failure of the lift actuators 32.

In yet further embodiments, when used together with an outrigger platform 200, the clamps 411 may latch the latch bars 413 of the main frame of the elevating assembly relative to the platform 200 instead of the base frame 12 if the platform 200 is already fixed relative to the base frame.

To provide further redundancy in the event of failure of the lift actuators 32, a winch may be provided at the rear side of the elevating assembly corresponding to the second end of the base frame. The winch is operatively connected between the base frame and the elevating assembly in a manner which allows the elevating assembly to be raised from the stored transport position to the upright working position under power from the winch.

In the embodiment of FIGS. 25 through 33, the platform or walkway 76, such as seen in FIG. 32, at the top of the frame of the elevating assembly for supporting workers thereon may be cantilevered to protrude laterally outwardly at both sides of the system, as well as protruding forwardly and rearwardly from the front and rear sides to substantially fully surround the elevator frame at the top end thereof with the exception of a gap at the location of the discharge chutes 42 which communicate with the discharge spouts 50. Even though the platform 184 does not extend about the full perimeter of the frame of the elevating assembly, the platform extends rearwardly alongside both of the discharge chutes 42 to provide support for workers to service all components of the bucket elevators at the discharge chutes 42 including accessing the upper collars 436 locating retainer bars 445 therein as described below.

With further reference to FIG. 29, one of the bucket elevators 34 is shown in cross-section in which the endless loop 420 supporting the buckets 422 thereon is shown passing through the intake housing 38 at the bottom between the front and rear ducts of the elevator housing. The intake chute 44 is shown with the bottom wall 46 thereof connected to the bottom edge of an intake opening 424 formed in the front vertical wall of the housing of the bucket elevator. An impingement plate 426 is mounted within the intake chute directly above the intake opening 420 so as to lie in a common plane therewith. The impingement plate comprises a rigid plate of hard, wear resistant material relative to the material of the housing, and is mounted with threaded fasteners to the wall of the housing above the intake opening to permit replacement as may be desired. The discharge end of the corresponding main conveyor is supported to be near in elevation to the impingement plate so that material conveyed by the main conveyor is thrown onto the impingement plate, producing a falling sheet or curtain of conveyed material spanning across the intake opening therebelow. The curtain of falling material discharged by the main conveyor provides a curtain over the intake opening which prevents escape of material from the intake housing of the bucket elevator despite material within the intake housing of the elevating assembly being thrown by the momentum of the buckets towards the intake opening.

As further shown in FIG. 29, all of the rollers 92 of the main conveyor are supported on a respective conveyor frame 428 comprised of two side rails spanning longitudinally the full length of the inclined and main sections of the main conveyor. The side rails of the conveyor frame 428 are hinged onto the base frame 12 by suitable pivots 430 defining a pivot axis of the conveyor frame 428 relative to the base frame 12. The pivots 430 are coupled to the base frame in close proximity to the pivotal connection 27 of the elevating assembly to the base frame at the lateral beam 28 of the base frame 12. In this manner, the entirety of the conveyor frame 428 including the main conveyors supported thereon can be elevated relative to the base frame using a suitable lift actuator or by connection to a crane and the like at the first end of the conveyor frame opposite from the pivot connection. Lifting of the conveyor frame provides access beneath the main conveyors for cleaning out, for maintenance, or for accessing storage areas within the base frame.

To provide further access to the interior of the base frame 12, a plurality of access hatches 432 may be provided in the sidewalls of the base frame 12 in the main beams 14 at laterally opposing sides of the base frame. Opening of the access hatches 432 provides access for vacuum lines and like to clean out the area below the main conveyors if desired.

With continued reference to FIG. 29, some of the rollers supporting the belt of the main conveyors may define a belt scale 434 which measures the mass of material passing over the belt scale to measure the rate of material being conveyed. The belt scale is preferably located at the inclined section of the main conveyor so as to ensure that material deposited on the main conveyor by all feed conveyors 106 are collectively measured at a location downstream from all feed conveyors on the main conveyor. Such belt scales 434 may be used together with a display unit reflecting the data collected by the belt scale 434, among other information, and are preferred embodiments as high limits are established and the PLC could control the downstream truck unloader to ensure that its belt speed or operation is limited to operate strictly under the established high limit in order to ensure that the conveying systems are not overloaded with their particulate material, meanwhile the operator being equipped with the information can also determine if unloading is being completed at rates lower than maximum design unloading rates can thus increase its unloading rate without fear of exceeding maximum conveyor capacity.

Figure 31:
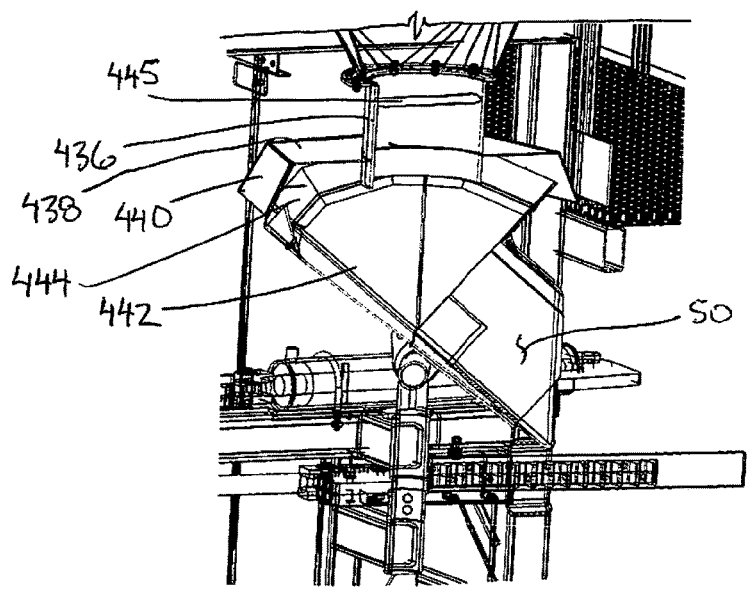
FIG. 31 is a sectional view of a connection between the discharge housing of the elevating assembly and one of the discharge spouts in the portable conveyor system according to the embodiment of FIG. 25.

To ensure containment of conveyed material at the transition from the discharge housing 36 of the bucket elevators to each of the discharge spouts 50, the transition collars 58 described above, and best shown in FIG. 12, may instead be replaced with a transition connection as shown in FIG. 31. In this instance the discharge outlet of the discharge housing for each bucket elevator discharges into an upper collar 436 which is fixedly connected to an annular shroud 438 extending radially outward from the upper collar. A downward lip 440 may extend downward from the outer end of the annular shroud 438 about the full perimeter thereof. A lower collar 442 is fixed to the upper end of the corresponding discharge spout. The lower collar 442h forms a tapered hopper that tapers downwardly and inwardly from an upper edge having an outer diameter which is much greater than the inner diameter of the upper collar 436 to a bottom end having an inner diameter approximately equal to the inner dimensions of the remainder of the discharge spout extending therebelow. The upper edge of the lower collar 442 is supported in close proximity to the bottom surface of the annular shroud 438 of the upper collar while being substantially concentric with the upper collar. A flexible seal 444, for example an annular brush seal, extends upwardly from the top edge of the lower collar in sliding contact with the bottom surface of the annular shroud 438. The flexible seal 444 allows free pivotal movement of the lower collar 442 relative to the upper collar while maintaining a sealing interface therebetween which prevents the escape of dust.

One or more retainer bars 454 is mounted in the upper collar 436 to span across the collar in a manner which does not interfere with the flow of particulate material through the collar. In the event that any components of the corresponding elevator are broken, such as one of the buckets of the bucket elevator becoming detached or broken from the endless loop, then the corresponding components are retained above the upper collar and prevented from falling into the corresponding discharge spout 50 so as to prevent any damage to the spout. The retainer bar 445 may be yet further provided in an enlarged cross-sectional area of the discharge housing above the upper collar such that any broken components retained on the retainer bars do not fully obstruct the flow of material to the discharge spout 50.

With reference to FIGS. 32 and 33, at the discharge end of each discharge spout 50, an outlet housing 446 is provided having a hinged or pivotal connection to the tubular body of the discharge spout 50 as shown in FIG. 33. The outlet housing 446 includes a bottom opening for discharging material from the spout therethrough into downstream equipment. An annular mounting flange 448 extends radially outward from the discharge outlet housing 446 about the full circumference of the bottom opening. The annular mounting flange is arranged for mounting about the perimeter of an intake opening of the downstream equipment. The annular mounting flange 448 pivots together with the outlet housing 446 relative to the discharge spout to enable the angular orientation of the annular mounting flange to be adjusted relative to the spout for proper alignment with the perimeter edge of an intake opening of the downstream equipment receiving the discharged material.

Figure 39:
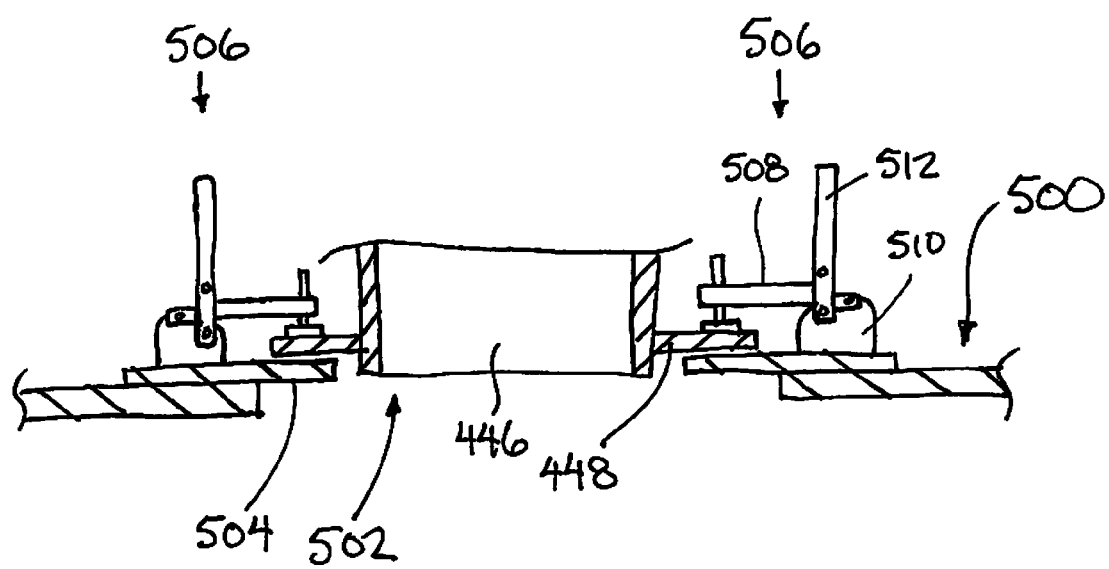
FIG. 39 is a schematic representation of the discharge outlet housing according to FIG. 33, shown coupled to downstream equipment.

As shown in FIG. 39, the downstream equipment 500 may be provided with an inlet opening 502 through which the material discharged from the conveyor system 10 is received. The annular mounting flange 448 of the discharge outlet housing 446 can be secured to the downstream equipment by clamping the annular mounting flange 448 against the outer surface of a corresponding annular mounting flange 504 that extends about the perimeter of the inlet opening 502. This is accomplished in the illustrated embodiment by a pair of clamping assemblies 506 supported at diametrically opposing sides of the inlet opening 502. Each clamping assembly 506 includes a clamping arm 508 which is pivotally coupled to a base 510 of the assembly to be movable between a clamped position and a released position. In the clamped position, the annular mounting flange 448 of the discharge spout is held clamped by the clamping arm against the annular mounting flange 504 of the downstream equipment. In the released position, the discharge spout is freely movable away from the downstream equipment. A lever arm 512 is operatively connected between the clamping arm 508 and the base 510 so as to be operable between a latched position retaining the clamping arm in the clamped position and an unlatched position allowing the clamping arm to be released.

Figure 12:
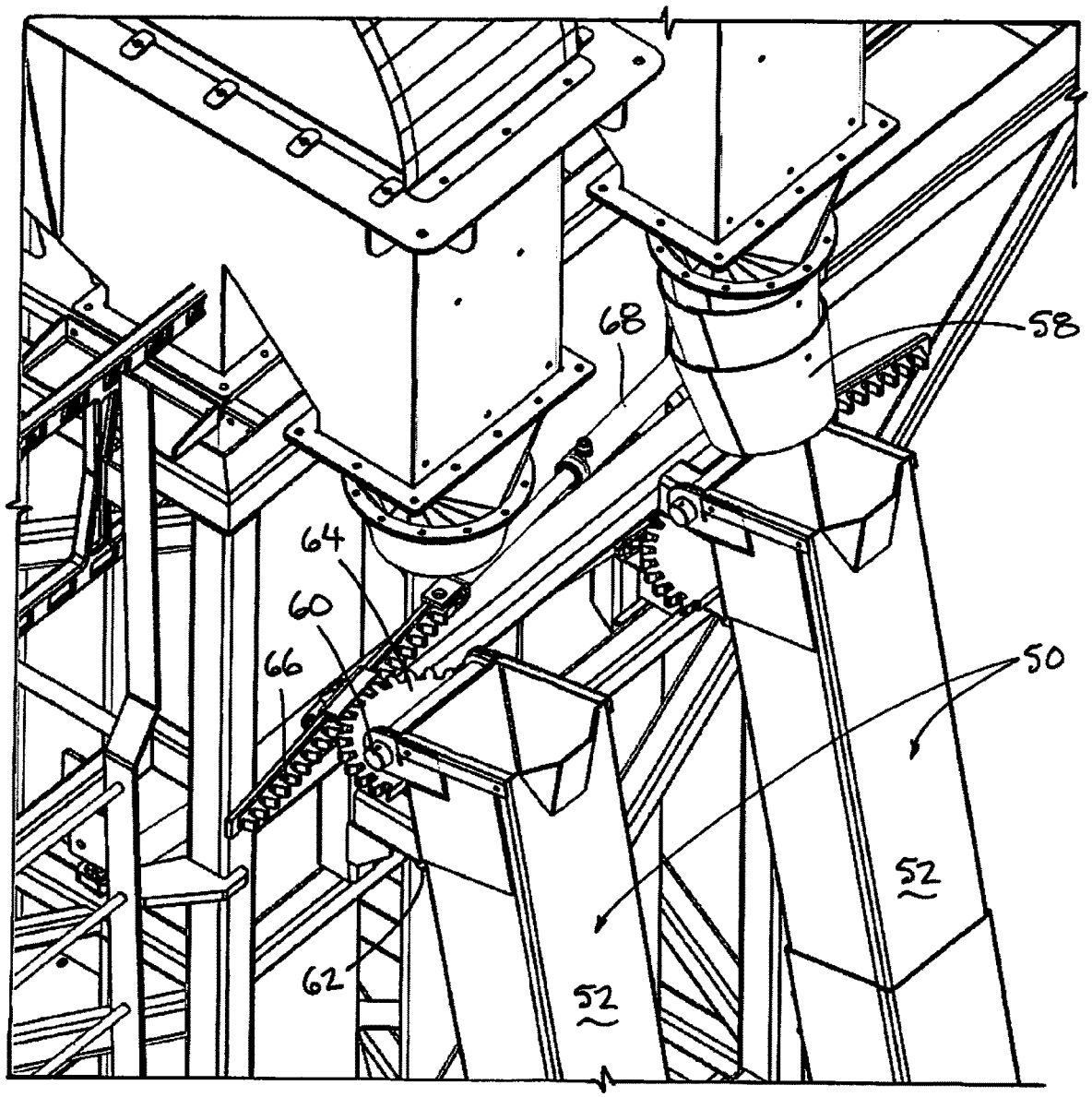
FIG. 12 is a perspective view of the first and second discharge spouts according to the first embodiment of FIG. 1 in which some of the components have been removed for illustrative purposes.
Figure 13:
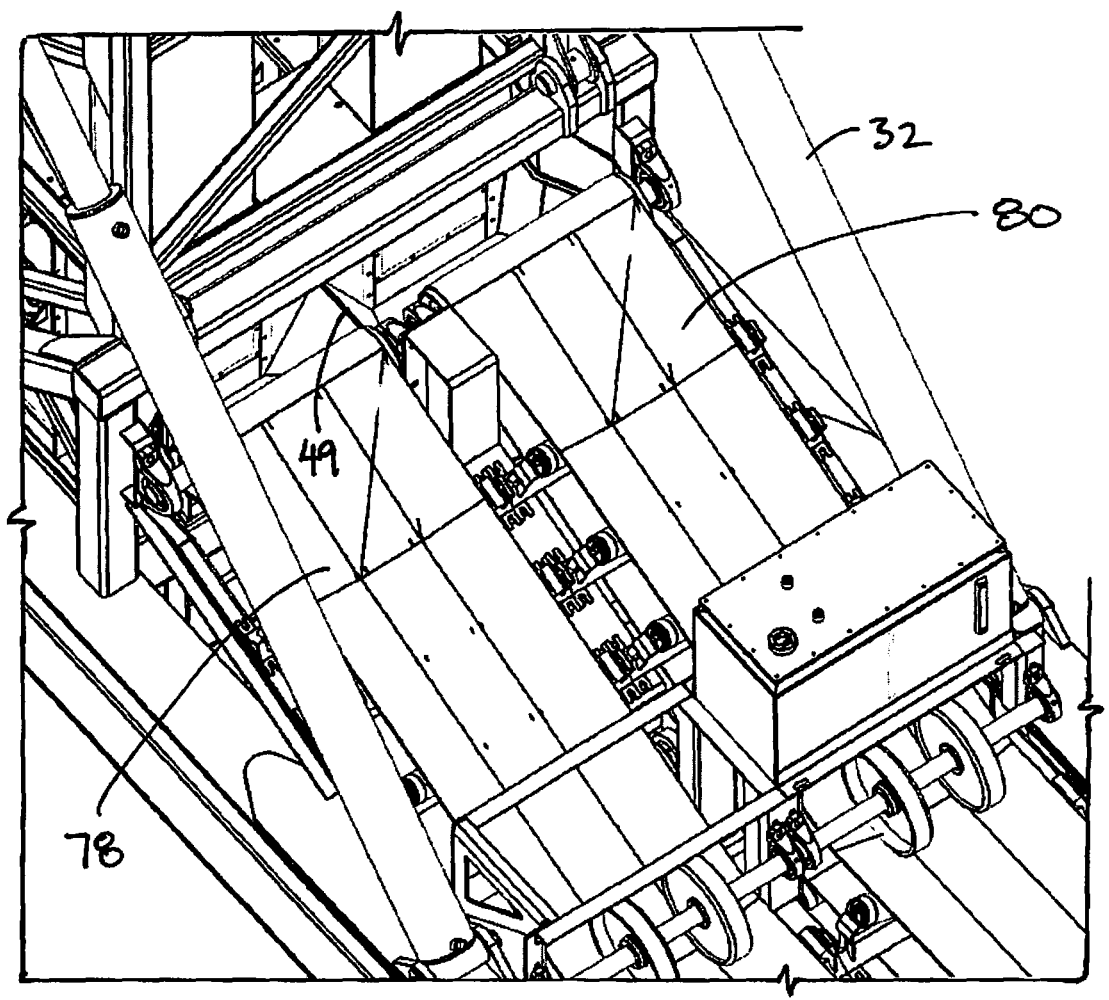
FIG. 13 is a perspective view of the intake chute of the elevating assembly according to the first embodiment of FIG. 1.

To enable each discharge spout to be optimally positioned to extend from the conveyor system 10 described herein to downstream equipment, the discharge spouts are supported as described above according to the previous embodiment illustrated in FIG. 12 using a horizontal pivot axis to control tilt with a tilt actuator 70 and a vertical shaft 62 to control swinging using swing actuators 68 acting on rack members 66 to pivot gear members 64 that pivot with the spouts. The embodiment shown in FIGS. 25 through 33 differs from the previous embodiment of FIG. 12 in that the tilt actuators 70 are coupled to the main frame of the elevating assembly by a multi-directional pivoting mechanism, such as, but not limited to a ball and socket connection 450, to enable multi-directional pivoting of the tilt actuator about both vertical and horizontal axes in any direction rather than relying upon a vertical pivot 72 as described in previous embodiment.

As seen in FIG. 32, the discharge spouts 50 in FIG. 32 are further provided with an eyelet 452 fixed onto the discharge spout 50 in proximity to the top end thereof to enable connection of a flexible tether between the eyelet and a suitable mounting location on the main frame of the elevating assembly. In the event of the breakage of the pivotal connections of the spout 50 to the frame of the elevator, the tethered connection prevents excessive damage to the spouts 50 which would otherwise result if the spouts 50 fell to the ground.

To further prevent damage to the spouts 50 in the event that the extension actuator 56 fails, the telescopic junction between the first duct 52 and the second duct 54 of each discharge spout is further arranged to prevent the second duct from sliding off of the bottom end of the first duct. More particularly the bottom end of the upper first duct is provided with an outwardly protruding lip or lugs 454 defining an overall outer dimension at the bottom end of the first duct which is greater than an inner diameter formed at the top end of the lower second duct 54. Once the second duct has been inserted partially over top of the bottom end of the first duct, a suitable retainer 456 is bolted onto the top end of the second duct forming a hook or ledge which protrudes inwardly in interference with the lugs 454. The interior surface of the ducts 50, such as one or more of the first duct 52 and the second duct 54, may include a coating, lament, or surface to resist abrasion and impact damage. For example, the interior surface may comprise a high molecular weight polyethylene. The interior dimension of the second duct throughout the majority of the length of the second duct is greater than the transverse dimension at the bottom end of the first duct formed by the lugs 454 so as not to interfere with relative sliding between the duct 50; however the interior dimension transverse to the length of the spout at the location of the retainer 456 is reduced relative to the transverse dimension at the bottom end of the first duct such that the second duct can no longer be removed from the first duct once the retainer 456 is bolted in place.

The embodiment of the conveyor system 10 according to FIGS. 25 through 33 is further provided with a display 498 supported on the frame of the elevating assembly 24 at an intermediate height positioned well above the height of the cover system. The display 498 is operatively connected to belt scales on the main conveyor and/or the feed conveyors for displaying the flow rate of material being conveyed by the various conveyors such that the information is readily visible throughout the worksite where the conveyor system 10 is located. The display can also be operatively connected to various sensors associated with the downstream equipment being fed by the conveyor system 10. For example when the downstream equipment comprises a storage unit, for example one or more storage silos for storing the conveyed material, the sensors associated with the downstream equipment may include level sensors for detecting the volume of material being stored relative to the overall containment volume so that this additional data can also be displayed on the display 498.

Figure 34:
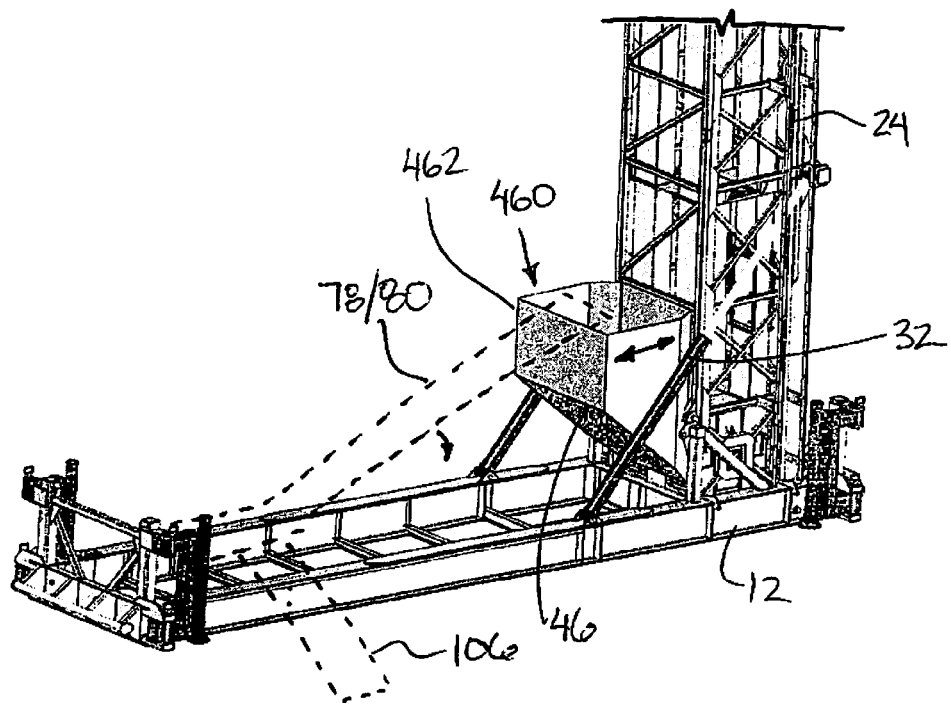
FIG. 34 is a perspective view of a further embodiment of the portable conveyor system, shown in an extended working position of the elevating assembly.
Figure 35:
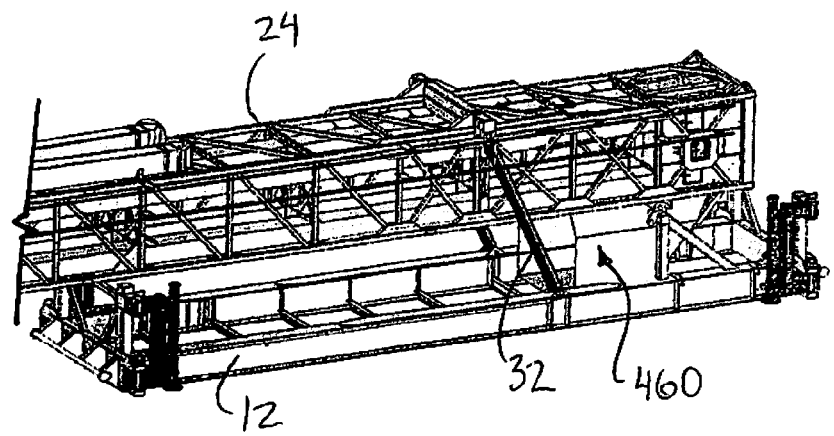
FIG. 35 is a perspective view of the portable conveyor system according to the embodiment of FIG. 34, shown in a stored transport position of the elevating assembly.

Turning to FIGS. 34 and 35, according to a further embodiment the intake chute 44 of the elevating assembly 24 according to previous embodiments is replaced with a surge bin 460 to allow a large accumulation of material discharged from the main conveyor assembly to be more gradually fed from the surge bin into the intake housing of the elevating assembly. When the main frame of the elevator assembly 24 is pivotal relative to the base frame 12 by pivots 27 on the lateral beam 28 of the base frame according to previous embodiments, the surge bin 460 extends well above the elevation of the pivots 27 such that a majority of the height of the surge bin and a majority of the containment volume of the surge bin extends above the pivot. A lower portion of the surge bin includes a bottom wall sloping downwardly and towards the intake opening of the intake housing 38 at the bottom of the elevators similarly to the bottom wall 46 and the side walls 48 of the intake chute 44 described above, however, the surge bin 460 differs from the intake chute of previous embodiments by further including an upper portion defined by perimeter walls 462 which extend vertically upward from the lower portion. The upper portion extends above the height of the pivots 27 on the lateral beam 28. The surge bin 46 in the illustrated embodiment is fixed relative to the main frame of the elevating assembly so as to be pivotal together with the elevating assembly between the working position and the stored transport position thereof. The depth of the surge bin in the longitudinal direction of the base frame protruding forwardly from the elevating assembly frame in the working position is less than the height of the lateral beam 28 from the bottom of the base frame 12 to provide space for the surge bin to be received between the stored elevating assembly frame and the base frame as shown in FIG. 35. The surge bin 460 has an open top end for receiving material discharged therein from the main conveyors 78 and 80. A suitable cover or shroud system would again be provided over top of the transition between the main conveyors and the open top end of the surge bin for containment of dust.

The surge bin illustrated may comprise a single bin which collectively receives material from one or more main conveyor assemblies and controllably discharges the collected material at a prescribed discharge rate to one or more elevating assemblies. In the instance of more than one elevating assembly, a controllable discharge is independently associated with each elevating assembly to enable the rate of discharge to the plurality of elevating assemblies to be independently controlled. The surge bin may also comprise multiple surge bins associated with the plurality of elevating assemblies respectively and/or associated with the plurality of main conveyor assemblies respectively. That is, each surge bin may receive material from one associated main conveyor and/or discharge material to one associated elevating assembly. In yet further arrangements, one or more surge bins may be provided with multiple compartments therein, for example using a divider which may be adjustable to direct collected material within each compartment to a selected one of a plurality of elevating assemblies.

The surge bin may be on a common skid with both the elevating assembly and the main conveyor assembly. Alternatively, when the main conveyor assembly and the elevating assembly are on different skids, the surge bin may be located (i) on the same skid as the main conveyor assembly, (ii) on the same skid as the elevating assembly, or (iii) on its own independent skid separate from both the main conveyor assembly and the elevating assembly.

In further embodiments, the surge bin may be equipped with a sensor, such as a load cell, laser, radar or other similar sensor, which signals a high limit in the surge bin in order to shutdown downstream conveying equipment including the main conveyor and truck unloading conveyor, in order to prevent overfilling of the surge bin.

In further embodiments, the surge bin may be formed of frame members supporting panels of material to form the walls of the surge bin in which the frame members can be folded, pivoted or otherwise collapsed so that the corresponding panels supported thereon are similarly folded or collapsed by various means, for example by being hinged or by being formed of flexible materials.

In the embodiment of FIGS. 34 and 35, the main conveyors 78 and 80 may be supported with a longer inclined section at a steeper inclination as compared to previous embodiments described above. Furthermore, the main conveyors may be supported to allow the inclined section to be raised and lowered in elevation relative to the base frame, for example by instead being pivoted on the base frame at the first end 16 thereof. In this instance, the main conveyors may be movable at the second end nearest to the surge bin between a working position with the discharge end above the open top end of the surge bin as shown in broken line in FIG. 34, and a stored position in which the discharge end of the main conveyors are lowered in elevation so as to be received within the space between the stored frame of the elevating assembly and the base frame there below in the orientation of FIG. 35. Even when the main conveyors include an inclined section which is steeper in inclination, the main conveyors preferably would again include a main section which is near horizontal in orientation relative to which the feed conveyors 106 are coupled in a manner similar to previous embodiments described above.

In further embodiments, the elevating assembly and surge bin according to FIG. 34 may be used in cooperation with other main conveyor systems with feed conveyors for receiving material discharged from transport vehicles and for loading the collected material into the surge bin. These other main conveyor systems may be deployed on their own independent base frames having a similar skid base for ease of transport between different sites.

In further embodiments, the surge bins could be lowered in elevation along the elevating assembly prior to folding of the elevating assembly for transport. The surge bins could also be provided as separate units supported on respective wheels for wheeling the surge bins into position between the main conveyors and the intake of the elevating assemblies.

The lower portion of the surge bin functions as a hopper with suitable feed controls such as a controllable discharge including an adjustable gate or other suitable metering system to discharge material from the surge bin to the elevating assembly at an controllable and adjustable prescribed rate to ensure that the intake of the elevating assembly is not overloaded beyond the operating rate of the elevators but allows the main conveyors to be periodically operated at a rate exceeding the collection rate of the elevators by allowing the collected volume within the surge bins to accumulate. In this manner, the main conveying assembly can operate at a greater rate than the elevating assembly while trucks are unloading, resulting in material accumulating within the surge bins. The accumulated material in the surge bin can then be used to continue to feed the elevating assembly at a maximum rate of operation of the elevating assembly while changing trucks at the feed conveyors which results in an interruption in the loading of material into the surge bin by the main conveyors.

In this instance, the feed conveyors for unloading from trucks could be wide belts, for example 60 inch belts run flat at very high speeds so that the truck hatches can be fully opened at 600 or more MT/hr feeding into the surge hopper. The feed conveyors which unload the trucks would either pivot or flip up to clean under the feed conveyors. A screener could be mounted under the surge hopper and over the elevator boot so that a person can service the screen.

The surge bin may be one surge bin which has two compartments, each feeding separate elevators, or may be two separate surge bins in which each has a surge bin capacity, such as three to five MT. The surge bin provides a buffer between the discharge rate from the trucks and the uptake rate from the elevator. The surge bin capacity may be utilized as a flexible buffer between the rate of discharge from the truck(s) and the rate of uptake from the elevator, with the surge bin filling when the truck rate is greater than the uptake rate and the surge bin emptying when the truck rate is less than the uptake rate. Thus, the rate that material is being put into the surge bin (from the truck(s)) and taken out of the surge bin (by the elevator) may not be equal at some times. When using a surge bin which is maintained near full capacity at all times, for example that is operating at 600 MT/hr, the theoretical unload rate is 14,400 MT/day. The surge bin would be simultaneously discharged at the same rate as the elevating conveyor is designed to operate, which for instance could be 300 MT/hr, which would permit the truck unloader operator to use the surge bin to store the incremental amount which would be delivered into the elevator at moments when the truck would be repositioning to another truck compartment for unloading, thus unlocking the ability for the system to unload trucks in record time and to expand effective conveying utilization rates for the elevator.

Figure 36:
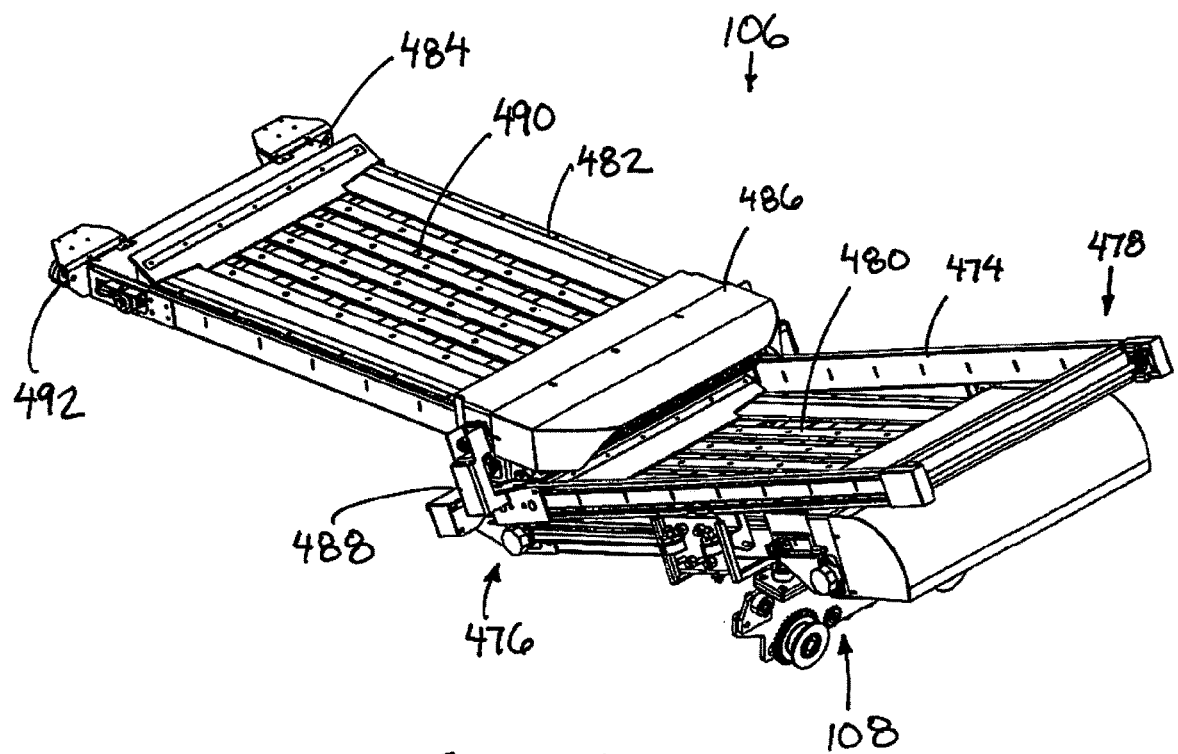
FIG. 36 is a perspective view of a further embodiment of one of the feed conveyors usable in place of the feed conveyors shown in any of the embodiment of the portable conveyor system noted above.
Figure 37:
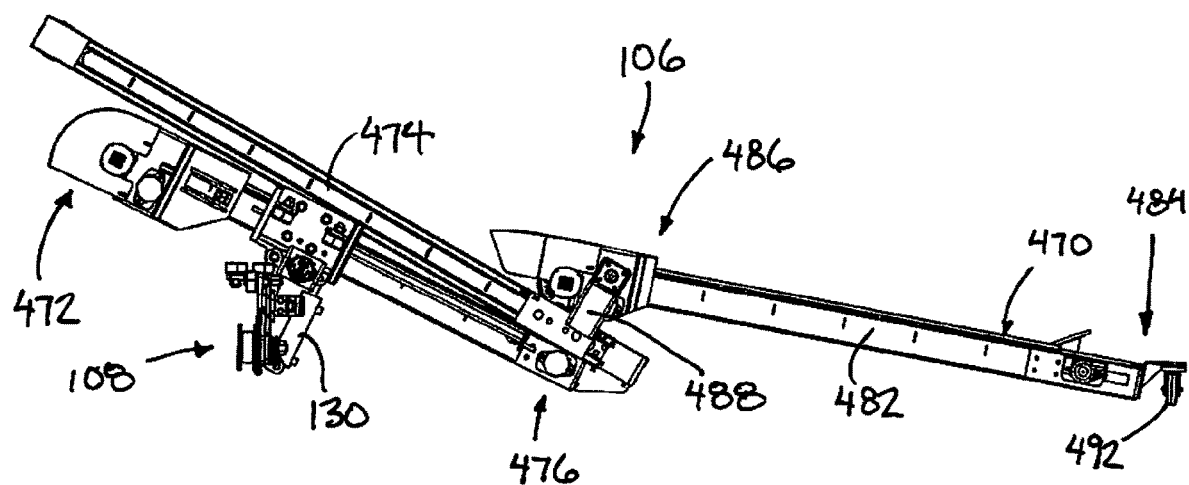
FIG. 37 is a side elevational view of the feed conveyor according to the embodiment of FIG. 36.

In any of the above embodiments of the conveyor system 10, the feed conveyors may be replaced with modified feed conveyors 106 according to FIGS. 36 and 37. In this instance the feed conveyor is extendable in length in the feed direction of the conveyor between the intake opening 470 and the discharge opening 472 thereof. In this instance the feed conveyor includes an upper frame section 474 having two side rails extending from a first end 476 to a second end 478. The second end 478 supports the discharge outlet 154 thereon and is coupled to a carriage frame 108 using a tilt frame 128 controlled by tilt actuator 130, optionally together with the vertical swing shaft 122 according to the previous embodiment of the feed conveyor. The discharging of material through the outlet 154 is similar to the previous embodiment. The upper frame section supports an upper conveyor belt 480 thereon for rotation between two end rollers at the first end 476 and the second end 478 with a suitable pan or intermediate rollers supporting the moving belt in the usual manner to convey material from the first end towards the second end. The top side of the upper frame section is open towards the first end 476 to allow material to be deposited thereon for conveying the material to the discharge outlet 154.

The feed conveyor according to FIGS. 36 and 37 further includes a lower frame section 482 having two side rails extending longitudinally between a first end 484 and a second end 486 of the lower frame section. The lower frame section supports a lower conveyor belt 490 thereon for rotation between two end rollers at the first end 484 and the second end 486 with a suitable pan or intermediate rollers supporting the moving belt in the usual manner to convey material from the first end toward the second end.

An intermediate carriage frame 488 is coupled to the rails of the upper frame section for longitudinally sliding along the rails. The second end of the lower frame section is hinged onto the intermediate carriage frame 488 such that the second end of the lower frame section is longitudinally displaced along the upper frame section from an extended position in which the second end of the lower frame section is in proximity to the first end of the upper frame section to a retracted position in which the second end of the lower frame section is closer in proximity to the second end of the upper frame section.

The lower frame section is hinged relative to the upper frame section about a lateral hinge axis which is perpendicular to the feed direction of the feed conveyor. Wheels 492 are coupled to the first end 484 of the lower frame section for rolling engagement with the ground. The wheels may comprise castor wheels which (i) can role in the lateral direction relative to the feed conveyor for rolling longitudinally along the ground as the feed conveyor is displaced longitudinally along the base frame, or (ii) may support the first end of the lower frame section for rolling movement of the ground in the feed direction as the lower frame section is extended and retracted relative to the upper frame section. In this manner, as the lower frame section is extended and retracted relative to the upper frame section, with the wheels 492 following the ground, the lower frame section may freely hinge relative to the upper frame section for varying the inclination of the lower frame section due to the hinging of the lower frame section on the intermediate carriage frame 488.

The top side of the lower frame section is open towards the first end 484 to allow material to be deposited thereon. The lower belt 490 of the lower frame section conveys material deposited onto the open top side of the lower frame section at the first end thereof towards the second end of the lower frame section. An intermediate discharge outlet 494 is provided at the second end of the lower frame section for receiving material discharged from the lower belt conveyor and for directing the discharged material into the intake opening at the top side of the first end of the upper frame section. The intake opening extends a majority of the length at the top side of the upper frame section to enable material to be deposited from the lower belt onto the upper belt through a large range of longitudinal movement of the lower frame section relative to the upper frame section corresponding to a large range of overall lengths of the feed conveyor 106 from the first end of the lower frame section 482 to the second end of the upper frame section 474.

As in previous embodiments, flexible shrouds may be provided for enclosing the top side of the upper frame section between the intermediate discharge outlet 494 of the lower frame section and the intake opening at the top side of the upper frame section. The flexible shroud would enable the majority of the upper frame section to be enclosed at the top side thereof when the lower frame section is fully extended, yet does not interfere with movement of the lower frame section towards a retracted position.

The extension and retraction of the overall length of the feed conveyor according to FIGS. 36 and 37 is particularly suited for (i) retracting the feed conveyor as vehicles enter and exit the longitudinally oriented traffic lanes along laterally opposing sides of the base frame, and (ii) extending the feed conveyor under the vehicle for alignment with the discharge outlet of the vehicle once the vehicle is stationary alongside the base frame for unloading.

Alternatively, the feed conveyor may be extended and retracted relative to the carriage frame 108 as described above with regard to previous embodiments to allow vehicles to enter and exit the vehicle lanes along opposing sides of the base frame, while the extension and retraction of the lower frame section relative to the upper frame section is used primarily for fine-tuning the alignment of the intake opening of the feed conveyor with the discharge outlet of the vehicle.

In general, any of the embodiments of the conveyor system 10 described herein may be operational with various configurations of the feed conveyors 106. Typically, the feed conveyors are supported for shuttling movement so as to be longitudinally slidable along the base frame 12 at least along the length of the main sections of the main conveyors onto which material is deposited from the feed conveyors. Suitable mechanical or hydraulic actuators are provided for raising or lowering the feed conveyors relative to the base frame in each instance. In some embodiments, the feed conveyors can be supported on the carriage frames both (i) for pivoting movement about upright axes to pivot the feed conveyors in and out of the truck lanes for unloading and (ii) for a telescoping type sliding movement in the feed direction of the feed conveyor 106 which is typically transversely oriented relative to the longitudinal direction of the base frame.

Accordingly either by pivoting, telescoping, or a combination thereof, each feed conveyor can be displaced between a working position protruding laterally outward from a lateral boundary of the base frame into the traffic lane of a transport truck for collecting material discharged from beneath the truck and a stored position in which the feed conveyor is retracted laterally inwardly towards the base frame in a non-interfering manner relative to the corresponding truck lane alongside the base frame so as not to interfere with trucks driving into and out of a loading position alongside the base frame. When the feed conveyors are further configured to be longitudinally extended and retracted in length according to the embodiment of FIGS. 36 and 37, the extension and retraction of the lower frame section relative to the upper frame section can work together with pivoting and telescoping relative to the base frame or in place thereof to similarly support the feed conveyor for movement between a working position protruding laterally outward from the base frame to reach an unloading area beneath a truck and a storage position retracted inwardly relative to the lateral boundaries of the base frame to enable passage of trucks.

In yet further embodiments, the feed conveyor may include a loading section suitably arranged to permit transport trucks to drive over the loading section. In this instance the feed conveyors are not required to be retracted as trucks drive up to and away from a loading position alongside the base frame, however, the feed conveyors in this instant preferably remain retractable in some form from a working position to a storage position to allow the feed conveyors to be stored on the base frame for transport within the lateral boundaries of the base frame.

In all embodiments of the conveyor system 10, the various conveyor belts may be provided with various forms of belt cleaners including scrapers, brushes or use of air streams to form an air knife for example.

The various operating components may also be provided with static removing technology, for example use of misting machines, or in the instance of air knives being used, use of an ionized air stream to remove static. Static can also be controlled by providing suitable grounding of the various frames relative to suitable grounding equipment penetrated into the ground.

The conveyor system 10 described herein is advantageous as it provides a compact freestanding single or dual elevator system with a small footprint while still enabling two trucks to unload simultaneously. The footprint for the freight component is substantially smaller than commercially available systems while still permitting trucks to load two different product types into two different conveying systems simultaneously. The dual truck lanes permit staging with the most efficient layout.

Typical competitor bottom dumping systems would require two complete flow patterns on the site in which one truck unloading area is set up at 90° angles to the other truck unloading area so that the trucks have to navigate around one another and the worksite causing potential safety risks. While other systems have attempted dual truck unloading, typically this is only accomplished with two trucks unloading onto a common main conveyor so that there is limited unloading throughput capacity and the unloading is limited to the same product type to the same silos at the same time. Competitor systems also do not permit transport trucks to get into close proximity to the silos being loaded when using long inclined ramps for elevating the material at slopes of 35 or 40 degrees for example, thus creating large footprints. Other prior art systems require trucks to back up to the unloading system contrary to the present invention.

The present conveyor system 10 also reduces contamination as trucks do not have to drive over intake areas of the conveying system thus preventing contaminants from being dragged into the conveyors. The shuttling design of the feed conveyors 106 is also advantageous as it allows unloading two compartments or hatches of a transport vehicle without having to move the vehicle between each unloading operation. The conveying system 10 is also advantageous in providing complete redundancy throughout the entire loading, conveying, elevating and discharging of the conveyed material to continue operating in the event of any component failure.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A portable conveyor system for receiving particulate material and for conveying said particulate material to downstream equipment having an intake, the portable conveyor system comprising:
   a base frame;
   a material handling assembly carried on the base frame for depositing the particulate material into the intake of the downstream equipment; and
   at least one feed conveyor operable to convey the particulate material from the feed conveyor onto the material handling assembly;
   said at least one feed conveyor being supported on the base frame so as to be movable between a working position and a stored position;
   the base frame being elongate in a longitudinal direction between a first end and a second end;
   the material handling assembly including an elevating assembly on the base frame in proximity to the second end of the base frame having an intake and a discharge at a greater elevation than the intake in a working position of the elevating assembly; and
   the material handling assembly including a main conveyor assembly carried on the base frame and being operable to convey the particulate material towards the second end of the base frame from said at least one feed conveyor to the intake of the elevating assembly;
   wherein said at least one feed conveyor is operable to convey the particulate material in a feed direction of the feed conveyor and wherein said at least one feed conveyor is extendable in length in the feed direction of the feed conveyor.

2. The portable conveyor system according to claim 1 wherein said at least one feed conveyor is supported on the base frame so as to be movable between the working position in which said at least one feed conveyor extends laterally outward from the base frame transversely to a longitudinal direction of the base frame and the stored position in which the at least one feed conveyor is displaced laterally inwardly towards the base frame relative to the working position.

3. The portable conveyor system according to claim 2 wherein said at least one feed conveyor is pivotal relative to the main conveyor on the base frame about an upright pivot axis.

4. The portable conveyor system according to claim 3 wherein said at least one feed conveyor is repositionable in the feed direction of the feed conveyor relative to the upright pivot axis.

5. The portable conveyor system according to claim 2 wherein said at least one feed conveyor is movable relative to the base frame in the longitudinal direction of the base frame.

6. The portable conveyor system according to claim 1 wherein the elevating assembly comprises a first bucket elevator and a second bucket elevator extending alongside one another along a common main frame of the elevating assembly, each bucket elevator being operable to elevate the particulate material from the intake to the discharge of the elevating assembly in the working position of the elevating assembly.

7. A portable conveyor system for receiving particulate material and for conveying said particulate material to downstream equipment having an intake, the portable conveyor system comprising:
   a base frame;
   a material handling assembly carried on the base frame for depositing the particulate material into the intake of the downstream equipment; and
   at least one feed conveyor operable to convey the particulate material from the feed conveyor onto the material handling assembly;
   said at least one feed conveyor being supported on the base frame so as to be movable between a working position and a stored position;
   the base frame being elongate in a longitudinal direction between a first end and a second end;
   the material handling assembly including an elevating assembly on the base frame in proximity to the second end of the base frame having an intake and a discharge at a greater elevation than the intake in a working position of the elevating assembly; and
   the material handling assembly including a main conveyor assembly carried on the base frame and being operable to convey the particulate material towards the second end of the base frame from said at least one feed conveyor to the intake of the elevating assembly;
   said at least one feed conveyor is supported on the base frame so as to be movable between the working position in which said at least one feed conveyor extends laterally outward from the base frame transversely to a longitudinal direction of the base frame and the stored position in which the at least one feed conveyor is displaced laterally inwardly towards the base frame relative to the working position; and wherein said at least one feed conveyor is movable in the longitudinal direction relative to the base frame along a majority of a length of the main conveyor assembly, the portable conveyor system further comprising a shroud extending over the main conveyor assembly, said at least one feed conveyor communicating through an access opening in the shroud in which the access opening in the shroud is adjustable in the longitudinal direction of the base frame together with the feed conveyor.

8. A portable conveyor system for receiving particulate material and for conveying said particulate material to downstream equipment having an intake, the portable conveyor system comprising:

a base frame;

a material handling assembly carried on the base frame for depositing the particulate material into the intake of the downstream equipment; and at least one feed conveyor operable to convey the particulate material from the feed conveyor onto the material handling assembly;

said at least one feed conveyor being supported on the base frame so as to be movable between a working position and a stored position;

the base frame being elongate in a longitudinal direction between a first end and a second end;

the material handling assembly including an elevating assembly on the base frame in proximity to the second end of the base frame having an intake and a discharge at a greater elevation than the intake in a working position of the elevating assembly; and the material handling assembly including a main conveyor assembly carried on the base frame and being operable to convey the particulate material towards the second end of the base frame from said at least one feed conveyor to the intake of the elevating assembly;

wherein said at least one feed conveyor comprises at least two feed conveyors independently supported along a common side of the base frame to extend laterally outward from the base frame in the working positions thereof in a common lateral direction.

9. A portable conveyor system for receiving particulate material and for conveying said particulate material to downstream equipment having an intake, the portable conveyor system comprising:

a base frame;

a material handling assembly carried on the base frame for depositing the particulate material into the intake of the downstream equipment; and at least one feed conveyor operable to convey the particulate material from the feed conveyor onto the material handling assembly;

said at least one feed conveyor being supported on the base frame so as to be movable between a working position and a stored position;

the base frame being elongate in a longitudinal direction between a first end and a second end;

the material handling assembly including an elevating assembly on the base frame in proximity to the second end of the base frame having an intake and a discharge at a greater elevation than the intake in a working position of the elevating assembly;

the material handling assembly including a main conveyor assembly carried on the base frame and being operable to convey the particulate material towards the second end of the base frame from said at least one feed conveyor to the intake of the elevating assembly; and the elevating assembly being supported on the base frame in the working position of the elevating assembly extending upwardly at the second end of the base frame from the intake of the elevating assembly to the discharge of the elevating assembly and being movable from the working to position to a stored position extending along the base frame in the longitudinal direction of the base frame from the intake of the elevating assembly at the second end of the frame to the discharge of the elevating assembly, the elevating assembly being operable in the working position to convey the particulate material from the intake to the discharge of the elevating assembly wherein said at least one feed conveyor is received within a space between the main conveyor assembly therebelow and the elevating assembly thereabove in the stored position of the elevating assembly and the stored position of said at least one feed conveyor respectively.

10. A portable conveyor system for receiving particulate material and for conveying said particulate material to downstream equipment having an intake, the portable conveyor system comprising:

a base frame;

a material handling assembly carried on the base frame for depositing the particulate material into the intake of the downstream equipment; and at least one feed conveyor operable to convey the particulate material from the feed conveyor onto the material handling assembly;

said at least one feed conveyor being supported on the base frame so as to be movable between a working position and a stored position;

the base frame being elongate in a longitudinal direction between a first end and a second end;

the material handling assembly including an elevating assembly on the base frame in proximity to the second end of the base frame having an intake and a discharge at a greater elevation than the intake in a working position of the elevating assembly;

the material handling assembly including a main conveyor assembly carried on the base frame and being operable to convey the particulate material towards the second end of the base frame from said at least one feed conveyor to the intake of the elevating assembly; and the elevating assembly further comprising two outrigger frames supported on laterally opposing sides of the elevating assembly in the working position of the elevating assembly, each outrigger frame in a working position thereof including an upper frame portion extending laterally outwardly from the elevating assembly at an elevated location spaced above the base frame and an outer frame portion depending downwardly from the upper frame portion at a location spaced laterally outwardly from the base frame so as to define a vehicle access opening that spans laterally between the base frame and the outer frame portion and that spans vertically between the upper frame portion and a ground surface upon which the based frame is engaged, the vehicle access opening being sized so as to be arranged to receive the transport vehicle passing therethrough in the longitudinal direction of the base frame.

11. The portable conveyor system according to claim 10 wherein each outrigger frame is pivotally coupled to a main frame of the elevating assembly so as to be foldable relative to the main frame from the working position to a stored position thereof in which the outer frame portion extends alongside the main frame.

12. A portable conveyor system for receiving particulate material and for conveying said particulate material to downstream equipment having an intake, the portable conveyor system comprising:
a base frame;
a material handling assembly carried on the base frame for depositing the particulate material into the intake of the downstream equipment; and
at least one feed conveyor operable to convey the particulate material from the feed conveyor onto the material handling assembly;
said at least one feed conveyor being supported on the base frame so as to be movable between a working position and a stored position;
the base frame being elongate in a longitudinal direction between a first end and a second end;
the material handling assembly including an elevating assembly on the base frame in proximity to the second end of the base frame having an intake and a discharge at a greater elevation than the intake in a working position of the elevating assembly; and
the material handling assembly including a main conveyor assembly carried on the base frame and being operable to convey the particulate material towards the second end of the base frame from said at least one feed conveyor to the intake of the elevating assembly;
wherein the portable conveyor system further comprises at least one vehicle sensor supported on the portable conveyor system so as to be arranged to detect movement of a transport vehicle in the longitudinal direction alongside the base frame and a controller operatively connected to said at least one feed conveyor so as to be arranged to displace said at least one feed conveyor into the stored position in response to the detection of movement by the vehicle sensor.

13. A portable conveyor system for receiving particulate material and for conveying said particulate material to downstream equipment having an intake, the portable conveyor system comprising:
a base frame;
a material handling assembly carried on the base frame for depositing the particulate material into the intake of the downstream equipment; and
at least one feed conveyor operable to convey the particulate material from the feed conveyor onto the material handling assembly;
said at least one feed conveyor being supported on the base frame so as to be movable between a working position and a stored position;
the base frame being elongate in a longitudinal direction between a first end and a second end;
the material handling assembly including an elevating assembly on the base frame in proximity to the second end of the base frame having an intake and a discharge at a greater elevation than the intake in a working position of the elevating assembly; and
the material handling assembly including a main conveyor assembly carried on the base frame and being operable to convey the particulate material towards the second end of the base frame from said at least one feed conveyor to the intake of the elevating assembly;
wherein the portable conveyor system further comprises at least one guard rail member supported on the base frame so as to be movable between a stored position extending along a boundary of the base frame and a working position protruding from the boundary of the base frame in the longitudinal direction beyond one end of the base frame.

14. A portable conveyor system for receiving particulate material and for conveying said particulate material to downstream equipment having an intake, the portable conveyor system comprising:
a base frame;
a material handling assembly carried on the base frame for depositing the particulate material into the intake of the downstream equipment; and
at least one feed conveyor operable to convey the particulate material from the feed conveyor onto the material handling assembly;
said at least one feed conveyor being supported on the base frame so as to be movable between a working position and a stored position;
the base frame being elongate in a longitudinal direction between a first end and a second end;
the material handling assembly including an elevating assembly on the base frame in proximity to the second end of the base frame having an intake and a discharge at a greater elevation than the intake in a working position of the elevating assembly; and
the material handling assembly including a main conveyor assembly carried on the base frame and being operable to convey the particulate material towards the second end of the base frame from said at least one feed conveyor to the intake of the elevating assembly;
wherein the portable conveyor system further comprises a platform comprising a plurality of structural beams spanning in a longitudinal direction of the platform, the platform being rigidly connected to the base frame so as to be oriented transversely to the longitudinal direction of the base frame and such that the structural beams protrude laterally outwardly from opposing sides of the base frame so as to define outrigger members relative to the elevating assembly, the base frame being readily separable from the platform for transport.

15. A portable conveyor system for receiving particulate material and for conveying said particulate material to downstream equipment having an intake, the portable conveyor system comprising:
a base frame;
a material handling assembly carried on the base frame for depositing the particulate material into the intake of the downstream equipment; and
at least one feed conveyor operable to convey the particulate material from the feed conveyor onto the material handling assembly;
said at least one feed conveyor being supported on the base frame so as to be movable between a working position and a stored position;
the base frame being elongate in a longitudinal direction between a first end and a second end;
the material handling assembly including an elevating assembly on the base frame in proximity to the second end of the base frame having an intake and a discharge at a greater elevation than the intake in a working position of the elevating assembly;

the material handling assembly including a main conveyor assembly carried on the base frame and being operable to convey the particulate material towards the second end of the base frame from said at least one feed conveyor to the intake of the elevating assembly;

the main conveyor assembly comprising a first main conveyor and a second main conveyor extending alongside one another and being operable to independently convey particulate material from the first end to the second end of the base frame; and said at least one feed conveyor being operable between a first configuration arranged to convey material in a conveying direction of the feed conveyor from a first side of the base frame into the first main conveyor in transverse relation to the first main conveyor and a second configuration arranged to convey material in the conveying direction of the feed conveyor from the first side of the base frame into the second main conveyor in transverse relation to the second main conveyor.

16. The portable conveyor system according to claim 15 wherein said at least one feed conveyor is movable in said conveying direction of the feed conveyor between the first configuration and the second configuration.

17. The portable conveyor system according to claim 15 wherein said at least one feed conveyor includes a discharge spout which is pivotal about a horizontal pivot axis between a first angular orientation in the first configuration of the feed conveyor and a second angular orientation different than the first angular orientation in the second configuration of the feed conveyor.

18. A portable conveyor system for receiving particulate material and for conveying said particulate material to downstream equipment having an intake, the portable conveyor system comprising:

a base frame;

a material handling assembly carried on the base frame for depositing the particulate material into the intake of the downstream equipment; and at least one feed conveyor operable to convey the particulate material from the feed conveyor onto the material handling assembly;

said at least one feed conveyor being supported on the base frame so as to be movable between a working position and a stored position;

the base frame being elongate in a longitudinal direction between a first end and a second end;

the material handling assembly including an elevating assembly on the base frame in proximity to the second end of the base frame having an intake and a discharge at a greater elevation than the intake in a working position of the elevating assembly; and the material handling assembly including a main conveyor assembly carried on the base frame and being operable to convey the particulate material towards the second end of the base frame from said at least one feed conveyor to the intake of the elevating assembly;

wherein the portable conveyor system further comprises a modular frame adapted to be selectively mounted longitudinally in series with the base frame so as to extend the base frame in length in the longitudinal direction, the main conveyor being supported on both the base frame and the modular frame to convey material longitudinally along both the modular frame and base frame.

19. A portable conveyor system for receiving particulate material and for conveying said particulate material to downstream equipment having an intake, the portable conveyor system comprising:

a base frame;

a material handling assembly carried on the base frame for depositing the particulate material into the intake of the downstream equipment; and at least one feed conveyor operable to convey the particulate material from the feed conveyor onto the material handling assembly;

said at least one feed conveyor being supported on the base frame so as to be movable between a working position and a stored position;

the base frame being elongate in a longitudinal direction between a first end and a second end;

the material handling assembly including an elevating assembly on the base frame in proximity to the second end of the base frame having an intake and a discharge at a greater elevation than the intake in a working position of the elevating assembly; and the material handling assembly including a main conveyor assembly carried on the base frame and being operable to convey the particulate material towards the second end of the base frame from said at least one feed conveyor to the intake of the elevating assembly;

wherein the portable conveyor system further comprises an access panel supported on the base frame so as to be movable between a working position spanning an access opening in the base frame so as to form part of a dust containment envelope of one of the conveyors of the conveying system and an access position in which the access opening is substantially unobstructed by the access panel, the access panel being formed of a flexible transparent material so as to enable visual inspection of conveyed material through the transparent material of the access panel in the working position thereof, and the access panel being retained on the base frame in the working position using magnetically coupled fasteners.

20. A portable conveyor system for receiving particulate material and for conveying said particulate material to downstream equipment having an intake, the portable conveyor system comprising:

a base frame;

a material handling assembly carried on the base frame for depositing the particulate material into the intake of the downstream equipment; and at least one feed conveyor operable to convey the particulate material from the feed conveyor onto the material handling assembly;

said at least one feed conveyor being supported on the base frame so as to be movable between a working position and a stored position;

the base frame being elongate in a longitudinal direction between a first end and a second end;

the material handling assembly including an elevating assembly on the base frame in proximity to the second end of the base frame having an intake and a discharge at a greater elevation than the intake in a working position of the elevating assembly; and the material handling assembly including a main conveyor assembly carried on the base frame and being operable to convey the particulate material towards the second end of the base frame from said at least one feed conveyor to the intake of the elevating assembly;

wherein the portable conveyor system further comprises a cover system supported above the base frame to span laterally outwardly over an operating area of the at least one feed conveyor.

21. The portable conveyor system according to claim 20 wherein the cover system spans laterally outwardly from the base frame over a transport truck receiving passageway that extends longitudinally alongside the base frame so as to be arranged to receive transport trucks passing therethrough beneath the cover system.

22. The portable conveyor system according to claim 20 wherein the cover system includes a main support member extending in a longitudinal direction of the base frame defining an apex of the cover system, and a pair of side portions extending outward from laterally opposing sides of the main support member over respective transport truck receiving passageways that extend longitudinally along opposing sides of the base frame so as to be arranged to receive transport trucks passing through each of the passageways beneath the cover system.

23. A portable conveyor system for receiving particulate material and for conveying said particulate material to downstream equipment having an intake, the portable conveyor system comprising:

a base frame;

a material handling assembly carried on the base frame for depositing the particulate material into the intake of the downstream equipment; and at least one feed conveyor operable to convey the particulate material from the feed conveyor onto the material handling assembly;

said at least one feed conveyor being supported on the base frame so as to be movable between a working position and a stored position;

the base frame being elongate in a longitudinal direction between a first end and a second end;

the material handling assembly including an elevating assembly on the base frame in proximity to the second end of the base frame having an intake and a discharge at a greater elevation than the intake in a working position of the elevating assembly; and the material handling assembly including a main conveyor assembly carried on the base frame and being operable to convey the particulate material towards the second end of the base frame from said at least one feed conveyor to the intake of the elevating assembly;

wherein the portable conveyor system further comprises one or more surge bins supported on the base frame which may have one or a plurality of compartments so as to receive material discharged from the main conveyor and so as to be arranged to discharge material from the surge bin into the intake of one or a plurality of elevating assemblies.

24. The portable conveyor according to claim 23 wherein said one or more surge bins further comprises a controllable discharge arranged to discharge material from the one or more surge bins at a prescribed discharge rate.

* * * * *